US009488736B2

(12) United States Patent
Weisenburger et al.

(10) Patent No.: US 9,488,736 B2
(45) Date of Patent: Nov. 8, 2016

(54) LOCALLY MEASURED MOVEMENT SMOOTHING OF GNSS POSITION FIXES

(71) Applicant: Trimble Navigation Limited, Sunnyvale, CA (US)

(72) Inventors: Shawn D. Weisenburger, Denver, CO (US); Richard Rudow, Mesa, AZ (US); Nicholas C. Talbot, Ashburton (AU); Peter Van Wyck Loomis, Sunnyvale, CA (US); James M. Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 348 days.

(21) Appl. No.: 14/268,898

(22) Filed: May 2, 2014

(65) Prior Publication Data

US 2014/0375493 A1   Dec. 25, 2014

Related U.S. Application Data

(63) Continuation-in-part of application No. 13/954,995, filed on Jul. 31, 2013, now Pat. No. 9,177,384, which is a continuation-in-part of application No. 14/035,884, filed on Sep. 24, 2013, now Pat. No.
(Continued)

(51) Int. Cl.
*G01S 19/47*   (2010.01)
*G06T 7/20*   (2006.01)
(Continued)

(52) U.S. Cl.
CPC ............... *G01S 19/47* (2013.01); *G01S 19/45* (2013.01); *G01S 19/48* (2013.01); *G06T 7/208* (2013.01); *G06T 2207/10004* (2013.01); *G06T 2207/20076* (2013.01)

(58) Field of Classification Search
CPC ........ G01S 19/38; G01S 19/39; G01S 19/42; G01S 19/45; G01S 19/47; G01S 19/48; G01S 13/87; G01S 19/01; G01S 19/13; G01S 19/24; G01S 19/29; G01S 19/35; G01S 19/37; G01S 19/46; G06T 7/20; G06T 7/208; G06T 2207/10; G06T 2207/10004; G06T 2207/20; G06T 2207/20076; G01C 1/02; G01C 11/04; G01C 11/30; G04G 7/02
See application file for complete search history.

(56) References Cited

U.S. PATENT DOCUMENTS 5,225,842 A   7/1993 Brown et al.
5,345,244 A   9/1994 Gildea et al.
(Continued)

FOREIGN PATENT DOCUMENTS

EP   0508405   10/1992
EP   1729145 A1   12/2006
(Continued)

OTHER PUBLICATIONS

"PCT/US2015/035328 International Search Report", Oct. 15, 2015, pp. 1-13.
(Continued)

*Primary Examiner* — Bernarr Gregory
(74) *Attorney, Agent, or Firm* — Kilpatrick Townsend & Stockton LLP

(57) ABSTRACT

A method of improving position determination of a device using locally measured movement. A first position fix of a Global Navigation Satellite System (GNSS) receiver system of a device is accessed. A second position fix of the GNSS receiver system is accessed at a time subsequent to the first position fix. Locally measured device movement information is obtained from at least one sensor, that is in a known physical relationship to the device, for a time period after the first position fix and no later than the second position fix, wherein the at least one sensor comprises an image capture device. The quality of measurement of the second position fix is improved by disciplining the second position fix based on the locally measured device movement information.

49 Claims, 31 Drawing Sheets

Related U.S. Application Data 9,369,843, which is a continuation-in-part of application No. 13/842,447, filed on Mar. 15, 2013.

(60) Provisional application No. 61/746,916, filed on Dec. 28, 2012.

(51) Int. Cl.
*G01S 19/45* (2010.01)
*G01S 19/48* (2010.01)
*G01S 19/00* (2010.01)

(56) References Cited

U.S. PATENT DOCUMENTS

| | | |
|---|---|---|
| 5,379,224 A | 1/1995 | Brown et al. |
| 5,471,217 A | 11/1995 | Hatch et al. |
| 5,477,228 A | 12/1995 | Tiwari et al. |
| 5,523,761 A | 6/1996 | Gildea |
| 5,594,454 A | 1/1997 | Devereux et al. |
| 5,621,416 A | 4/1997 | Lennen |
| 5,663,734 A * | 9/1997 | Krasner ............ G01S 19/46 342/352 |
| 5,717,402 A * | 2/1998 | Chu ............ G04G 7/02 331/158 |
| 5,740,048 A | 4/1998 | Abel et al. |
| 5,805,108 A | 9/1998 | Lennen |
| 5,825,327 A * | 10/1998 | Krasner ............ G01S 19/46 342/357.57 |
| 5,861,842 A * | 1/1999 | Hitch ............ G04G 7/02 342/352 |
| 5,862,501 A | 1/1999 | Talbot et al. |
| 5,899,957 A | 5/1999 | Loomis |
| 5,903,235 A | 5/1999 | Nichols |
| 5,913,170 A | 6/1999 | Wortham |
| 6,002,363 A * | 12/1999 | Krasner ............ G01S 19/37 342/357.62 |
| 6,067,046 A | 5/2000 | Nichols |
| 6,072,431 A | 6/2000 | Froeberg |
| 6,163,294 A * | 12/2000 | Talbot ............ G01C 1/02 33/292 |
| 6,249,245 B1 | 6/2001 | Watters et al. |
| 6,324,473 B1 | 11/2001 | Eschenbach |
| 6,408,178 B1 | 6/2002 | Wickstrom et al. |
| 6,429,808 B1 | 8/2002 | King et al. |
| 6,430,503 B1 | 8/2002 | McBurney et al. |
| 6,473,030 B1 | 10/2002 | McBurney et al. |
| 6,507,738 B1 | 1/2003 | Allison et al. |
| 6,510,387 B2 | 1/2003 | Fuchs et al. |
| 6,590,525 B2 | 7/2003 | Yule et al. |
| 6,711,293 B1 | 3/2004 | Lowe |
| 6,879,913 B1 * | 4/2005 | Yu ............ G01S 19/29 342/357.64 |
| 7,003,112 B1 | 2/2006 | Froeberg |
| 7,043,364 B2 | 5/2006 | Scherzinger |
| 7,151,489 B2 | 12/2006 | Pande |
| 7,191,097 B1 | 3/2007 | Lee et al. |
| 7,336,814 B2 | 2/2008 | Boca et al. |
| 7,480,511 B2 | 1/2009 | O'Meagher |
| 7,545,894 B2 * | 6/2009 | Ziedan ............ G01S 19/29 340/426.19 |
| 7,570,204 B1 | 8/2009 | McGraw et al. |
| 7,908,106 B2 | 3/2011 | Cho et al. |
| 7,961,141 B2 | 6/2011 | Dai et al. |
| 8,024,144 B2 | 9/2011 | Kludas et al. |
| 8,032,152 B2 | 10/2011 | Manson et al. |
| 8,044,852 B2 | 10/2011 | Green et al. |
| 8,068,848 B2 | 11/2011 | Manson et al. |
| 8,068,849 B2 | 11/2011 | Manson et al. |
| 8,078,192 B2 | 12/2011 | Wirola et al. |
| 8,081,987 B2 | 12/2011 | Manson et al. |
| 8,081,988 B2 | 12/2011 | Manson et al. |
| 8,081,989 B2 | 12/2011 | Manson et al. |
| 8,085,196 B2 | 12/2011 | Whitehead |
| 8,085,387 B2 | 12/2011 | Kludas et al. |
| 8,095,149 B2 | 1/2012 | Manson et al. |
| 8,134,497 B2 | 3/2012 | Janky et al. |
| 8,136,545 B2 | 3/2012 | Jablonski |
| 8,224,030 B2 * | 7/2012 | Otani ............ G01C 11/30 382/103 |
| 8,242,956 B2 | 8/2012 | Lamance et al. |
| 8,339,311 B2 | 12/2012 | Walley et al. |
| 8,368,875 B2 | 2/2013 | Kludas et al. |
| 8,374,786 B2 * | 2/2013 | Buros ............ G01S 19/48 701/408 |
| 8,447,519 B2 | 5/2013 | Basnayake et al. |
| 8,699,409 B2 | 4/2014 | Aryan et al. |
| 8,719,188 B2 | 5/2014 | Kuhn et al. |
| 8,922,421 B2 * | 12/2014 | Pomietlasz ............ G01S 13/87 342/368 |
| 9,037,527 B2 | 5/2015 | Kuhn et al. |
| 2001/0017599 A1 | 8/2001 | Yule et al. |
| 2002/0072854 A1 | 6/2002 | Fuchs et al. |
| 2002/0186180 A1 | 12/2002 | Duda |
| 2003/0083804 A1 | 5/2003 | Pilley et al. |
| 2005/0064878 A1 | 3/2005 | O'Meagher et al. |
| 2005/0104774 A1 | 5/2005 | Pande et al. |
| 2006/0146136 A1 | 7/2006 | Cho et al. |
| 2008/0263097 A1 | 10/2008 | Manson et al. |
| 2008/0319664 A1 | 12/2008 | Kremin et al. |
| 2009/0083430 A1 | 3/2009 | Edge et al. |
| 2009/0093959 A1 | 4/2009 | Scherzinger et al. |
| 2009/0189804 A1 | 7/2009 | Ashjaee et al. |
| 2009/0262016 A1 | 10/2009 | Wirola et al. |
| 2010/0057359 A1 | 3/2010 | Caballero et al. |
| 2010/0063733 A1 | 3/2010 | Yunck |
| 2010/0079333 A1 | 4/2010 | Janky et al. |
| 2010/0141510 A1 | 6/2010 | Dai et al. |
| 2010/0231443 A1 | 9/2010 | Whitehead |
| 2010/0260150 A1 | 10/2010 | Aryan et al. |
| 2011/0018761 A1 | 1/2011 | Walley et al. |
| 2011/0064312 A1 | 3/2011 | Janky et al. |
| 2011/0163914 A1 | 7/2011 | Seymour et al. |
| 2011/0187590 A1 | 8/2011 | Leandro |
| 2011/0195687 A1 | 8/2011 | Das et al. |
| 2011/0267230 A1 | 11/2011 | Lamance et al. |
| 2011/0285587 A1 | 11/2011 | Vollath et al. |
| 2012/0116676 A1 | 5/2012 | Basnayake et al. |
| 2012/0163656 A1 | 6/2012 | Wang et al. |
| 2012/0166137 A1 | 6/2012 | Grässer et al. |
| 2012/0330601 A1 | 12/2012 | Soubra et al. |
| 2013/0027246 A1 | 1/2013 | Hadef |
| 2013/0243250 A1 | 9/2013 | France et al. |
| 2014/0081571 A1 | 3/2014 | Briggs et al. |
| 2014/0184442 A1 | 7/2014 | Large et al. |
| 2014/0187193 A1 | 7/2014 | Rudow et al. |
| 2014/0240170 A1 | 8/2014 | Rudow et al. |
| 2014/0253375 A1 | 9/2014 | Rudow et al. |
| 2014/0292569 A1 | 10/2014 | Wallace et al. |
| 2014/0292570 A1 | 10/2014 | Wallace et al. |
| 2014/0375493 A1 | 12/2014 | Weisenburger et al. |
| 2014/0378170 A1 | 12/2014 | Rudow et al. |
| 2014/0378171 A1 | 12/2014 | Rudow et al. |
| 2015/0009067 A1 | 1/2015 | Rudow et al. |
| 2015/0043012 A1 | 2/2015 | Rudow et al. |
| 2015/0045058 A1 | 2/2015 | Rudow et al. |
| 2015/0045059 A1 | 2/2015 | Rudow et al. |
| 2015/0050907 A1 | 2/2015 | Rudow et al. |
| 2015/0057028 A1 | 2/2015 | Rudow et al. |
| 2015/0289097 A1 | 10/2015 | Rudow et al. |

FOREIGN PATENT DOCUMENTS

| | | |
|---|---|---|
| EP | 2275778 A1 | 1/2011 |
| WO | 2005/045458 | 5/2005 |
| WO | 2009074654 A1 | 6/2009 |
| WO | 2011120141 A1 | 10/2011 |

OTHER PUBLICATIONS

"PCT/US2015/035346 International Search Report", Oct. 13, 2015, pp. 1-12.

Afzal, "Design Methodology for a Dual Frequency Configurable GPS Receiver", Proceedings of the 23rd International Technical

(56) References Cited

OTHER PUBLICATIONS

Meeting of the Satellite Division of the Institute of Navigation (ION GNSS 2010), Sep. 24, 2010, pp. 2892-2900.
Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.
Haak, "A Multi-Purpose Software GNSS Receiver for Automotive Applications", Proceedings of the 23rd International Technical meeting of the Satellite Division of the Institute of Navigation (ION GNSS 2010), Sep. 24, 2010, pp. 1869-1874.
Ruegamer, et al., "A Flexible and Portable Multiband GNSS Front-end System", Proceedings of the 25th ntemational Technical Meeting of the Satellite Division of the Institute of Navigation (ION GNSS 2012), Sep. 21, 2012, pp. 2378-2389.
"Comparison of Photogrammetry Software", http://en.wikipedia.org/wiki/Comparison_of_photogrammetry_software, Jul. 8, 2015, 4 pages.
"Photogrammetry", http://en.wikipedia.org/wiki/Photogrammetry, Jun. 25, 2015, 5 pages.
"Pi Pelican Imaging: Life in 3D", http://www.pelicanimaging.com, 2015, 3 pages.
Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.
Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.
Hatch, "The Synergism of GPS Code and Carrier Measurements", Proceedings of the Third International Geodetic Symposium on Satellite Doppler Positioning, 1982, 1213-1232.
Landau, et al., "Virtual Reference Stations Versus Broadcast Solutions in Network RTK", GNSS 2003, Graz, Austria, Apr. 2003, 15 pages.
Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.

"PCT/US2013/078125 International Search Report and Written Opinion", Apr. 23, 2014, 25 pages.
"Spirit Level with bubble", https://play.google.com/store/apps/details?id=com.zabaanapps.android.level, Mar. 25, 2014, 2 Pages.
"Technical Tips from Inland GPS", Trimble TSC2—RTK over internet—establishing IP Connection, Jun. 14, 2011, 8 pages.
"Theodolite", Hunter Research & Technology, Mar. 24, 2014, 1 Page.
"Trimble S8 Total Station Datasheet", Trimble Navigation Limited, 2013, 4 Pages.
"Wireless RTK Bridge—Cellular User Guide", Revision 1.4, 2009, 47 pages.
Afzal, "Design Methodology for Dual Frequency Configurable GPD Receiver", ION GNSS 2010, Session E5, Portland, OR, Sep. 21-24, 2010, 9 Pages.
Brown, "TIDGET Mayday Systems for Motorists", Presented at IEEE Position Location and Navigation Symposium (PLANS) '94 Las Vegas, NV, Apr. 1994, 7 pages.
Engels, et al., "Buncle Adjustment Rules", Center for Visualization and Virtual Environments, Department of Computer Science, University of Kentucky, Sep. 1, 2006, 266-271.
Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.
Mouragnon, et al., "Real Time Localization and 3D Reconstruction", Proceedings of the 2006 IEEE Computer Society Conference on Computer Vision and Pattern Recognition, Jan. 1, 2006, 363-370.
Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.
Scaramuzza, et al., "Visual Odometry", Part 1: The First 30 Years and Fundamentals, Dec. 3, 2011, 80-92.
International Search Report of the International Searching Authority for PCT Application No. PCT/US2015/028600 mailed Jul. 22, 2015, 4 pages.
International Written Opinion of the International Searching Authority for PCT Application No. PCT/US2015/028600 mailed Jul. 22, 2015, 9 pages.

\* cited by examiner

LOCALLY MEASURED MOVEMENT SMOOTHING OF GNSS POSITION FIXES

CROSS-REFERENCE TO RELATED APPLICATIONS

Continuation in Part

This application is a continuation-in-part application of and claims the benefit of U.S. patent application Ser. No. 13/954,995 filed on Jul. 31, 2013, now U.S. Pat. No. 9,177,384, entitled "ROLLING SEQUENTIAL BUNDLE ADJUSTMENT," by Shawn D. Weisenburger, and assigned to the assignee of the present application; the contents of U.S. patent application Ser. No. 13/954,995, now U.S. Pat. No. 9,177,384, are hereby incorporated by reference herein.

This application is a continuation-in-part application of and claims the benefit of U.S. patent application Ser. No. 14/035,884, filed on Sep. 24, 2013, now U.S. Pat. No. 9,369,843, entitled "EXTRACTING PSEUDORANGE INFORMATION USING A CELLULAR DEVICE" by Rudow et al., and assigned to the assignee of the present application and to the extent not repeated herein; the contents of U.S. patent application Ser. No. 14/035,884, now U.S. Pat. No. 9,369,843, are hereby incorporated herein by reference.

U.S. patent application Ser. No. 14/035,884, now U.S. Pat. No. 9,369,843, claimed priority to and benefit of then U.S. Provisional Patent Application No. 61/746,916, filed on Dec. 28, 2012, entitled "IMPROVED GPS/GNSS ACCURACY FOR A CELL PHONE" by Rudow et al., and assigned to the assignee of the present application; the contents of U.S. Provisional Patent Application No. 61/746,916 were incorporated by reference into U.S. patent application Ser. No. 14/035,884, now U.S. Pat. No. 9,369,843.

Application Ser. No. 14/035,884, now U.S. Pat. No. 9,369,843, also claimed priority to and is a continuation-in-part to the co-pending patent application Ser. No. 13/842,447, entitled "OBTAINING PSEUDORANGE INFORMATION USING A CELLULAR DEVICE," by Richard Rudow, with filing date Mar. 15, 2013, and assigned to the assignee of the present application, the disclosure of which was incorporated by reference into application Ser. No. 14/035,884, now U.S. Pat. No. 9,369,843.

CROSS-REFERENCE TO RELATED APPLICATIONS

This application is related to co-pending U.S. patent application Ser. No. 14/134,437 filed on Dec. 19, 2013, entitled "GNSS RECEIVER POSITIONING SYSTEM" by Peter Large et al., and assigned to the assignee of the present application.

This application is related to co-pending U.S. patent application Ser. No. 14/268,956 filed on May 2, 2014, entitled "POSITION DETERMINATION OF A CELLULAR DEVICE USING CARRIER PHASE SMOOTHING," by Richard Rudow et al., and assigned to the assignee of the present application; the contents of U.S. patent application Ser. No. 14/268,956, are hereby incorporated by reference herein.

This application is related to co-pending U.S. patent application Ser. No. 14/268,993 filed on May 2, 2014, entitled "DEAD RECKONING SYSTEM BASED ON LOCALLY MEASURED MOVEMENT," by Richard Rudow et al., and assigned to the assignee of the present application.

This application is related to co-pending U.S. patent application Ser. No. 14/268,998 filed on May 2, 2014, entitled "CONCURRENT DUAL PROCESSING OF PSEUDORANGES WITH CORRECTIONS," by Richard Rudow et al., and assigned to the assignee of the present application.

This application is related to co-pending U.S. patent application Ser. No. 14/269,013 filed on May 2, 2014, entitled "LOCALLY MEASURED MOVEMENT SMOOTHING OF POSITION FIXES BASED ON EXTRACTED PSEUDORANGES," by Richard Rudow et al., and assigned to the assignee of the present application.

BACKGROUND

Photogrammetry is the practice of determining the geometric properties of objects from photographic images. In the simplest example, the distance between two points that lie on a plane parallel to the photographic image plane can be determined by measuring their distance on the image, if the scale s of the image is known. This is done by multiplying the measured distance by 1/s.

A more sophisticated technique, called stereo photogrammetry, involves estimating the three-dimensional coordinates of points on an object. These are determined by measurements made in two or more photographic images taken from different positions (see stereoscopy). Common points are identified on each image. A line of sight (or ray) can be constructed from the camera location to the point on the object. It is the intersection of these rays (triangulation) that determines the three-dimensional location of the point. More sophisticated algorithms can exploit other information about the scene that is known a priori, for example symmetries, in some cases allowing reconstructions of 3-D coordinates from only one camera position.

There are known current shortcomings of the available solutions. Indeed, the optimal solution was to use a bundle adjustment which is computationally expensive due to the fact that all data is required before the solution can be computed. This means a bundle adjustment per se is not appropriate for real-time implementation.

Alternative solutions include the usage of a Kalman filter. However, this approach fails to take advantage of the connection of the current measurements to previously estimated position and orientation states.

A third solution is to use pairs or triplets of images to estimate the relative motion between the frames. This solution suffers from drift due to the loss of information connecting the measurements to images outside the pair/triplet used for the estimation.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "accessing," "obtaining," "improving," "using," "discarding," and "determining," to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

The present technology addresses and provides a solution to the following problem: How to efficiently estimate camera motion from a set of video frames or image sequences in a way feasible for real-time implementation. The present technology further provides a solution for detecting and correcting, or "smoothing" position fixes generated by a GNSS receiver system using locally measured movement information received from one of an accelerometer and/or an image capture device.

The main idea is to estimate camera motion by using the previous N frames, whereas each new frame can be sequentially added to the estimation while the oldest frame is removed from the state. The sequential addition of measurements from a new frame is much more efficient than completely re-estimating the last N frames in a bundle adjustment.

Figure 1:
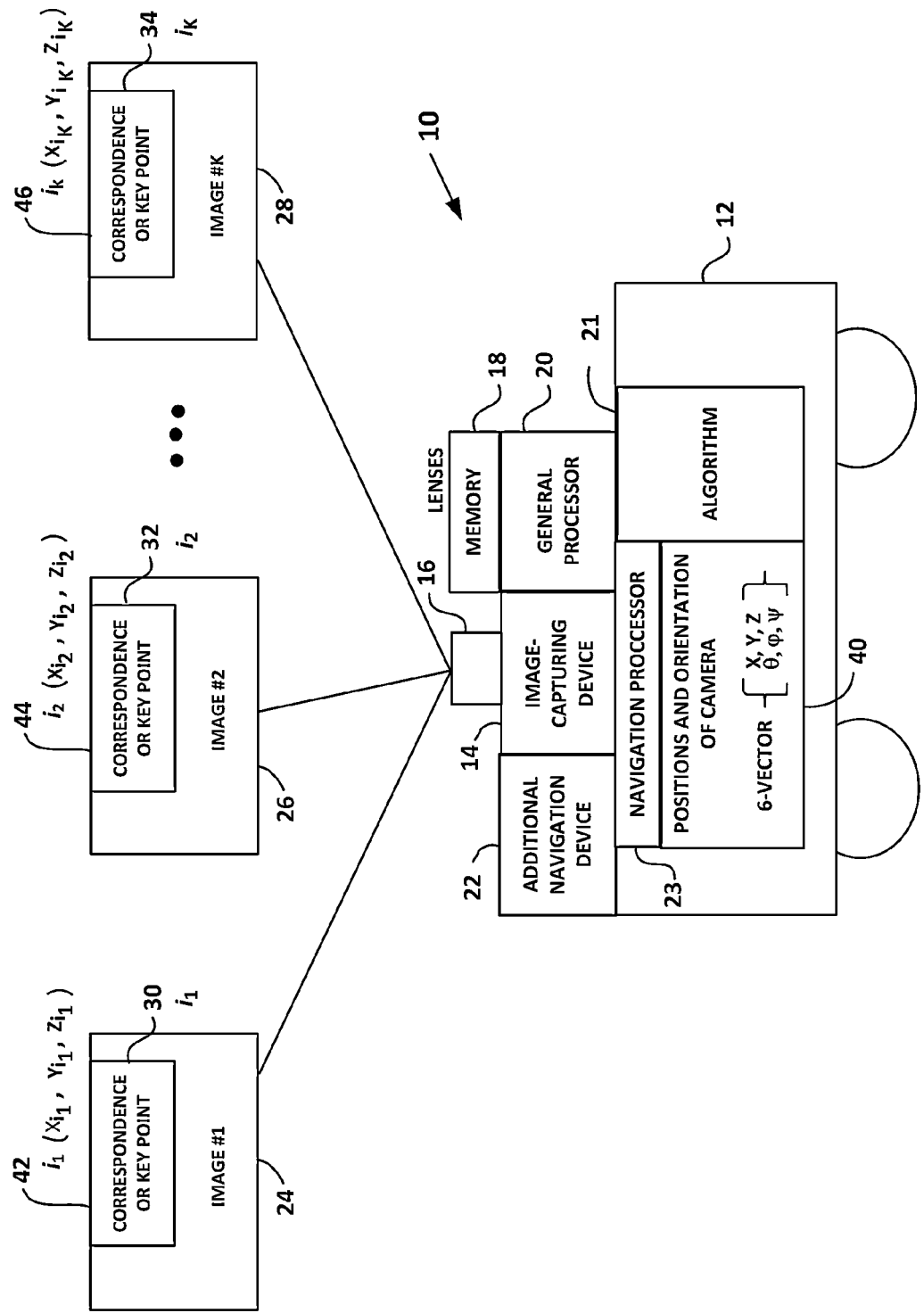
FIG. 1 is the block diagram of an apparatus of the present technology configured to implement a rolling sequential bundle adjustment algorithm in order to obtain the coordinates and orientation of an image-capturing device in real time.

In the embodiment of the present technology, FIG. 1 is the block diagram of an apparatus 10 configured to implement a rolling sequential bundle adjustment algorithm in order to obtain the coordinates and orientation of the image-capturing device 14 in real time.

In the embodiment of the present technology, the image-capturing device 14 is mounted on the mobile platform 12. The mobile platform is selected from the group consisting of: a car, a truck, a bike, a motorbike, a boat, etc.

In an embodiment of the present technology, the image capturing device 14 is configured to perform an image-capture of a scene (not shown) in a software mode (SW) further comprising a memory 18 loaded with an image processing algorithm 21, and a general purpose processor (or a Digital Signal Processor, or a Graphic Processing Unit, etc.) 20 configured to analyze the set of K-images 24, 26, . . . , 28 collected in each i-frame by enabling the image processing algorithm 21.

In an embodiment of the present technology, the image capturing device 14 is configured to perform an image-capture of a scene (not shown) in a hardware mode (HW) further comprising an ASIC chip (or FPGA chip) (not shown) (in analog or digital modes) configured to analyze the set of K-images 24, 26, . . . , 28 by implementing in hardware the image processing algorithm 21.

In an embodiment of the present technology, the image processing algorithm 21 comprises the rolling sequential bundle adjustment algorithm. Please, see discussion below. In an embodiment of the present technology, the image capturing device 14 is selected from the group consisting of: a digital camera; a digital video camera; a digital camcorder; a stereo digital camera; a stereo video camera; a motion picture camera; and a television camera.

Figure 3:
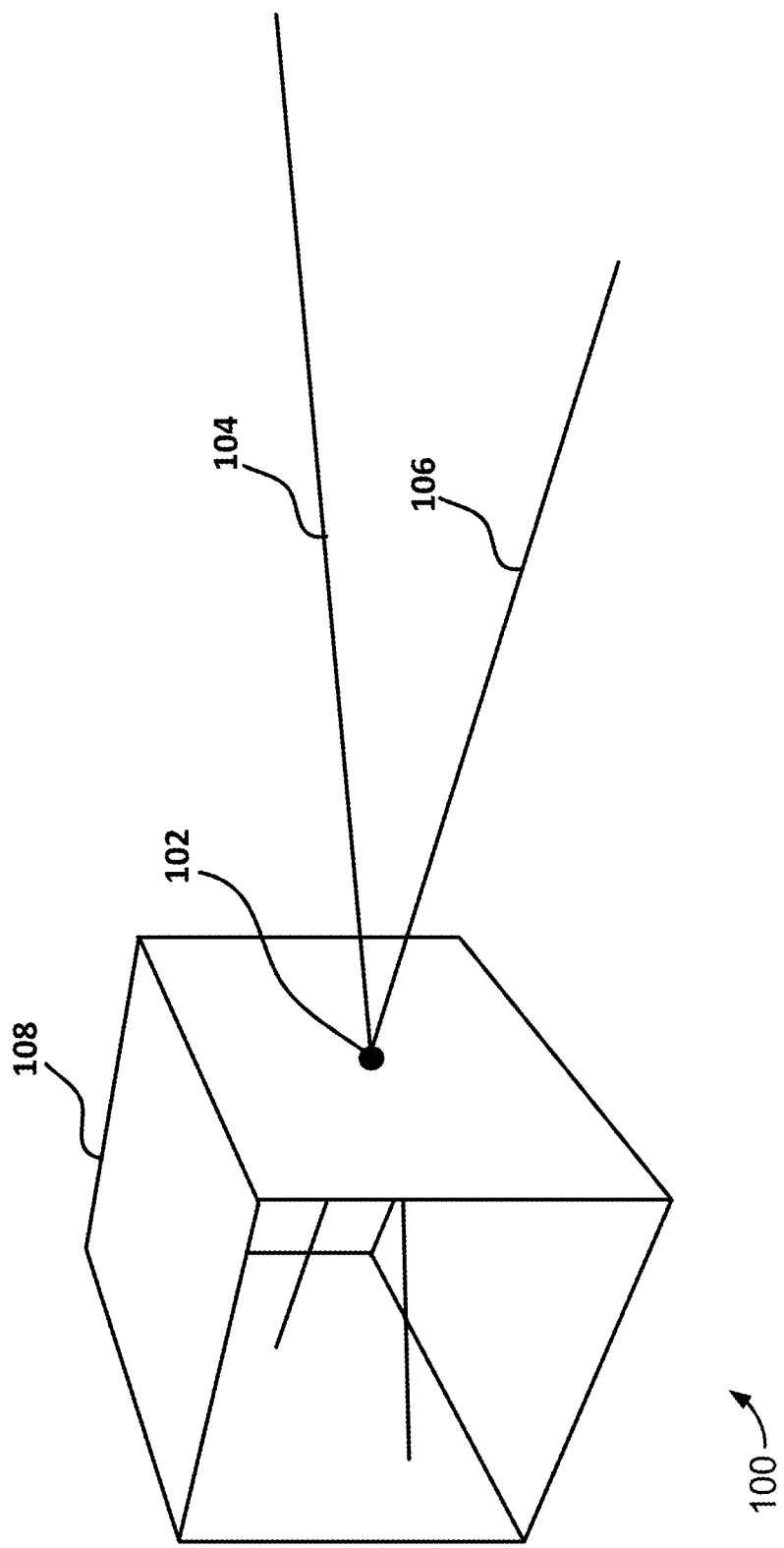
FIG. 3 depicts light beams passing through the pinhole of a pinhole camera for the purposes of the present technology.

In an embodiment of the present technology, as shown in FIG. 3, the image capturing device 14 can be modeled by a pinhole camera 108 that captures light beams 104 and 106 passing through the pinhole 102.

Motion picture or cine cameras record movement at regular intervals in a series of frames. Television and video cameras are configured to record movement electronically for broadcast and storage on magnetic media or optical disks. Camcorders are video cameras which contain both the image sensor and recording media in a single unit.

But for the exclusion of pinhole cameras, which focus the image on the film through a tiny hole, all other cameras use lenses 16 (of FIG. 1) for focusing. The focal length of lenses, i.e., the distance between the rears of the lenses (when focused on infinity) the imaging device, determines the angle of view, or field of view (FOV) (not shown) and the size of objects as they appear as images 24, 26, and . . . 28. The image is focused on that surface by adjusting the distance between the lenses and the surface.

In an embodiment of the present technology, referring still to FIG. 1, the lens 16 further comprises regular rectilinear lens. Rectilinear lens is a lens in which straight lines are not substantially curved or distorted.

In an embodiment of the present technology, the lens 16 further comprises a fisheye lens. A fisheye lens is a wide-angle lens that takes in an extremely wide, hemispherical image. Fisheye lenses are often used to shoot broad landscapes. Fisheye lenses achieve extremely wide angles of view by forgoing a rectilinear image, opting instead for a special mapping (for example: equisolid angle), which gives images a characteristic convex appearance.

In geometry, a solid angle (symbol: Ω) is the two-dimensional angle in three-dimensional space that an object subtends at a point. It is a measure of how large the object appears to an observer looking from that point. In the International System of Units (SI), a solid angle is a dimensionless unit of measurement called a steradian (symbol: sr). A small object nearby may subtend the same solid angle as a larger object farther away.

In an embodiment of the present technology, the image capturing device 14 further comprises a display (not shown) further comprising an optical display, a liquid crystal display (LCD), or a screen.

In an embodiment of the present technology, the image capturing device 14 further comprises a stereo digital camera. A stereo camera is a type of camera with two or more lenses. This allows the camera to simulate binocular vision, and therefore gives it the ability to capture three-dimensional images, a process known as stereo photography.

Stereo cameras may be used for making stereo views and 3-D pictures for movies, or for range imaging. 3-D Images Ltd., located in UK, produces a 3-D Digital Stereo camera—a fully automatic, time synchronized, digital stereo camera. Point Grey Research Inc., located in Canada produces binoculars or multiple array cameras that can provide full field of view 3 D measurements in an unstructured environment.

In an embodiment of the present technology, referring still to FIG. 1, the additional navigation device 22 (including the navigation processor 23) is configured to provide the initial position coordinates and orientation of the image-capturing device 14.

In an embodiment of the present technology, the additional navigation device 22 is selected from the group consisting of: a smart phone; a tablet, a laptop, and a personal navigation device.

A personal navigation assistant (PNA) also known as personal navigation device or portable navigation device (PND) is a portable electronic product which combines a positioning capability (such as GPS) and navigation functions The latest generation of PNA have sophisticated navigation functions and feature a variety of user interfaces including maps, turn-by-turn guidance and voice instructions. To reduce total cost of ownership and time to market, most modern PNA devices such as those made by Garmin Ltd., Mio Technology Ltd. or TomTom International BV. are running an off-the-shelf embedded operating system such as Windows CE or Embedded Linux on commodity hardware with OEM versions of popular PDA Navigation software packages such as TomTom Navigator, I-GO 2006, Netropa IntelliNav iGuidance, or Destinator.

Other manufacturers like Garmin and Magellan prefer to bundle their own software developed in-house. Because many of these devices use an embedded OS, many technically inclined users find it easy to modify PNAs to run third party software and use them for things other than navigation, such as a low-cost audio-video player or PDA replacement.

In an embodiment of the present technology, referring still to FIG. 1, the image-capturing device 14 (camera) is calibrated. This calibration is used to correct the images for lens 16 distortions. Typical calibrations correct for principal distance (focal length), principal point offset, radial distortion, tangential distortion, and other effects that can be found in any text book on photogrammetry. All image measurements are corrected with these calibration parameters.

In an embodiment of the present technology, referring still to FIG. 1, the calibrated image-capturing device 14 is configured to collect the K images (24, 26, through 28) in the i-frame; i is an integer In an embodiment of the present technology, referring still to FIG. 1, within each of the K images (24, 26, through 28) key-points are identified. The key-points are the features that are common in multiple frames. For example, in the first frame the key-points are: the key-point $i_1$ 30 in the image #1 24, the key-point $i_2$ 32 in the image #2 26, and key-point $i_K$ 34 in the image #K 28. These key-points should be tracked in the following frames. See discussion below.

In an embodiment of the present technology, referring still to FIG. 1, the obtained image data for the key-points ($i_1$ 30 in the image #1 24; $i_2$ 32 in the image #2 26; ... $i_K$ 34 in the image #K 28) is used within the bundle adjustment algorithm (please, see the discussion below) to estimate the position and orientation of the image-capturing device 14: the '6'-vector 40 including the position coordinates (x, y, z) as well as the orientation angels θ, φ, and ψ. The obtained image data for the key-points ($i_1$ 30 in the image #1 24; $i_2$ 32 in the image #2 26; ... $i_K$ 34 in the image #K 28) is also used within the bundle adjustment algorithm (please, see the discussion below) to obtain the position coordinates of the key-points: position coordinates 42 ($x_{i1}$, $y_{i1}$, $z_{i1}$) of the key-point $i_1$, the position coordinates 44 ($x_{i2}$, $y_{i2}$, $z_{i2}$) of the key-point $i_2$, and the position coordinates 46 ($x_{iK}$, $y_{iK}$, $z_{iK}$) of the key-point $i_K$.

In an embodiment of the present technology, referring still to FIG. 1, the algorithm 21 includes the rolling sequential bundle adjustment algorithm, which is the further development of the full bundle adjustment algorithm.

Given a set of images depicting a number of 3-D points from different viewpoints, the bundle adjustment can be defined as the problem of simultaneously refining the 3-D coordinates describing the scene geometry as well as the parameters of the relative motion and the optical characteristics of the image-capturing device (14 of FIG. 1) employed to acquire these images, according to an optimality criterion involving the corresponding image projections of all points.

The correspondence problem refers to the problem of ascertaining which parts of one image correspond to which parts of another image, where differences are due to movement of the camera, the elapse of time, and/or movement of objects in the photos.

Given two or more images of the same 3-D scene, taken from different points of view, the correspondence problem refers to the task of finding a set of points in one image which can be identified as the same points in another image. To do this, points or features in one image are matched with the corresponding points or features in another image. The images can be taken from a different point of view, at different times, or with objects in the scene in general motion relative to the image-capturing device (for example, a camera).

The correspondence problem can occur in a stereo situation when two images of the same scene are used, or can be generalized to the N-view correspondence problem. In the latter case, the images may come either from N different image-capturing devices (cameras) photographing at the same time or from one image-capturing device (camera) which is moving relative to the scene and collecting the image data from N-frames. The problem is made more difficult when the objects in the scene are in motion relative to the camera(s).

A typical application of the correspondence problem occurs in panorama creation or image stitching—when two or more images which only have a small overlap are to be stitched into a larger composite image. In this case it is necessary to be able to identify a set of corresponding points in a pair of images in order to calculate the transformation of one image to stitch it onto the other image.

There are two basic ways to find the key-points between two images: the correlation-based; and the feature based.

The correlation-based method includes checking if one location in one image looks/seems like another in another image.

The feature-based method includes finding features in an image and seeing if the layout of a subset of features is similar in the two images. To avoid the aperture problem a good feature should have local variations in two directions.

In computer vision applications the correspondence problem is studied for the case when a computer should solve it automatically with only images as input. Once the correspondence problem has been solved, resulting in a set of image points which are in correspondence, other methods can be applied to this set to reconstruct the position, motion and/or rotation of the corresponding 3-D points in the scene.

Example I

To find the correspondence between set A [1,2,3,4,5] and set B [3,4,5,6,7] find where they overlap and how far off one set is from the other. Here we see that the last three numbers in set A correspond with the first three numbers in set B. This shows that B is offset 2 to the left of A.

In most camera configurations, finding correspondences requires a search in two-dimensions. However, if the two cameras are aligned to be coplanar, the search is simplified to one dimension—a horizontal line parallel to the line between the cameras. Furthermore, if the location of a point in the left image is known, it can be searched for in the right image by searching left of this location along the line, and vice versa).

Image rectification is an equivalent, and more often used alternative to perfect camera alignment. Image rectification is usually performed regardless of camera precision because it may be impractical to perfectly align cameras, and even perfectly aligned cameras may become misaligned over time.

If the images to be rectified are taken from camera pairs without geometric distortion, this calculation can easily be made with a transformation including: (i) X & Y rotation that puts the images on the same plane, (ii) scaling that makes the image frames be the same size, and (iii) Z rotation & skew adjustments that make the image pixel rows directly line up. The rigid alignment of the cameras needs to be known (by calibration) and the calibration coefficients are used by the transform.

In performing the transform, if the cameras themselves are calibrated for internal parameters, an essential matrix provides the relationship between the cameras.

The more general case (without camera calibration) is represented by the fundamental matrix. If the fundamental matrix is not known, it is necessary to find preliminary point correspondences between stereo images to facilitate its extraction.

There are basically three algorithms for image rectification: planar rectification, cylindrical rectification, and polar rectification. A simple method is to compare small patches between rectified images. This works best with images taken with roughly the same point of view and either at the same time or with little to no movement of the scene between image captures, such as stereo images.

A small window is passed over a number of positions in one image. Each position is checked to see how well it compares with the same location in the other image. Also several nearby locations are also compared for the objects in one image may not be at exactly the same image-location in the other image. It is possible that there is no fit that is good enough. This may mean that the feature is not present in both images, it has moved farther than your search accounted for; it has changed too much, or is being hidden by other parts of the image.

The notion of Hough transform is important in understanding the bundle adjustment. More specifically, the Hough transform is a feature extraction technique used in image analysis, computer vision, and digital image processing.

The purpose of the Hough transform technique is to find imperfect instances of objects within a certain class of shapes by a voting procedure. This Hough voting procedure is carried out in a parameter space, from which object candidates are obtained as local maxima in a so-called accumulator space that is explicitly constructed by the algorithm for computing the Hough transform.

The classical Hough transform was concerned with the identification of lines in the image, but later the Hough transform has been extended to identifying positions of arbitrary shapes, most commonly circles or ellipses.

There are several examples of a feature-based 3-D reconstruction algorithm.

Scale-invariant feature transform (or SIFT) is an algorithm in computer vision designed to detect and describe local features in images. The algorithm was published by David Lowe in 1999. This algorithm uses the Hough transform. Applications include object recognition, robotic mapping and navigation, image stitching, 3-D modeling, gesture recognition, video tracking, individual identification of wildlife and match moving. The algorithm is patented in the US; the owner is the University of British Columbia. Please, see U.S. Pat. No. 6,711,293, entitled "Method and apparatus for identifying scale invariant features in an image and use of same for locating an object in an image" and issued to David G. Lowe.

According to the scale-invariant feature transform (or SIFT) algorithm, for any object in an image, interesting points on the object can be extracted to provide a "feature description" of the object. This description, extracted from a training image, can then be used to identify the object when attempting to locate the object in a test image containing many other objects. To perform reliable recognition, it is important that the features extracted from the training image be detectable even under changes in image scale, noise and illumination. Such points usually lie on high-contrast regions of the image, such as object edges.

Another important characteristic of these features is that the relative positions between them in the original scene shouldn't change from one image to another. For example, if only the four corners of a door were used as features, they would work regardless of the door's position; but if points in the frame were also used, the recognition would fail if the door is opened or closed. Similarly, features located in articulated or flexible objects would typically not work if any change in their internal geometry happens between two images in the set being processed.

However, in practice SIFT detects and uses a much larger number of features from the images, which reduces the contribution of the errors caused by these local variations in the average error of all feature matching errors.

Lowe's patented method can robustly identify objects even among clutter and under partial occlusion, because his SIFT feature descriptor is invariant to uniform scaling, orientation, and partially invariant to affine distortion and illumination changes. This section summarizes Lowe's object recognition method and mentions a few competing techniques available for object recognition under clutter and partial occlusion.

SIFT key-points of objects are first extracted from a set of reference images and stored in a database. An object is recognized in a new image by individually comparing each feature from the new image to this database and finding candidate matching features based on Euclidean distance of their descriptor vectors. From the full set of matches, subsets of key-points that agree on the object and its location, scale, and orientation in the new image are identified to filter out good matches. The determination of consistent clusters is performed rapidly by using an efficient hash table implementation of the generalized Hough transform. Each cluster of 3 or more features that agree on an object and its pose is then subject to further detailed model verification and subsequently outliers are discarded. Finally the probability that a particular set of features indicates the presence of an object is computed, given the accuracy of fit and number of probable false matches. Object matches that pass all these tests can be identified as correct with high confidence. Table I summarizes the advantages of using SIFT algorithm in the image analysis.

TABLE I

| Problem | Technique | Advantage |
| --- | --- | --- |
| Key/localization scale/rotation | DoG/scale-space pyramid/orientation assignment | Accuracy, stability, scale & rotational invariance |
| Geometric distortion | Blurring/resampling of local image orientation planes | Affine invariance |
| Indexing and matching | Nearest neighbor/Best Bin First search | Efficiency/speed |
| Cluster identification | Hough Transform voting | Reliable pose models |
| Model verification/outlier detection | Linear least squares | Better error tolerance with fewer matches |
| Hypothesis acceptance | Bayesian Probability analysis | Reliability |

Match moving algorithm is another 3-D reconstruction algorithm. In cinematography, match moving is a cinematic technique that allows the insertion of computer graphics into live-action footage with correct position, scale, orientation, and motion relative to the photographed objects in the shot. The term is used loosely to describe several different methods of extracting camera motion information from a motion picture. Sometimes referred to as motion tracking or camera solving, match moving is related to rotoscoping and photogrammetry. Rotoscoping is an animation technique in which animators trace over footage, frame by frame, for use in live-action and animated films.

Match moving is sometimes confused with motion capture, which records the motion of objects, often human actors, rather than the camera. Typically, motion capture requires special cameras and sensors and a controlled environment. Match moving is also distinct from motion control photography, which uses mechanical hardware to execute multiple identical camera moves. Match moving, by contrast, is typically a software-based technology, applied after the fact to normal footage recorded in uncontrolled environments with an ordinary camera.

Match moving is primarily used to track the movement of a camera through a shot so that an identical virtual camera move can be reproduced in a 3-D animation program. When new animated elements are composited back into the original live-action shot, they will appear in perfectly-matched perspective and therefore appear seamless By using SIFT or match moving algorithm to analyze a set of image data captured by an image-capturing device, it is possible to obtain the estimation of position of an object.

The SIFT or match moving algorithms never actually compute the pose of objects, only the pose of the camera. If the geometry of an object is known, the pose of the camera can be determined relative to that object. In this implementation, only key-points are used in which their positions are estimated.

The Bundle adjustment algorithm is used as the last step of every feature-based 3-D reconstruction algorithm. It amounts to an optimization problem on the 3-D structure and viewing parameters (i.e., camera pose and possibly intrinsic calibration and radial distortion), to obtain a reconstruction which is optimal under certain assumptions regarding the noise pertaining to the observed image features.

If the image error is zero-mean Gaussian, then bundle adjustment is the Maximum Likelihood Estimator. Its name refers to the bundles of light rays originating from each 3-D feature and converging on each camera's optical center, which are adjusted optimally with respect to both the structure and viewing parameters.

In statistics, Maximum-Likelihood estimation (MLE) is a method of estimating the parameters of a statistical model. When applied to a data set and given a statistical model, maximum-likelihood estimation provides estimates for the model's parameters.

In general, for a fixed set of data and underlying statistical model, the method of maximum likelihood selects the set of values of the model parameters that maximizes the likelihood function. Intuitively, this maximizes the "agreement" of the selected model with the observed data, and for discrete random variables it indeed maximizes the probability of the observed data under the resulting distribution. Maximum-likelihood estimation gives a unified approach to estimation, which is well-defined in the case of the normal distribution and many other problems.

Bundle adjustment boils down to minimizing the re-projection error between the image locations of observed and predicted image points, which is expressed as the sum of squares of a large number of nonlinear, real-valued functions.

The re-projection error is a geometric error corresponding to the image distance between a projected point and a measured one. It is used to quantify how closely an estimate of a 3-D point recreates the point's true projection.

Minimizing the re projection error can be used for estimating the error from point correspondences between two images. The correspondences can be interpreted as imperfect images of a world point and the re-projection error quantifies their deviation from the true image projections.

Thus, the minimization of the re projection error can be achieved by using nonlinear least-squares algorithms. Of these, Levenberg-Marquardt has proven to be one of the most successful due to its ease of implementation and its use of an effective damping strategy that lends it the ability to converge quickly from a wide range of initial guesses.

Various more-or-less heuristic arguments have been put forward for the best choice for the damping parameter $\lambda$. Theoretical arguments exist showing why some of these choices guaranteed local convergence of the algorithm; however these choices can make the global convergence of the algorithm suffer from the undesirable properties of steepest-descent, in particular very slow convergence close to the optimum.

Marquardt recommended starting with a value $\lambda_0$ and a factor $v>1$. Initially setting $\lambda=\lambda_0$ and computing the residual sum of squares after one step from the starting point with the damping factor of $\lambda=\lambda_0$ and secondly with $\lambda_0/v$. If both of these are worse than the initial point then the damping is increased by successive multiplication by $v$ until a better point is found with a new damping factor of $\lambda_0 v^k$ for some k.

If use of the damping factor $\lambda/v$ results in a reduction in squared residual then this is taken as the new value of $\lambda$ (and the new optimum location is taken as that obtained with this damping factor) and the process continues; if using $\lambda/v$ resulted in a worse residual, but using $\lambda$ resulted in a better residual, then $\lambda$ is left unchanged and the new optimum is taken as the value obtained with $\lambda$ as damping factor.

When solving the minimization problems arising in the framework of bundle adjustment, the normal equations have a sparse block structure owing to the lack of interaction among parameters for different 3-D points and cameras. This can be exploited to gain tremendous computational benefits by employing a sparse variant of the Levenberg-Marquardt algorithm which explicitly takes advantage of the normal equations zeros pattern, avoiding storing and operating on zero elements.

Bundle adjustment amounts to jointly refining a set of initial camera and structure parameter estimates for finding the set of parameters that most accurately predict the locations of the observed points in the set of available images.

The full bundle adjustment is the optimal solution and makes use of all images. However, it requires all images to be collected before any processing can be completed and is not a real-time solution.

In the pair-wise or triplet pose change technique, only 2 or 3 images are used to estimate the change in position and orientation over the image set. When summed up over many images, a trajectory can be estimated. For example, see the U.S. Pat. No. 7,336,814 entitled "Method and apparatus for machine-vision". However, the solution provided by this a technology is prone to drift over time due to the loss of connection between even 2 or 3 images over time.

Kalman filter also can be used to estimate the current position and orientation (pose) of an object.

More specifically, the Kalman filter, also known as linear quadratic estimation (LQE), is an algorithm that uses a series of measurements observed over time, containing noise (random variations) and other inaccuracies, and produces estimates of unknown variables that tend to be more precise than those based on a single measurement alone.

The Kalman filter has numerous applications in technology. A common application is for guidance, navigation and control of vehicles, particularly aircraft and spacecraft. Furthermore, the Kalman filter is a widely applied concept in time series analysis used in fields such as signal processing and econometrics.

The Kalman filter algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state; no additional past information is required.

From a theoretical standpoint, the main assumption of the Kalman filter is that the underlying system is a linear dynamical system and that all error terms and measurements have a Gaussian distribution (often a multivariate Gaussian distribution).

However, a solution provided by the Kalman drifts over time due to loss of connection between images thus making it difficult to use the Kalman filter for real time applications.

The present technology of the rolling bundle adjustment, as it is explained below, is an improvement over the prior art techniques of bundle adjustment algorithm because it allows to significantly decrease the amount of computation time thus making possible the real time determination of the pose of the image-capturing device.

Indeed, as it is fully explained below, with each new frame, the rolling bundle adjustment algorithm prescribes removing the position and orientation states associated with the oldest frame and adding position and orientation states for the new frame. An initial estimate of the current frames position and orientation can be made by simply using the previous frames position and orientation estimate. The image locations of the key-points from the last frame are then identified in the new frame. These image measurements are then added to the estimation process using the method of sequential least squares which is much more efficient than completely running the bundle adjustment on the last N frames.

In the embodiment of the present technology, as shown in FIG. 1, the general processor 20 of FIG. 1 is configured to execute the algorithm 21 of FIG. 1 further comprising a rolling bundle adjustment algorithm. The rolling bundle adjustment algorithm computes a bundle adjustment using N frames every time a new frame is available. This is the starting point for this new technique, however the rolling bundle adjustment algorithm uses sequential least squares to add the new frame rather than completely redo the bundle adjustment. Please, full discussion below.

The rolling bundle adjustment algorithm of the present technology is basically a cross between a Kalman filter and the rolling bundle adjustment. Although implemented using sequential least squares, the mathematics are identical to a Kalman filter that retains the previous N−1 frame position and orientation states.

Example II

In general for N frames the tracking algorithm has to track at least 5 key-points through all N frames for bundle adjustment algorithm to work. How many minimum key-points the tracking algorithm has to track if only 5 frames were taken? The answer is still 5 key-points. Indeed, assume that for N taken frames; and K key-points are being tracked. This means the number of unknowns is $N*6+K*3$ (position and orientation per frame plus the positions of the key-points) while the number of measurements is $N*K*2$ (2 measurements per key point per frame). So if N=5, there are $(30+K*3)$ unknowns and $10*K$ measurements. Since, more measurements than unknowns are required for a problem to be at least determined (or over-determined, but not under-determined): $10*K>(30+3*K)$, so $K>30/7$ or $K>=5$.

Example III

Figure 2:
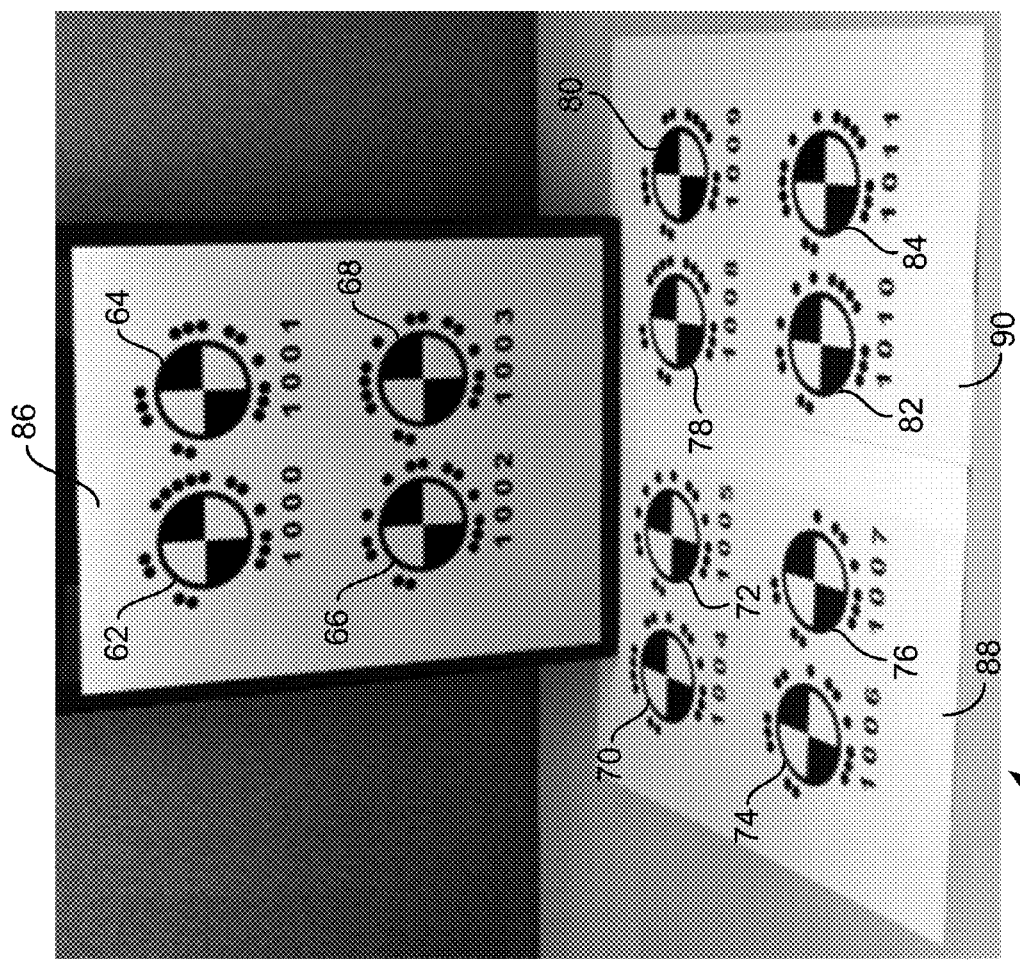
FIG. 2 illustrates a frame from the 720 p video (1280× 720) sequence taken at 25 frames per second by Nikon D 800 camera using 35 mm lens for the purposes of the present technology.

FIG. 2 illustrates a frame from the video sequence 60 taken from a Nikon D 800 camera using a 35 mm lens. All images include at least four key-points: image 60 includes the key-points 62 through 88. The camera was set to collect 720 p video (1280×720) at 25 frames per second. Calibration parameters for the camera/lens were pre-computed using the Open CV camera calibration routines. It should be noted that the calibration parameters may also be estimated on the fly as part of the process, however this was not done in this test. The round targets (1000-1011) (or key-points 62, 64, 66 68, 70, 72, 74 76, 78, 80, 82 and 84), were tracked throughout the sequence while the camera was moved (keeping the targets in view at all times to simplify the test). For this example the number of frames used in the rolling bundle adjustment is 25, i.e. 1 second of data.

In order for the rolling bundle adjustment algorithm of the present technology to work, the system should be initialized. For example, the additional navigation device 22 (of FIG. 1) can be used to obtain the initial position coordinates of the image-capturing device 14.

In the embodiment of the present technology, after the initialization is done, but before any estimation can be done, the key-points are identified by using 3 non-collinear targets with known absolute or relative positions. This can be done for the example by automatically identifying the target centers using an existing algorithm within Trimble. The choice of these points can be an important decision. If the initial set of points is able to sufficiently define a datum, the estimated camera positions and orientations can be in this datum and be appropriately scaled.

In the embodiment of the present technology, before any estimation can be done, the key-points are identified by using a key-point detection algorithm such as Sift, Surf, BRISK, etc. Many of these algorithms are already implemented within Open CV.

When natural features are used, an arbitrary coordinate system (not shown) can be defined. If a distance measurement is visible in the images it can be used to correctly scale the solution, otherwise the estimates will also be arbitrarily scaled (i.e. the estimated positions will require a similarity transformation to obtain world coordinates). Alternatively, if the location of the camera can be determined via some other positioning system (say GNSS), these camera location estimates can be used to scale the solution as well as define the required datum.

In the embodiment of the present technology, referring still to FIG. 1, once the key-point 30 has been found in the first image 24, the corresponding key-points should be found in the following frames (not shown). This can be done by using key-point descriptors or tracking algorithms such as the Lucas-Kanade tracking algorithm.

The Lucas-Kanade method is a widely used differential method for optical flow estimation developed by Bruce D. Lucas and Takeo Kanade. It assumes that the flow is essentially constant in the proximity of the pixel under consideration, and solves the basic optical flow equations for all the pixels in that vicinity, by the least squares criterion. By combining information from several nearby pixels, the Lucas-Kanade method can often resolve the inherent ambiguity of the optical flow equation. It is also less sensitive to image noise than point-wise methods. On the other hand, since it is a purely local method, it cannot provide flow information in the interior of uniform regions of the image.

The Kanade-Lucas-Tomasi (KLT) feature tracker is an approach to feature extraction. It is proposed mainly for the purpose of dealing with the problem that traditional image registration techniques are generally costly. KLT makes use of spatial intensity information to direct the search for the position that yields the best match. It is faster than traditional techniques for examining far fewer potential matches between the images.

In an embodiment of the present technology, the rolling sequential bundle adjustment algorithm (21 of FIG. 1) needs at least 5 key-points for each frame when K=1.

Figure 6:
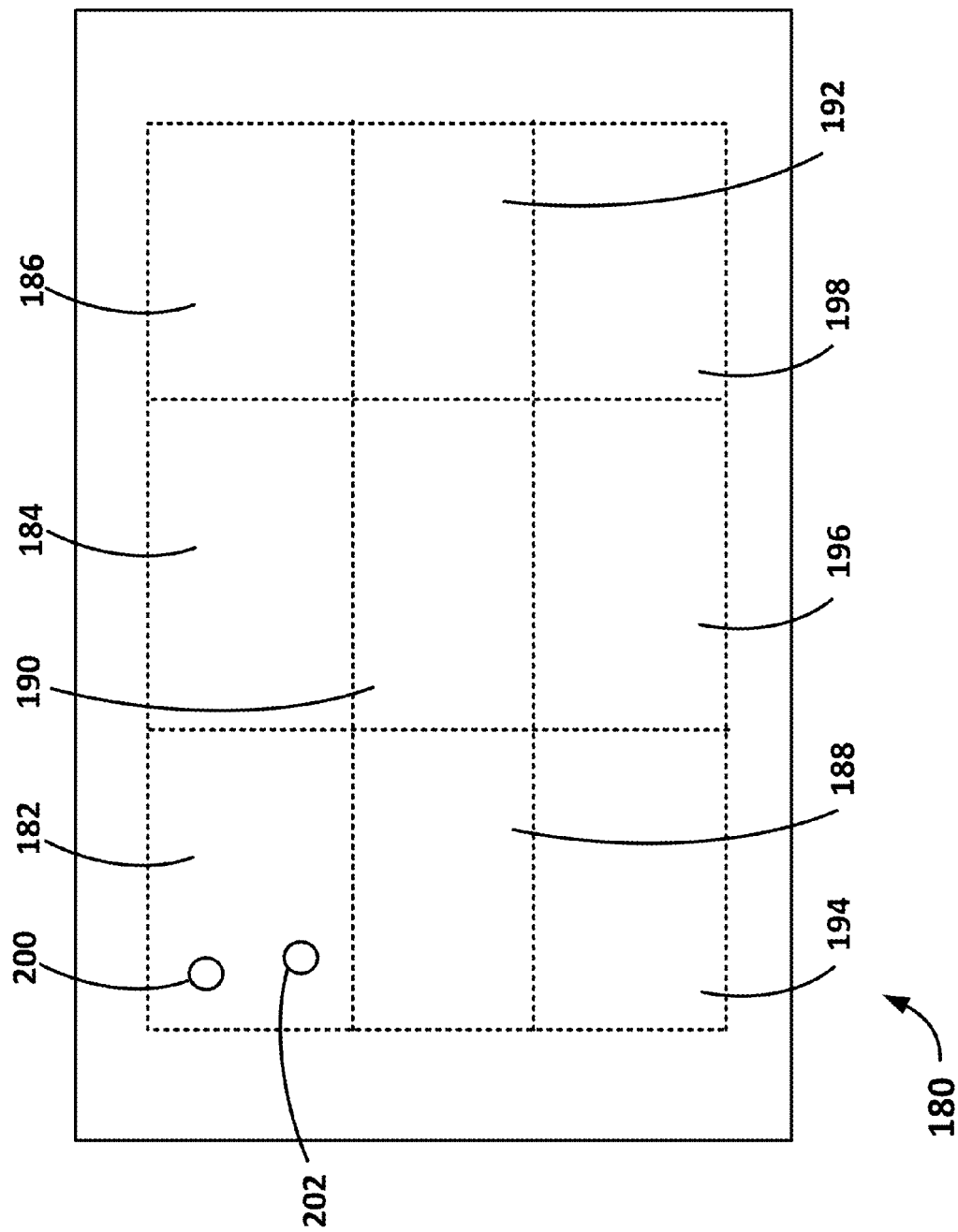
FIG. 6 depicts an image including a number of segments, each segment including a minimum number of tracked features for the purposes of the present technology.

In an embodiment of the present technology, as shown in FIG. 6, to ensure good geometry while also keeping the number of tracked features low is to segment the image 180 into sections (182, 184, 186, 188, 190, 192, 194, 199 and 198) and attempt to track a minimum two key-points (200 and 202) in each segment in the subsequent frames.

In an embodiment of the present technology, one of the requirements for the imagery is that the corresponding images (in consequent frames) have a significant overlap (say >50%) with one another. The frame rate required to maintain such overlap is dependent on the camera dynamics. Higher dynamics will require a higher frame rate.

In an embodiment of the present technology, an alternative approach to using a constant frame rate is to collect images whenever the camera moves a given distance or changes orientation by a maximum rotation. This approach requires a secondary source of position, velocity, and/or orientation to control the camera shutter.

In an embodiment of the present technology, referring still to FIG. 1, the collected image data is next fed into a least squares bundle adjustment algorithm 21 which estimates the position and orientation of the image-capturing device 14 for each frame (6'-vector 40 including the position coordinates (x, y, z) as well as the orientation angels θ, φ, and ψ) as well as the 3-D coordinates of the tracked key-points: position coordinates 42 data $(x_{i1}, y_{i1}, z_{i1})$ for the key-point $i_1$, the position coordinates 44 data $(x_{i2}, y_{i2}, z_{i2})$ for the key-point $i_2$, and the position coordinates 46 data $(s_{ick}, y_{iK}, z_{iK})$ for the key-point $i_K$.

The fundamental equations that are solved in the estimation are known as the collinearity equations. The collinearity equations are a set of two equations, used in photogrammetry and remote sensing to relate coordinates in a sensor plane (in two dimensions) to object coordinates (in three dimensions). The equations originate from the central projection of a point of the object through the optical center of the camera to the image on the sensor plane.

Figure 4:
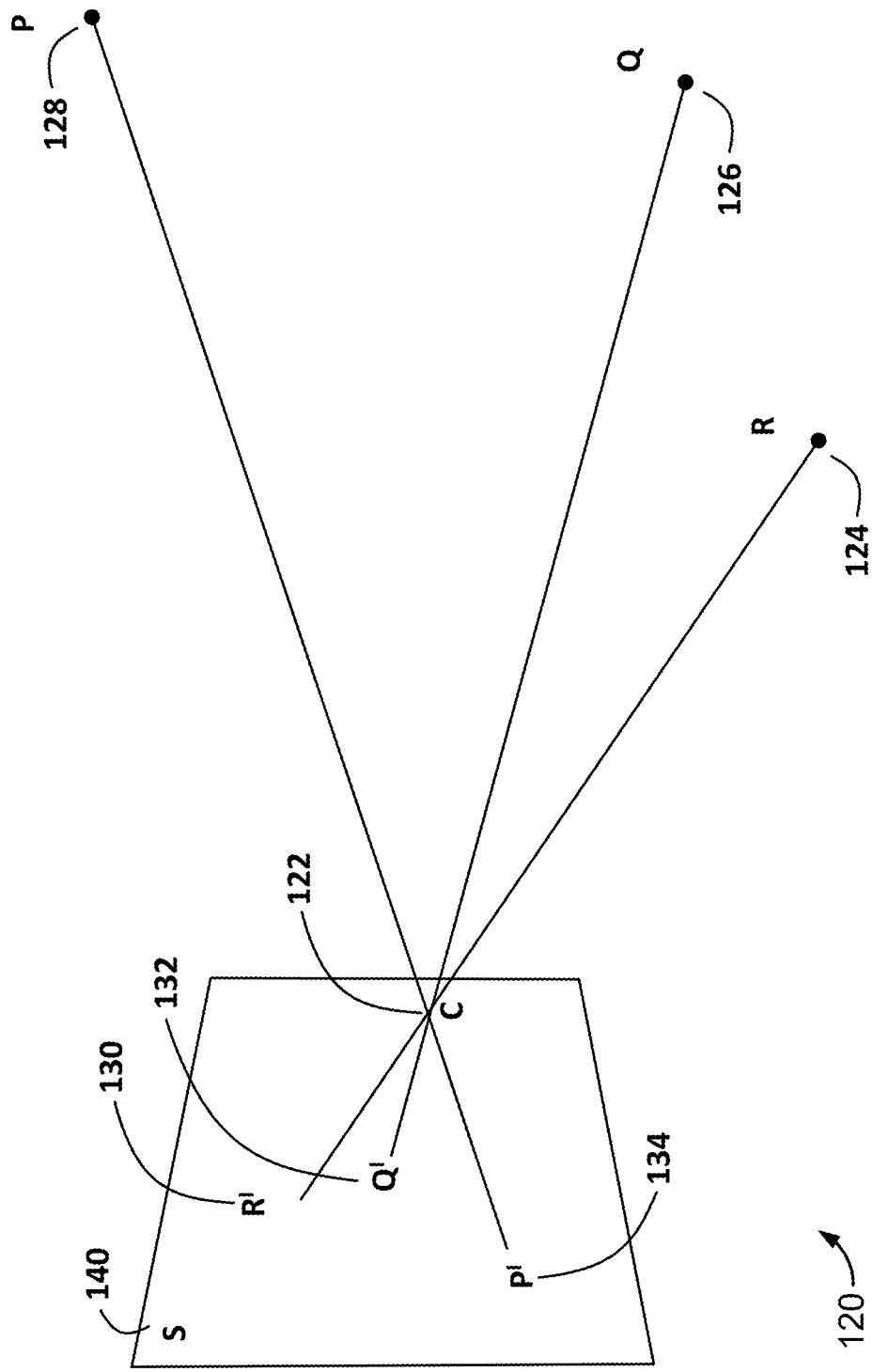
FIG. 4 shows 2-D projections of 3-D points on a plane by using a pinhole camera for the purposes of the present technology.
Figure 5:
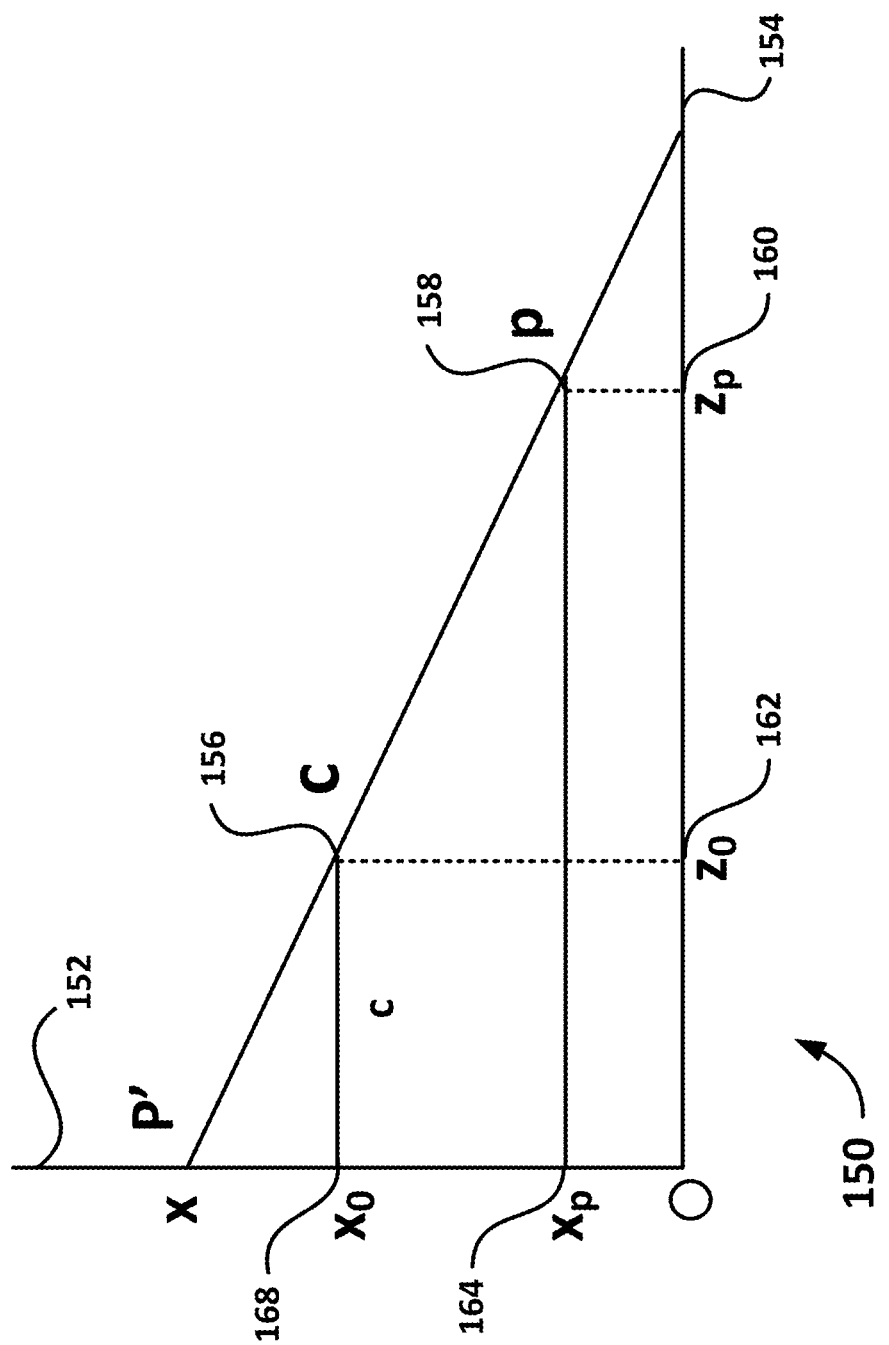
FIG. 5 illustrates x- and z-coordinates of the 2-D projection of a 3-D point through a projection center of a pinhole camera for the purposes of the present technology.

FIGS. 3, 4, and 5 illustrate the geometry that is utilized in collinearity equations.

More specifically, FIG. 3 depicts light beams 104 and 106 passing through the pinhole 102 of a pinhole camera 108.

FIG. 4 shows 2-D projection 134 of 3-D point 128 (2-D projection 130 of 3-D point 124, and 2-D projection 132 of 3-D point 126) on a plane 140 by using a pinhole camera with the center 122.

FIG. 5 illustrates x (168) and z (162) coordinates of 2-D projection C 156 of 3-D point through a projection center 102 of the pinhole camera 108 of FIG. 3, as well as x (164) and z (160) coordinates of 2-D projection P 158 of 3-D point through the projection center 102 of the pinhole camera 108 of FIG. 3.

Derivation and details of the collinearity equations can be found in any textbook on photogrammetry. One possible derivation (please, see for the reference "Elements of Photogrammetry" by Paul R. Wolf, published by McGraw-Hill, 2000) results in the following:

$$x_a = -c\left[\frac{m_{11}(X_a - X_l) + m_{12}(Y_a - Y_l) + m_{13}(Z_a - Z_l)}{m_{31}(X_a - X_l) + m_{32}(Y_a - Y_l) + m_{33}(Z_a - Z_l)}\right] \quad \text{(Eq. 1)}$$

$$y_a = -c\left[\frac{m_{21}(X_a - X_l) + m_{22}(Y_a - Y_l) + m_{23}(Z_a - Z_l)}{m_{31}(X_a - X_l) + m_{32}(Y_a - Y_l) + m_{33}(Z_a - Z_l)}\right] \quad \text{(Eq. 2)}$$

$$m = \begin{bmatrix} m_{11} & m_{12} & m_{13} \\ m_{21} & m_{22} & m_{23} \\ m_{31} & m_{32} & m_{33} \end{bmatrix} \quad \text{(Eq. 3)}$$

$$m = \begin{bmatrix} \cos\phi\cos\kappa & \sin\omega\sin\phi\cos\kappa + \cos\omega\sin\kappa & -\cos\omega\sin\phi\cos\kappa + \sin\omega\sin\kappa \\ -\cos\phi\sin\kappa & -\sin\omega\sin\phi\sin\kappa + \cos\omega\cos\kappa & \cos\omega\sin\phi\sin\kappa + \sin\omega\cos\kappa \\ \sin\phi & -\sin\omega\cos\phi & \cos\omega\cos\phi \end{bmatrix} \quad \text{(Eq. 4)}$$

where $x_a$ is the measured x image coordinate of point a;
$y_a$ is the measured y image coordinate of point a;
$X_a, Y_a, Z_a$ are the world coordinates of point a;
$X_l, Y_l, Z_l$ are the world coordinates of camera l;
ω, φ, κ are the Euler angle rotations of camera l;
c is the principal distance (approximately the focal length of the camera);
m is the rotation matrix from the camera coordinate system to the world coordinate system.

Figure 7:
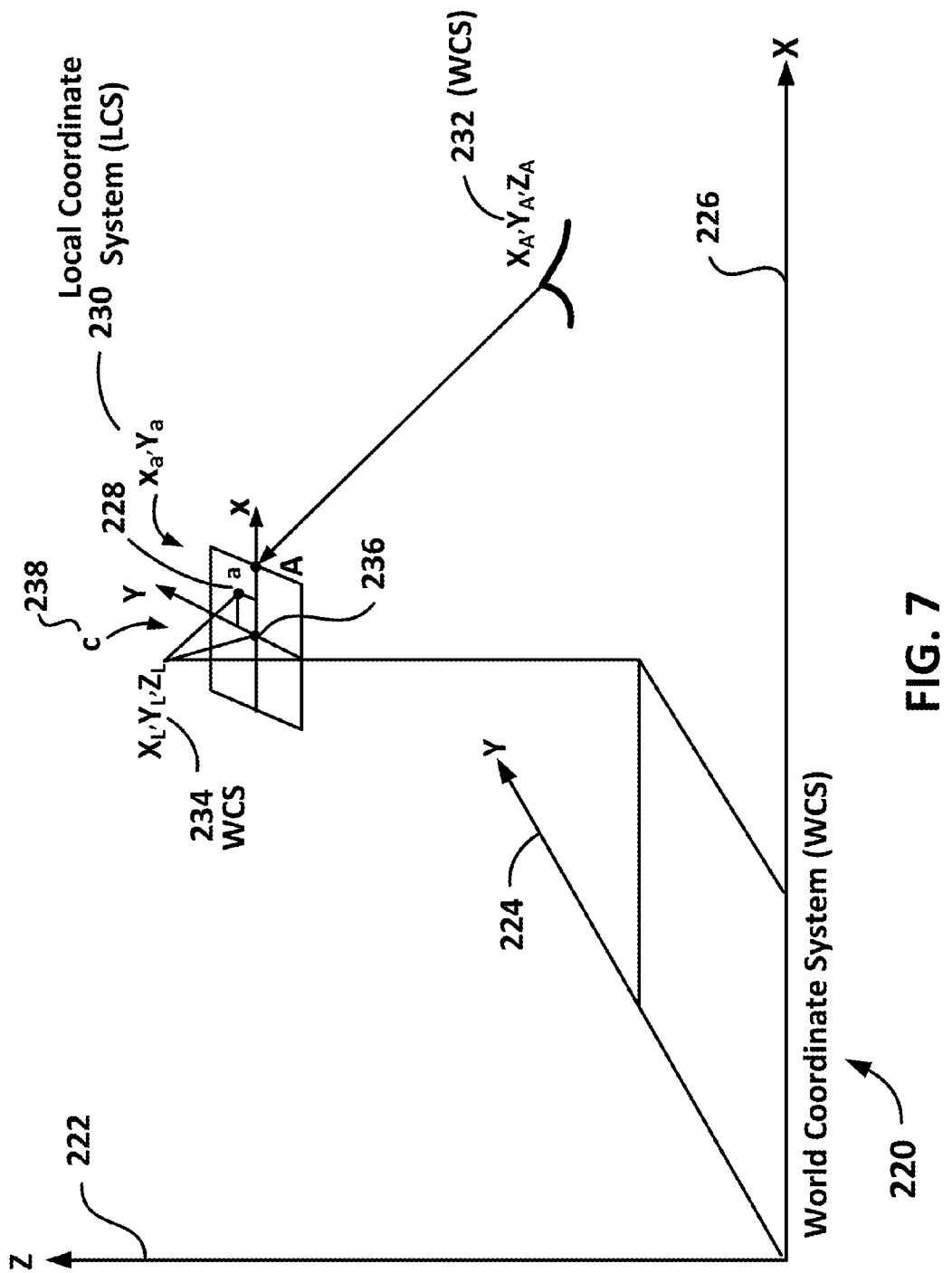
FIG. 7 illustrates the solution of collinearity equations utilized for estimation of camera position and orientation for each frame and for estimating 3-D coordinates of the tracked key-points system for the purposes of the present technology.

In an embodiment of the present technology, FIG. 7 illustrates the geometry involved in formulation of collinearity equations (Eq. 1 and Eq. 2) with the matrix m given by (Eq. 3 and Eq. 4) that are utilized for estimation of camera position and orientation for each frame and for estimating 3-D coordinates of the tracked key-points.

Referring still to FIG. 7, 3-D coordinates $(X_A, Y_A, Z_A)$ of 3-D point A in World Coordinate System (WCS) (X 226, Y 224, Z 222) are indicated by point 232, whereas 3-D coordinates $(X_L, Y_L, Z_L)$ of 3-D point of the camera center L in World Coordinate System (WCS) are indicated by point 236.

Referring still to FIG. 7, 2-D coordinates $(x_a, y_a)$ of the point a in 2-D camera Local Coordinate System (LCS) (camera frame plane) are shown by point 230.

Example IV

Referring still to FIG. 2, suppose that the 12 targets (62, 64, 66, 68, 70, 72, 74, 76, 78, 80, 82, and 84) are tracked and their coordinates are known. Each image results in 2 measurements (x and y) per target per frame resulting in 2*12*25=1200 measurements for 25 frames. The unknowns in this example would be the position and orientation of the image-capturing device (14 of FIG. 1) (including camera Nikon D 800 camera using a 35 mm lens) per frame, i.e. 6*25=150 unknowns. Clearly the minimum number of image measurements should be 150/25/2=3. In the case where an additional 3 natural features are tracked, there would be an additional 3*2*25=150 measurements as well as an additional 3*3=9 unknowns (XYZ for each of the three points). Additional measurements to known or unknown points can add significant geometric strength to the estimation resulting in estimates with less noise.

In an embodiment of the present technology, the collinearity equations (Eq. 1 and Eq. 2) with the matrix m given by (Eq. 3 and Eq. 4) are re-formulated in terms of least squares adjustment for the purposes of optimal estimation.

More specifically, in an embodiment of the present technology, the basic least squares equations for the above problem are summarized as follows:

$$\hat{l} = f(\hat{x}) \quad \text{(Eq. 5)}$$

$$\hat{r} = A\hat{\delta} + w \quad \text{(Eq. 6)}$$

$$w = f(x^\circ) - l \quad \text{(Eq. 7)}$$

$$\hat{\delta} = -N^{-1}u = -(A^T C_l^{-1} A)^{-1} A^T C_l^{-1} w \quad \text{(Eq. 8)}$$

$$C_{\hat{x}} = N^{-1} \quad \text{(Eq. 9)}$$

Where
  $\hat{l}$ is a vector of adjusted observations;
  $f(\hat{x})$ is the collinearity equations evaluated at $\hat{x}$;
  $x^\circ$ is the current estimate of the state x;
  $\hat{r}$ is a vector of residuals;
  A is a Jacobean matrix (partial derivatives of the collinearity equations w.r.t. the unknowns);
  $\hat{\delta}$ is a vector of corrections to the unknown parameters;
  w is a vector of misclosures;
  $C_l$ is the covariance matrix for the measurements;
  $C_{\hat{x}}$ is the covariance matrix for the estimated parameters.

One of the most time consuming operations in the estimation is the inversion of the matrix (N) with the number of rows and columns equal to the number of unknown states. Given the iterative nature of least squares, this matrix may require inversion once per iteration.

In an embodiment of the present technology, as was disclosed above, once the initialization has been completed, the camera positions and orientations for the first N frames have been estimated along with the positions of the selected key-points. The next step is to continue estimating the camera states the as new subsequent frames (N+1, N+2, etc.) become available.

Figure 8:
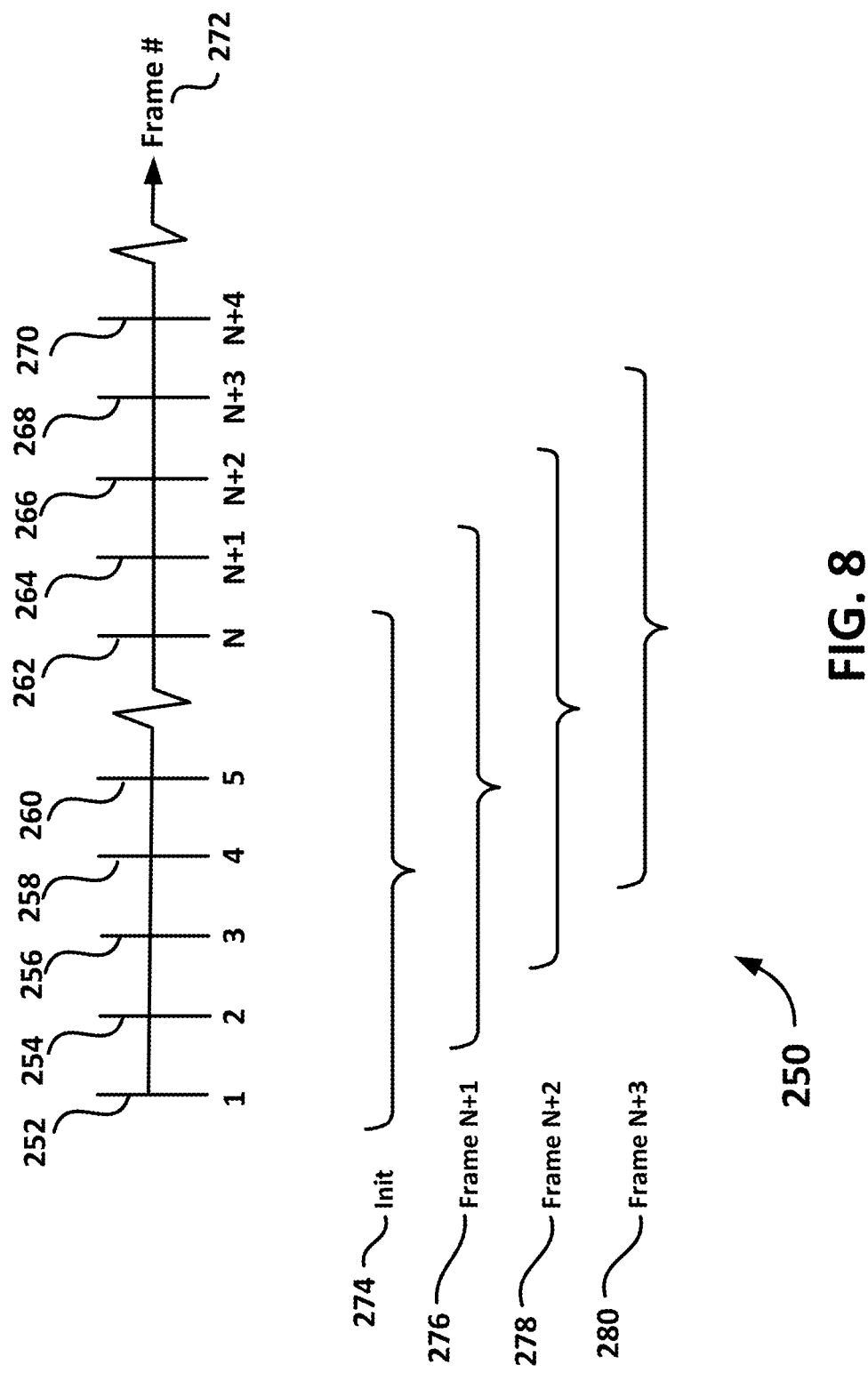
FIG. 8 shows the sequential update in estimation of camera positions and orientation from the initial N frames to the subsequent (N+1) frames while using the rolling sequential bundle adjustment algorithm for the purposes of the present technology.

In an embodiment of the present technology, FIG. 8 shows the rolling adjustment sequential update algorithm 250 in estimation of camera positions and orientation from the initial N frames to the subsequent (N+1) frames.

More specifically, the bundle adjustment algorithm solution based on the initial N frames (from 252 and up to 262) is schematically noted as the initial solution 274, whereas the bundle adjustment algorithm solution based on (N+1) frames (from 252 and up to 264) is schematically noted as the subsequent solution 276.

When a new frame becomes available, the oldest frame is removed from the state estimation. The rows and columns associated with the frame to be removed are replaced with initial estimates for the newest frame. This initial estimate of the camera position and orientation at the new frame may be computed from the estimated key-points or if the frame rate is high relative to the camera dynamics the estimate can simply be set to the same values as the previous frame.

In an embodiment of the present technology, the rolling sequential update is accomplished in a sequential manner using the following equations:

$$\hat{\delta}^{(+)} = \hat{\delta}^{(-)} - K[w_2 + A_2 \hat{\delta}^{(-)}] \quad \text{(Eq. 10)}$$

$$C_{\hat{x}}^{(+)} = N_1^{-1} - K A_2 N_1^{-1} \quad \text{(Eq. 11)}$$

$$\text{(Eq. } K = N_1^{-1} A_2^T [C_l + A_2 N_1^{-1} A_2^T]^{-1} \quad \text{12)}$$

Where (+), (−) indicate parameters before and after the measurement update.

The major advantage of this technique is that the only new inversion required for the sequential update is the matrix contained within the gain term K. The matrix to be inverted is a square matrix with the dimensions equal to the number of new measurements associated with the new image.

Example V

For the Examples III and IV outlined above in which 12 key-points are tracked, the required inversion would be on a 24×24 matrix. This is compared to re-computing the bundle adjustment with all N frames which would require an inversion of a matrix with dimensions of 25*6×25*6=150×150.

One of the practical justifications of the present algorithm of rolling sequential bundle adjustment that utilizes images to track position and orientation changes is that some key-points will no longer be visible as the camera moves.

This requires that the no longer visible key-points be removed from the estimation as they no longer provide useful information. This removal is accomplished by simply removing the associated rows and columns in the state and covariance matrices. Also, as the camera moves it will become necessary to identify and track new key-points and add them into the estimation. Once a new key-point is identified, it should be tracked over multiple images in order to compute initial coordinates which can then be used to insert the associated position into the state and covariance matrices.

Figure 9:
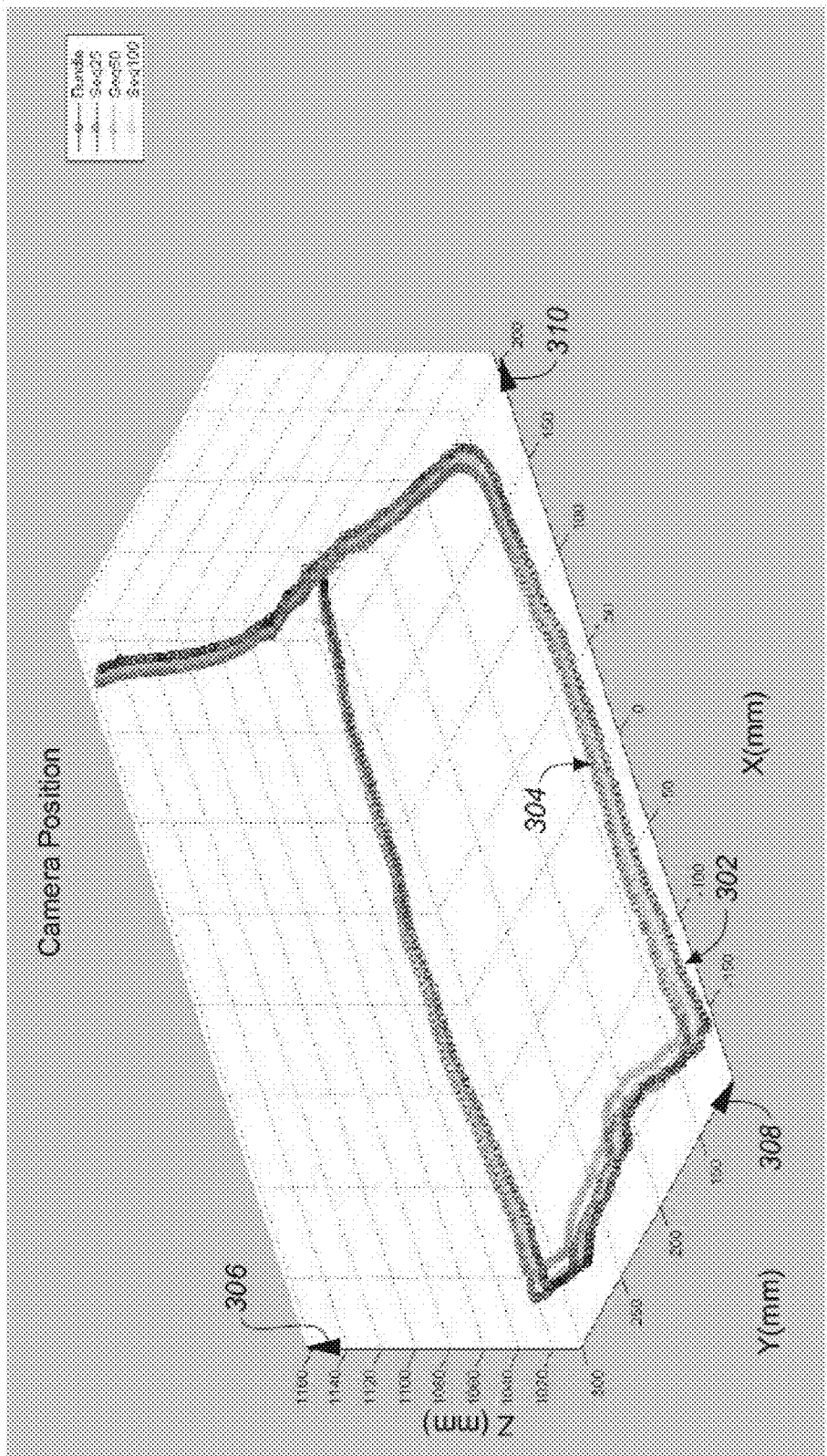
FIG. 9 depicts the comparison of the output camera trajectories obtained by employing the rolling sequential bundle adjustment algorithm of the present technology and obtained by employing the prior art bundle adjustment algorithm for values of number of frames used: N=25, 50, and 100.

FIG. 9 depicts in the Global Coordinate System X (310), Y (308) and Z (306) the comparison 300 of the output camera trajectories (302 and 304) obtained by employing the rolling sequential bundle adjustment algorithm of the present technology and obtained by employing the prior art bundle adjustment algorithm for values of number of frames used: N=25, 50, and 100.

The results illustrated in FIG. 9 demonstrate the proof of concept that the results obtained by employing the rolling sequential bundle adjustment algorithm of the present technology and obtained by employing the prior art bundle adjustment algorithm are very close, but the method of the present technology of employing the rolling sequential bundle adjustment algorithm required exponential less computing time.

Figure 10:
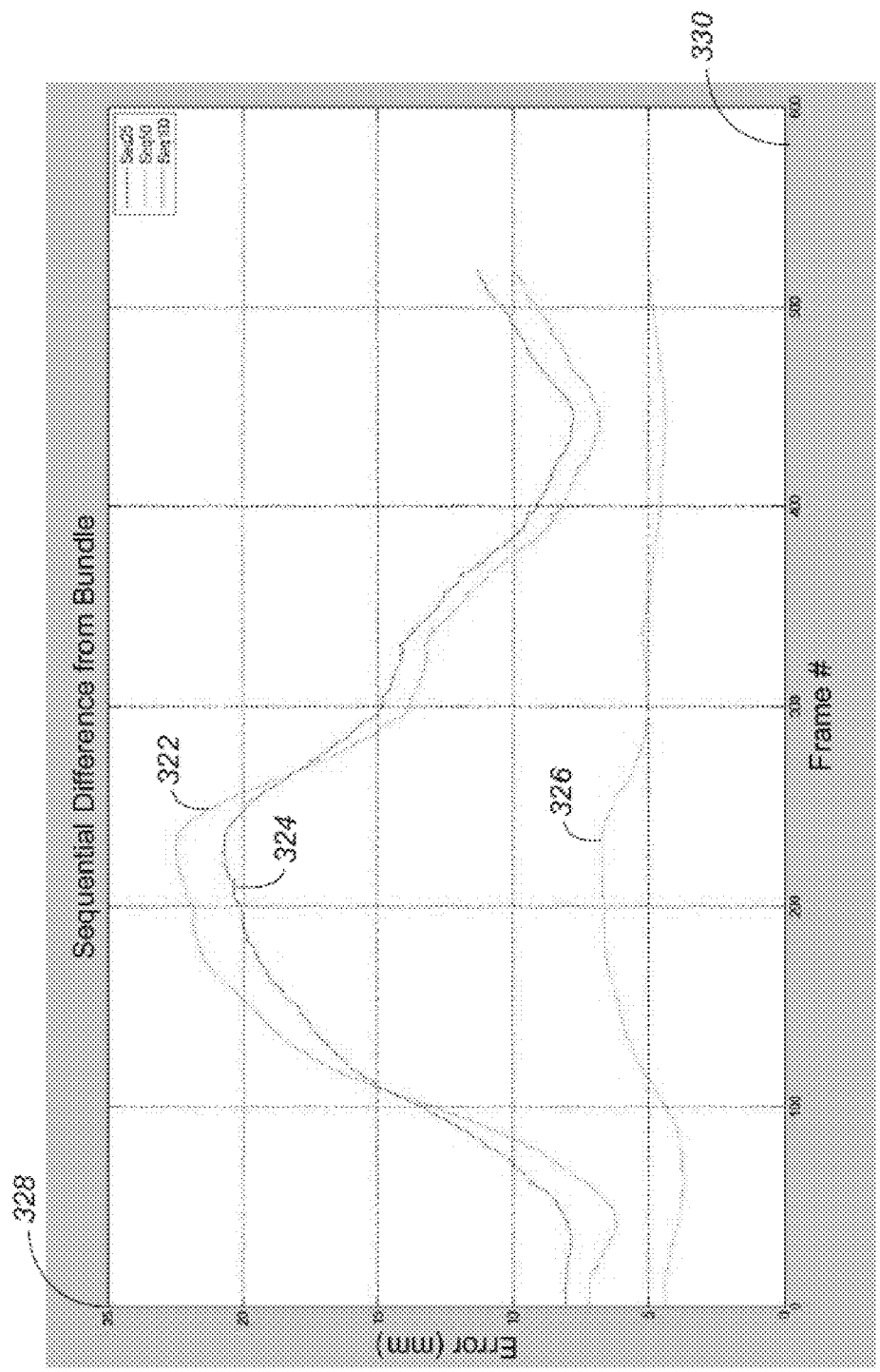
FIG. 10 illustrates the comparison of positions of the camera obtained by employing the rolling sequential bundle adjustment algorithm of the present technology and obtained by employing the prior art bundle adjustment algorithm for values of number of frames used: N=25, 50, and 100.

FIG. 10 illustrates the comparison 320 of positions of the camera obtained by employing the rolling sequential bundle adjustment algorithm of the present technology and obtained by employing the prior art bundle adjustment algorithm for values of number of frames used: N=25 (the error curve 324), 50 (the error curve 322), and 100 (the error curve 326). The error curves are becoming negligible (max less than 7 mm) as the number of frames used is going up.

As N gets larger, the differences between the optimal solution and the sequential solution begin to approach one another, and however the cost is a slight increase in computational requirements. For this example even when N=25 the maximum difference is about 21 mm. Also, the time required to update a frame was approximately 25 msec on a laptop with an Intel i7 processor and no optimization of the software.

The results illustrated in FIG. 10 again demonstrate the proof of concept that the results obtained by employing the rolling sequential bundle adjustment algorithm of the present technology and obtained by employing the prior art bundle adjustment algorithm are very close, but the method of the present technology of employing the rolling sequential bundle adjustment algorithm required exponential less computing time.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Locally Measured Movement Smoothing of GNSS Position Fixes

Various embodiments are well suited for correcting errors caused by multipath in pseudorange estimates. For example, multipath error can occur as signals bounce off of various objects, such as buildings or other objects, reflecting signals along many paths. Extracted pseudorange information is an example of pseudorange estimates.

Multipath refers to the simultaneous processing in the GNSS receiver of both the desired GNSS signal and reflected versions of the desired GNSS signal that arrive a very short time after the desired signal. The two signals pass through the GNSS receiver and are processed by the down converter and the timing measurement systems that develop the pseudoranges. Instantaneous combining of the two signals, desired and slightly-later multipath, result in erroneous pseudoranges, which may be quite different in instantaneous magnitude from the true pseudorange that should have been determined.

Since it is very hard to shield a GNSS receiver/antenna system from such reflections, alternate means for coping with the interference have been developed. In accordance with various embodiments described herein, locally measured movement can be used to discipline, or correct, errant data position fixes which can be caused by various factors including multipath errors. The term "disciplining" is used in the art to describe bringing two dissimilar signals into near congruity by a comparison method such as by using feedback loops. One example uses a phase-tracking system which adjusts a local reference signal to match as closely as possibly another incoming signal. With reference to various embodiments, the term "disciplining" describes comparing a first distance determined from two successive GNSS position fixes (e.g., $P_1-P_2$) with locally measured movement (LMM) position shift distances and, if $P_1-P_2$ is greater than the LMM position shift distance by a selected threshold value (e.g., 1.5 times the LMM position shift distance or greater) the GNSS position fix at $P_2$ is discarded and the LMM position shift distance is added to the previous GNSS position fix (e.g. $P_1$) to determine the position of a device.

Locally measured movement information, according to one embodiment, is information that includes measurements of movement where the movement, and the measurements of the movement, occur locally with respect to a cellular device. For example, an accelerometer that is attached or part of a cellular device can be used to measure the distance and direction that the cellular device has moved as well as, in some cases, its orientation. A typical inertial measurement unit (IMU) refers to a device which measures gravitational forces, velocity, and orientation using a combination of accelerometers and gyroscopes, and also sometimes magnetometers. These IMUs are typically large devices used for long-term (minutes, hours, or days), high-precision measurements of position. It is noted that for the purpose of the present application, the term "accelerometer" refers to a device which is not a component of an IMU and is used for shorter-term (e.g., 20 seconds) and less precise measurement of a device's position than is typically obtained using an IMU. Similarly, as described above algorithm 21 can utilize one or more images obtained with an image capture device that is attached or part of the cellular device can be used to measure the distance and direction the cellular device has moved as well as its orientation.

Figure 11A:
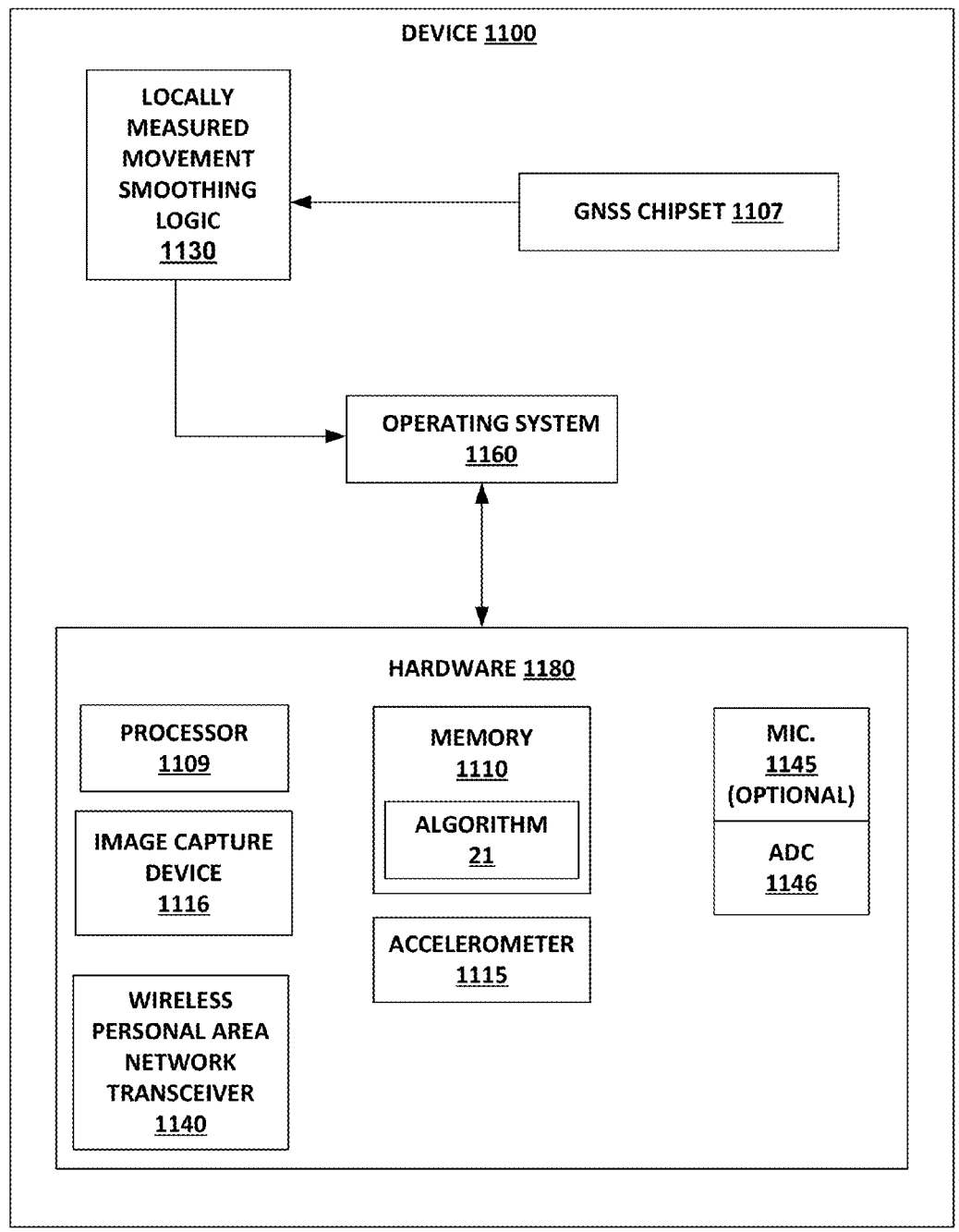
FIG. 11A depicts a block diagram of a device for implementing locally measured movement (LMM) pseudorange smoothing, according to one embodiment.

FIG. 11A depicts a block diagram of a device 1100 for applying LMM smoothing logic in accordance with one embodiment.

As described herein, in various embodiments information can be extracted from the GNSS receiver 1107, such as, but not limited to, a position fix, pseudorange information, Doppler Shift Information, Real Carrier Phase Measurement, WAAS and SBAS. Other types of processing information output by the GNSS chipset 1107 can be ignored. In accordance with various embodiments, GNSS chipset 1107 is configured for receiving radio navigation signals from global navigation satellites (e.g., 1202 of FIG. 12A) and for deriving a position fix of device 1100 based thereon. As an example, GNSS chipset 1107 can derive a position fix for device 1100 from a variety of satellite navigation systems including, but not limited to: GPS, GNSS, GLONASS, GALILEO, BeiDou, and Compass.

The hardware architecture of device 1100 includes discreet physical layout and interconnection of multiple chipsets for processing and for special purposes such as a GNSS chipset 1107. In addition, newer architectures involve further integration of chipsets in the "system on a chip" (SoC) configuration. In this configuration, the GNSS chipset 1107 can still be a complete element capable of delivering a PVT (position velocity and time) solution, or a low-cost implementation which simply outputs a position fix. However in another embodiment, pseudorange information, carrier phase, and/or Doppler measurements, along with WAAS corrections if available, can be extracted prior to further signal processing in the GNSS chipset 1107 and are processed using different algorithms and corrections data for developing an improved accuracy PVT solution. In so doing the deleterious effects of multipath and other error sources may be minimized. Further the GNSS chipset 1107 outputs are ignored and not displayed when the external processing is employed and the higher-accuracy PVT data is available.

As depicted in FIG. 11A, device 1100 further comprises an operating system 1160 and hardware 1180 that are outside of the GNSS chipset 1107. In accordance with various embodiments, LMM smoothing logic 1130 can interface between the GNSS chipset 1107 and the location manager logic 1161, which resides in the operating system 1160. In the embodiment of FIG. 11A, hardware 1180 comprises, but is not limited to, a processor 1109, a memory 1110 having algorithm 21 described above resident therein, at least one accelerometer 1115, and an image capture device 1116. In accordance with various embodiments, processor 1109 is for processing information and instructions (e.g., stored in memory 1110) while memory 1110 is configured for storing information and instructions for processor 1109. It is noted that memory 1110 can comprise volatile memory and/or a non-volatile computer readable storage medium, as well as removable data storage media in accordance with various embodiments. An example of hardware memory 1110 is a physically tangible non-transitory computer readable storage medium, such as, but not limited to a disk, a compact disk (CD), a digital versatile device (DVD), random access memory (RAM) or read only memory (ROM) for storing instructions. An example of a hardware processor 1109 for executing instructions is a central processing unit. Examples of instructions which are computer readable instructions for implementing various embodiments include LMM smoothing logic 1130 which can be stored on a hardware memory 1110 and can be executed, for example, by the hardware processor 1109, and algorithm 21 described above for implementing rolling sequential bundle adjustments. According to at least one embodiment, the LMM smoothing logic 1130 and algorithm 21 are located in a portion of device 1100 that is outside of the GNSS chipset 1107. Examples of an accelerometer 1115 are an ADXL330/335 chipset accelerometer made by Analog Devices Inc. and a LIS3LV02DQ made by STMicroelectronics.

Examples of image capture device 1116 are a camera, a video camera, a digital camera, a digital video camera, a digital camcorder, a stereo digital camera, a stereo video camera, a motion picture camera, and a television camera. The image capture device 1116 may use a lens or be a pinhole type device. It is noted that image capture device 1116 is analogous to image-capturing device 14 of FIG. 1. Examples of image capture device 1116 are a camera, a video camera, a digital camera, a digital video camera, a digital camcorder, a stereo digital camera, a stereo video camera, a motion picture camera, and a television camera. The image capture device 1116 may use a lens or be a pinhole type device. It is noted that image capture device 1116 is analogous to image-capturing device 14 of FIG. 1.

In FIG. 11A, hardware 1180 further comprises a wireless Personal Area Network (PAN) transceiver 1140. Wireless PAN transceiver 1140 is configured to utilize implementations of the IEEE 802.15.4 specification for personal area networks operating in the Instrument Scientific and Medical (ISM) ban of the radio frequency spectrum in the 2400-2484 MHz range such as implementations of the Bluetooth® standard and of the ZigBee® standard. In FIG. 11A, hardware 1180 further comprises an optional microphone (e.g., mic. 1145) coupled with and analog-to-digital converter (ADC) 1146. In at least one embodiment, microphone 1145 is configured for receiving audible information such as ambient noise and/or voice commands which can be used to initiate and control actions performed by device 1100 and is converted to a digital format by ADC 1146. In accordance with at least one embodiment, audio information captured by microphone 1145 and converted to a digital format by ADC 1146 is stored in memory 1110. Furthermore, in various embodiments microphone 1145 is used for communicating (e.g., via cellular transceiver 1111 of FIG. 11C) over a cellular telephone network or other communications network.

The output of LMM smoothing logic 1130 can be used for determining and disciplining the location of the device 1100. For example, a latitude, longitude and altitude can be determined based on the output of the LMM smoothing logic 1130, which can be conveyed via wireless personal area network transceiver 1140.

The blocks that represent features in FIG. 11A can be arranged differently than as illustrated, and can implement additional or fewer features than what are described herein. Further, the features represented by the blocks in FIG. 11A can be combined in various ways and can be implemented using software, hardware, hardware and software, hardware and firmware, or a combination thereof. Further, unless specified otherwise, various embodiments that are described as being a part of the device 1100, whether depicted as a part of the device 1100 or not, can be implemented using software, hardware, hardware and software, hardware and firmware, software and firmware, or a combination thereof. Various blocks in FIG. 11A refer to features that are logic components, such as but not limited to locally measured movement smoothing logic 1130 which can be implemented using software, hardware, hardware and software, hardware and firmware, software and firmware, or a combination thereof.

In accordance with one embodiment, GNSS chipset 1107 comprises a low-cost used by device 1100 which simply outputs a position fix of device 1100 based upon unsmoothed pseudoranges. In other words, in the interest of reducing costs, various features for improving the position fix are typically not built into a low-cost GNSS chipset such as 1107 including, but not limited to, pseudorange smoothing, carrier phase smoothing (e.g., based upon real carrier phase information, reconstructed carrier phase information). As will be discussed in greater detail below, at least one implementation of LMM smoothing logic 1130 can be used to perform smoothing of position fixes output by GNSS chipset 1107 to improve the performance of determining the position of device 1100A. Alternatively, GNSS chipset 1107 may incorporate features which facilitate determining a position fix of device 1100 with greater precision. For example, GNSS chipset 1107 can comprise a Wide Area Augmentation System (WAAS) enabled receiver configured to receive broadcast WAAS corrections which can be used to improve the precision in determining the position of device 1100.

Figure 11B:
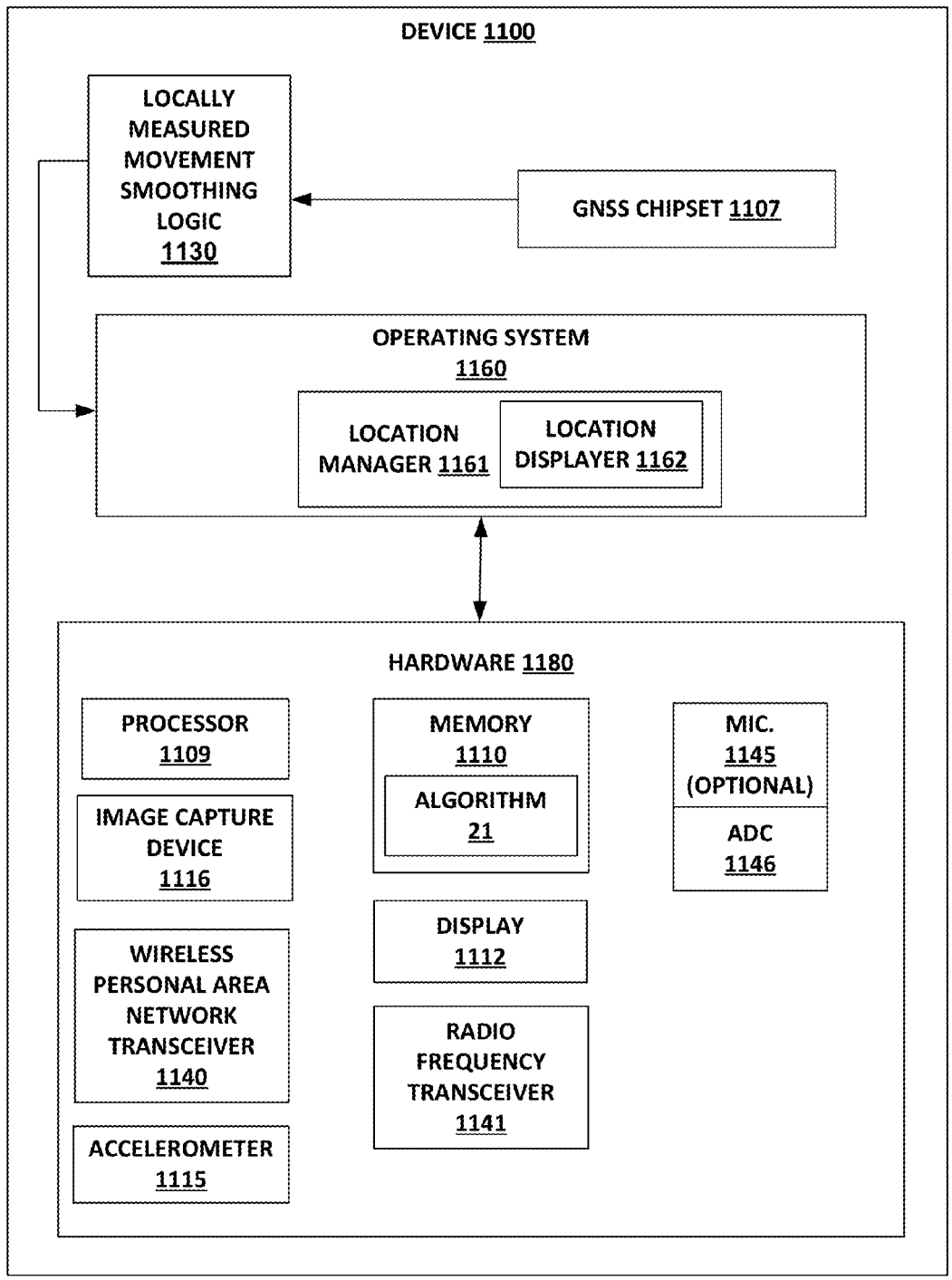
FIG. 11B depicts a block diagram of a device for implementing locally measured movement (LMM) pseudorange smoothing, according to one embodiment.

FIG. 11B depicts a block diagram of a device 1100 for applying LMM smoothing logic in accordance with at least one embodiment. For the purposes of brevity, the components described above with reference to FIG. 11A which are common also to FIG. 11B will not be described in detail again.

In FIG. 11B, device 1100 further comprises a location manager logic 1161, a location displayer logic 1162, and hardware 1180 that are outside of the GNSS chipset 1107. The location manager logic 1161 can be a part of the operating system 1160 and external to the GNSS chipset 1107. According to one embodiment, the location displayer logic 1162 is a part of the location manager logic 1161. In accordance with various embodiments, LMM smoothing logic 1130 can interface between the GNSS chipset 1107 and the location manager logic 1161, which resides in the operating system 1160. According to one embodiment, LMM smoothing logic 1130 communicates the output of pseudorange information processing to the location manager logic 1161 in the operating system 1160. The instant location or the improved location can be communicated to location manager logic 1161, as discussed herein, that displays the instant location or the improved location with respect to a map. The location displayer logic 1162 can display the location with respect to a digital representation of a map available, for example, from third parties via download to the device 1100.

In FIG. 11B, device 1100 further comprises a display device 1112 and at least one radio frequency transceiver 1141. Examples of devices which can be used as display 1112 include, but are not limited to, liquid crystal displays, LED-based displays, and the like. It is noted that display 1112 can be configured as a touch screen device (e.g., a capacitive touch screen display) for receiving inputs from a user as well as displaying data including data from location displayer logic 1162. In accordance with various embodiments, radio frequency transceiver(s) 1141 are for receiving GNSS corrections via public and/or proprietary radio frequency networks. In one embodiment, radio frequency transceiver 1141 is an Ultra-high Frequency (UHF) wide band radio transceiver operating in the 410-470 MHz radio frequency spectrum.

Figure 11C:
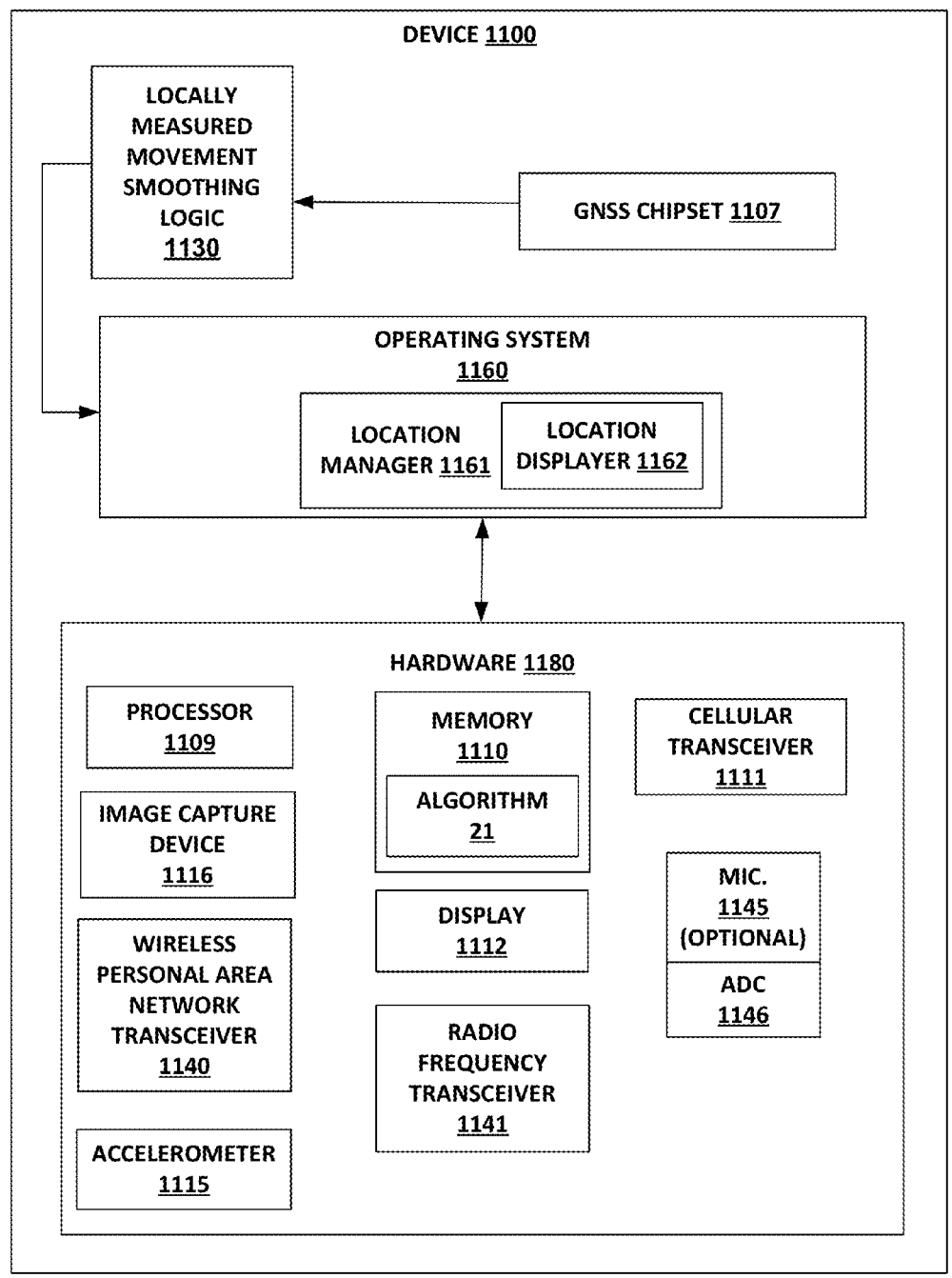
FIG. 11C depicts a block diagram of a device for implementing locally measured movement (LMM) pseudorange smoothing, according to one embodiment.

FIG. 11C depicts a block diagram of a device 1100 for applying LMM smoothing logic in accordance with at least one embodiment. For the purposes of brevity, the components described above with reference to FIGS. 11A and 11B which are common also to FIG. 11C will not be described in detail again. In FIG. 11C, device 1100 further comprises a cellular transceiver 1111. Examples of cellular networks used by cellular transceiver 1111 include, but are not limited to GSM cellular networks, GPRS cellular networks, GDMA cellular networks, and EDGE cellular networks. In accordance with at least one embodiment, cellular transceiver 1111 is configured to operate on a satellite-based cellular network such as the Inmarsat or Iridium communication networks. In at least one embodiment, device 1100 is configured to receive GNSS corrections via a cellular network which are received by cellular transceiver 1111. Similarly, using cellular transceiver 1111, device 1100 can send position data including position fixes to other devices either located proximate to device 1100 or at a distant location.

Figure 11D:
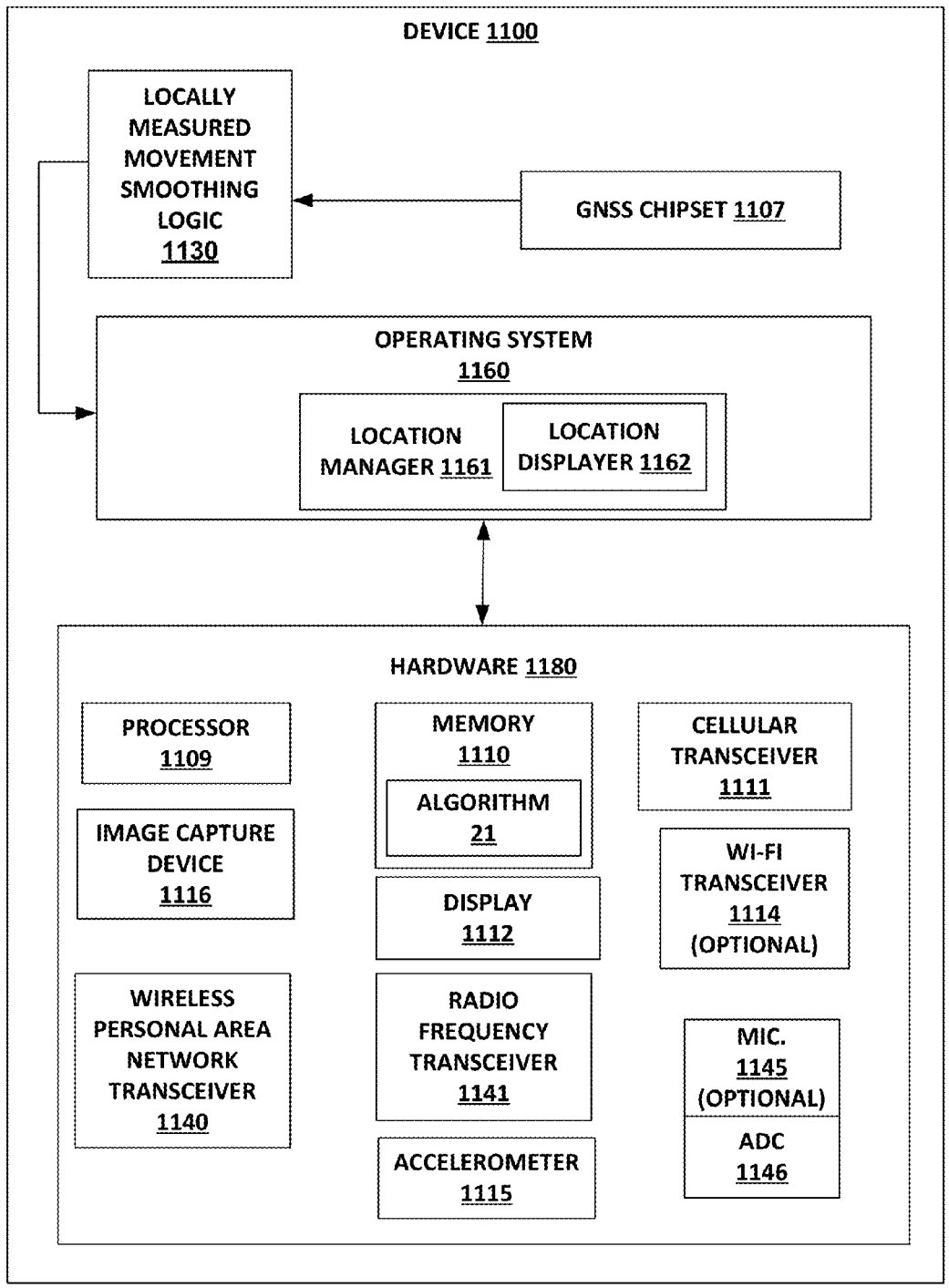
FIG. 11D depicts a block diagram of a device for implementing locally measured movement (LMM) pseudorange smoothing, according to one embodiment.

FIG. 11D depicts a block diagram of a device 1100 for applying LMM smoothing logic in accordance with at least one embodiment. For the purposes of brevity, the components described above with reference to FIGS. 11A-11C which are common also to FIG. 11D will not be described in detail again. In FIG. 11D, device 1100 further comprises an optional Wi-Fi transceiver 1114. Wi-Fi transceiver 1114 may be configured to operate on/in compliance with any suitable wireless communication protocol including, but not limited to: Wi-Fi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard). In accordance with various embodiments, device 1100 can receive corrections information for device 1100 from proprietary or public networks.

Figure 11E:
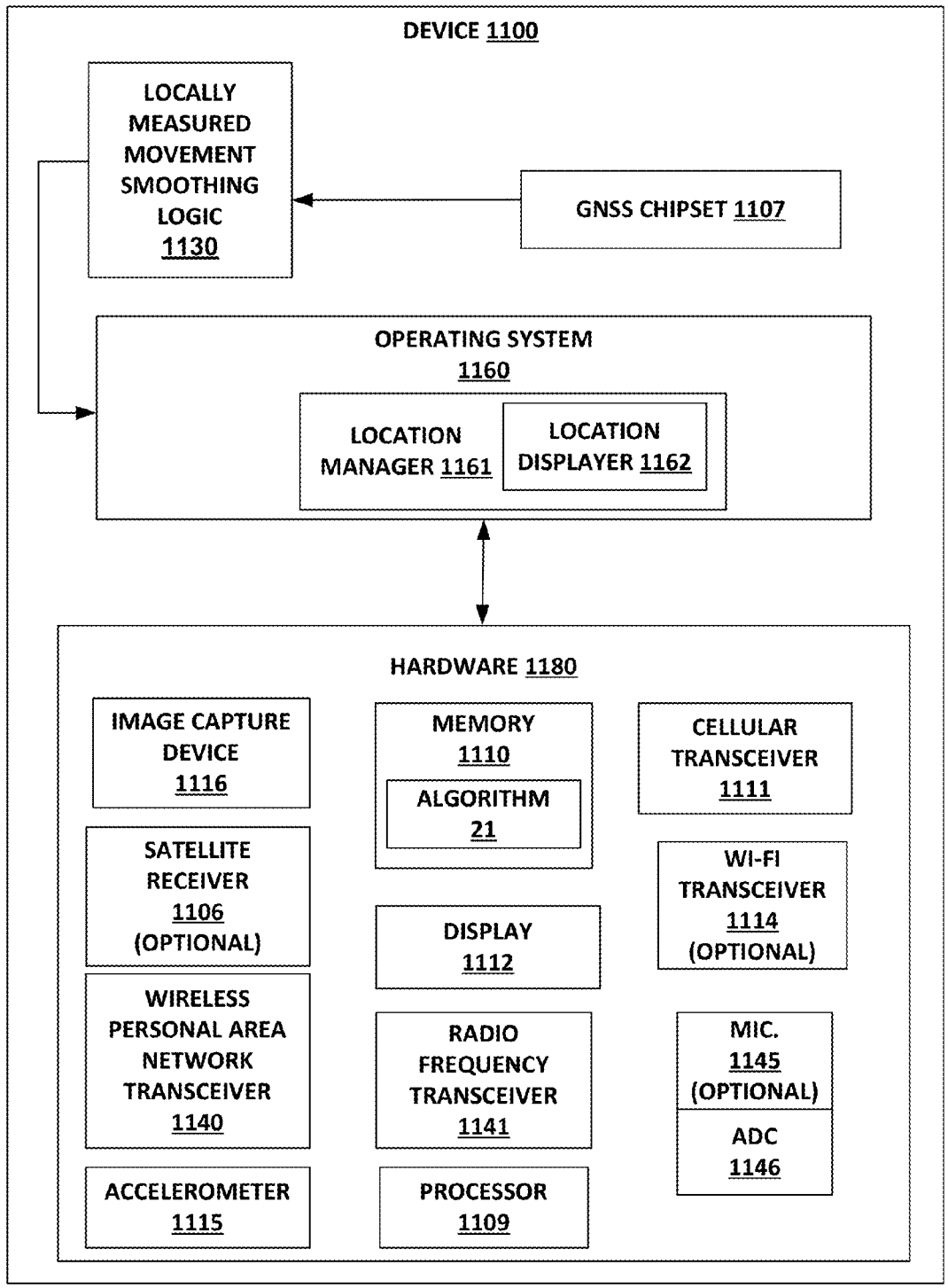
FIG. 11E depicts a block diagram of a device for implementing locally measured movement (LMM) pseudorange smoothing, according to one embodiment.

FIG. 11E depicts a block diagram of a device 1100 for applying LMM smoothing logic in accordance with at least one embodiment. For the purposes of brevity, the components described above with reference to FIGS. 11A-11D which are common also to FIG. 11E will not be described in detail again. In FIG. 11E, device 1100 further comprises an optional satellite receiver 1106. In accordance with various embodiments, satellite receiver 1106 is configured for receiving GNSS corrections data sent via various satellite-based augmentation systems (SBAS) including, but not limited to the WAAS used in North America and the European Geostationary Navigation Overlay Service (EGNOS). For example, a satellite radio distributor (e.g., 1227 of FIG. 12D) can broadcast corrections as a broadcast from one or more communications satellites (e.g., 1201 of FIG. 12D). In one embodiment, device 1100 includes one or more integral satellite radio antennas associated with integrated satellite radio receivers 1106. Satellite radio receiver 1106 is one example of such a satellite receiver which would employ an integrated antenna designed to operate in the correct frequency band for receiving a corrections or other information broadcast from communication satellites 1201. In this manner, in some embodiments, device 1100 can receive the corrections via satellite radio receiver 1106.

It is noted that the embodiments described above with reference to FIGS. 11A-11E can be implemented in a variety of form factors in accordance with various embodiments. FIGS. 19A-19F show some implementations of device 1100 in accordance with various embodiments.

Figure 19A:
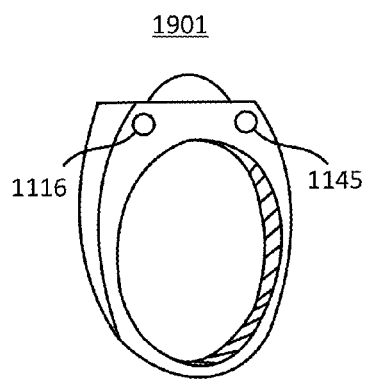
FIGS. 19A-19F show some implementations of a device of FIGS. 11A-11E in accordance with various embodiments.

In FIG. 19A, device 1100 comprises a ring 1901. In accordance with at least one embodiment, the components described above with reference to FIG. 11A may be disposed within a small form factor such as ring 1901. Thus, ring 1901 may comprise various components shown in FIG. 11A including, but not limited to, GNSS chipset 1107 (not shown), LMM smoothing logic 1130 (not shown), processor 1109 (not shown), image capture device 1116, at least one accelerometer 1115 (not shown), and microphone 1145. Furthermore, ring 1901 may include other components such as a radio-frequency identification device (RFID) (not shown), or other component for uniquely identifying ring 1901.

Figure 19B:
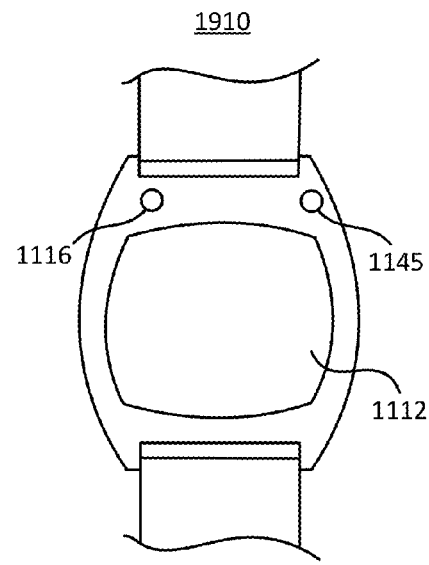

In FIG. 19B, device 1100 comprises a wearable watch 1910. Again, in various embodiments watch 1910 comprises the components described above with reference to FIG. 19A as well as a display 1112 for displaying the time. It is noted that in various embodiments, display 1112 comprises a touch screen device capable of displaying icons, menus, and other data which permits a user to control functions performed by watch 1910. In FIG. 11C, device 1100 comprises a badge 1920 which is wearable by a user.

Figure 19C:
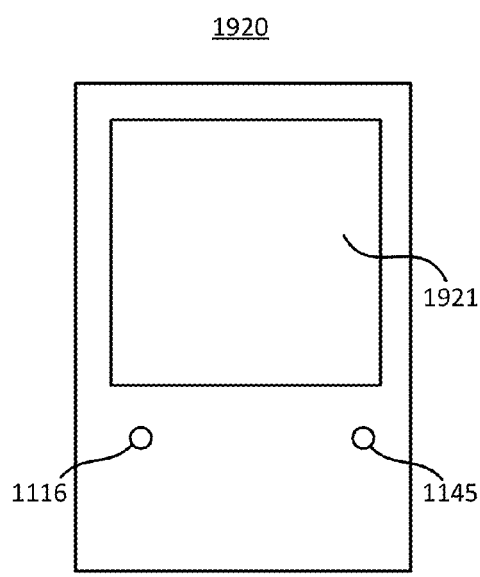
Figure 19D:
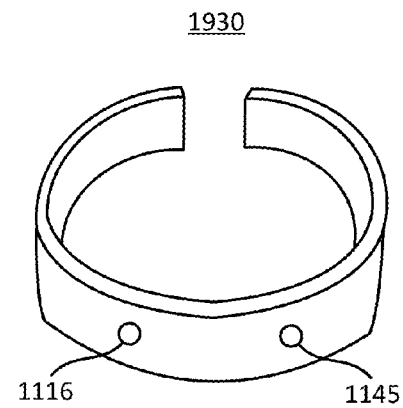

In FIG. 19C, badge 1920 comprises the components described above with reference to FIG. 19A as well as an area 1921 for a picture of the user of badge 1920. In accordance with various embodiments, badge 1920 may be attached to a user's clothing using a pin, clip, Velcro, or other fastening device. Also, in accordance with various embodiments, badge 1920 can be mounted on devices or vehicles (e.g., a bicycle) using various fastening devices. In FIG. 19D, device 1100 comprises a bracelet 1930 in accordance with various embodiments. In FIG. 19D, bracelet 1930 comprises the components described above with reference to FIG. 19A.

Figure 19E:
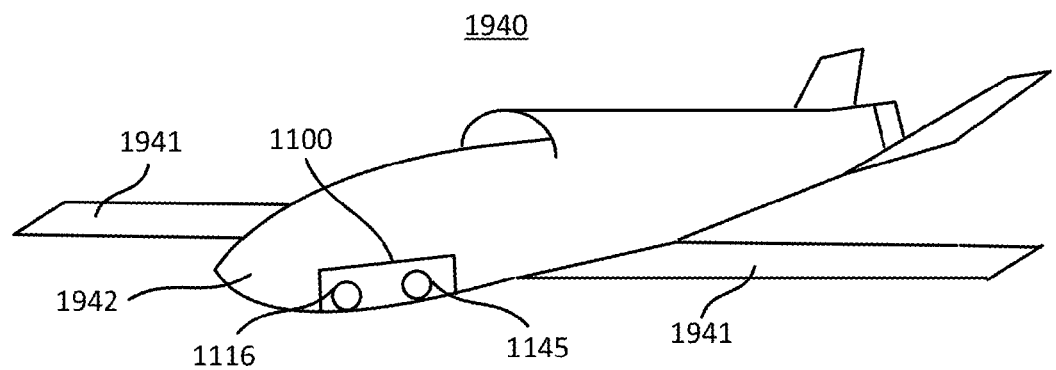

In FIG. 19E, device 1100 comprises or is disposed as a portion of an unmanned aerial vehicle (which may also be known as a remotely piloted vehicle or as a drone), such as fixed wing unmanned aerial vehicle 1940. A perspective view is illustrated. In accordance with at least one embodiment, the components described above with reference to FIG. 11A may be disposed within a form factor of or as a sub-portion of unmanned aerial vehicle 1940. For example, one or more portions of device 1100 may be mounted internally and/or externally to fuselage 1942, wings 1941, or some other portion of unmanned aerial vehicle 1940. Thus, unmanned aerial vehicle 1940 may comprise various components shown in FIG. 11A including, but not limited to, GNSS chipset 1107 (not shown), LMM smoothing logic 1130 (not shown), processor 1109 (not shown), image capture device 1116, at least one accelerometer 1115 (not shown), and microphone 1145. Furthermore, unmanned aerial vehicle 1940 may include other components such as a radio-frequency identification device (RFID) (not shown), or other component for uniquely identifying unmanned aerial vehicle 1940.

Figure 19F:
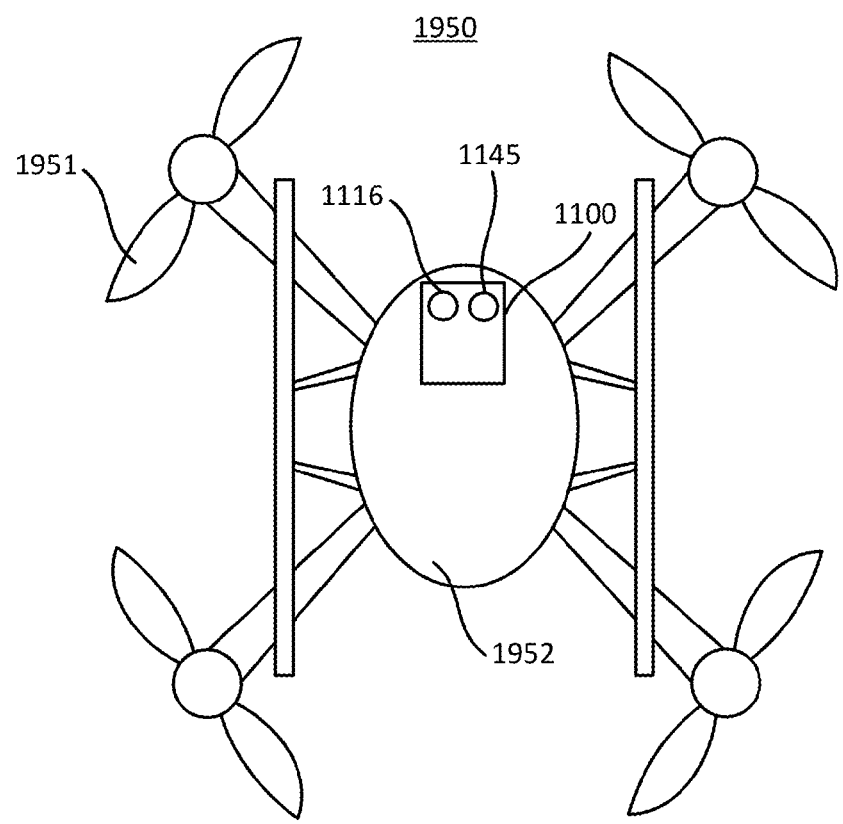

In FIG. 19F, device 1100 comprises or is disposed as a portion of an unmanned aerial vehicle (which may also be known as a remotely piloted vehicle or as a drone), such as rotorcraft unmanned aerial vehicle 1950 which relies on one or more rotors 1951 for lift and hovering. A bottom plan view is illustrated. Although a quad-rotor embodiment is depicted, such rotorcraft may employ a single rotor or a plurality of rotors that is lesser or greater than the four illustrated rotors. In accordance with at least one embodiment, the components described above with reference to FIG. 11A may be disposed within a form factor of or as a sub-portion of unmanned aerial vehicle 1950. For example, one or more portions of device 1100 may be mounted internally and/or externally to fuselage 1952 or some other portion of unmanned aerial vehicle 1950. Thus, unmanned aerial vehicle 1950 may comprise various components shown in FIG. 11A including, but not limited to, GNSS chipset 1107 (not shown), LMM smoothing logic 1130 (not shown), processor 1109 (not shown), image capture device 1116, at least one accelerometer 1115 (not shown), and microphone 1145. Furthermore, unmanned aerial vehicle 1950 may include other components such as a radio-frequency identification device (RFID) (not shown), or other component for uniquely identifying unmanned aerial vehicle 1950.

It is noted that the devices 1100 shown in FIGS. 19A-19F can leverage micro-miniaturization fabrication techniques to integrate the components described above into increasingly smaller form factors that was previously possible. Furthermore, the implementations of device 1100 shown in at least FIGS. 19A-19F are, in some embodiments, examples of "spime" devices, which are machines which are aware of their environment.

Figure 12A:
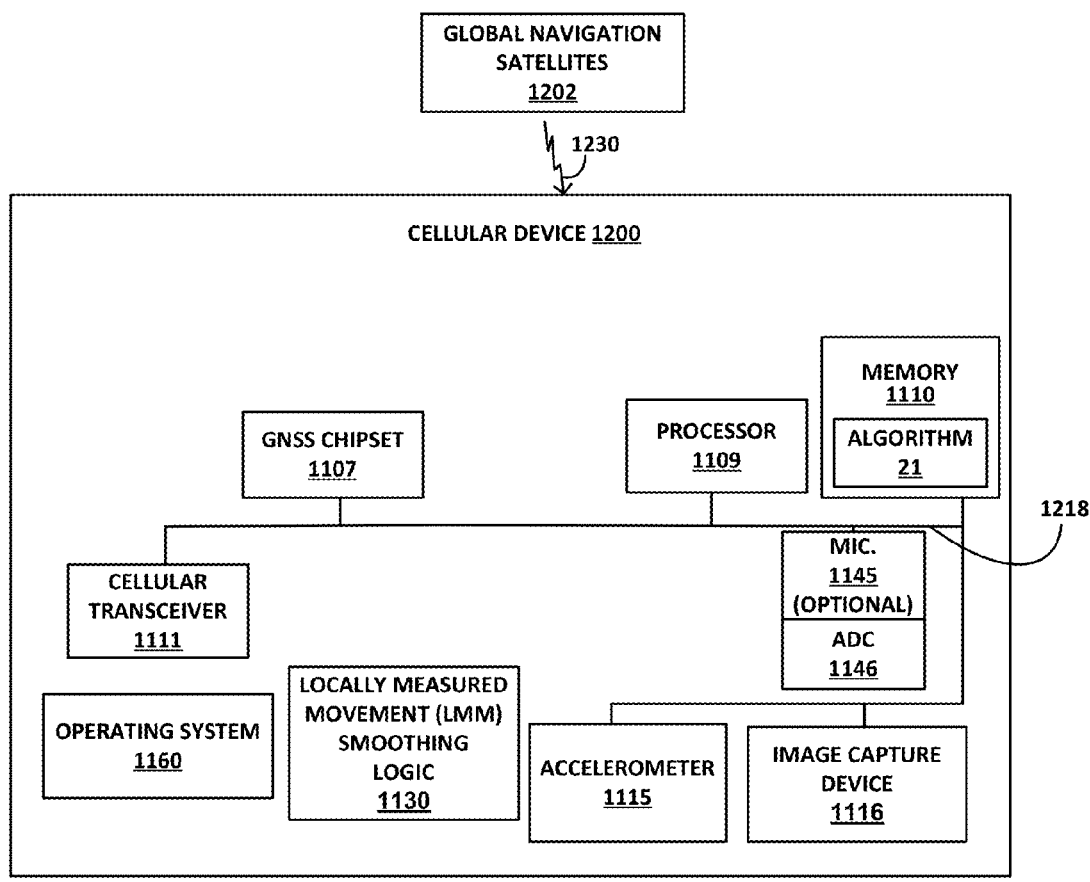
FIG. 12A depicts a block diagram of a cellular device for implementing locally measured movement (LMM) pseudorange smoothing, according to one embodiment.

FIG. 12A depicts a block diagram of an example cellular device 1200 in accordance with at least one embodiment. Examples of a cellular device 1200 as shown in FIG. 12A comprise a non-voice enabled cellular device such as a position recording/reporting device, a theft prevention device, or other type of security device.

The cellular device 1200 includes a bus 1218, a GNSS chipset 1107, a processor 1109, memory 1110, at least one accelerometer 1115, an image capture device 1116, locally measured movement smoothing logic 1130 (e.g., LMM smoothing logic 1130), an optional microphone 1145, ADC 1146, and operating system 1160. Components 1107, 1109, 1110, 1115, 1116, and 1146 are all connected with the bus 1218.

In FIG. 12A, global navigation satellites 1202 which provide radio navigation signals (e.g., the GPS, GNSS, GLONASS, GALILEO, BeiDou, Compass, etc.). A cellular device 1200 can be configured with, a GNSS chipset 1107 coupled with bus 1218 for receiving radio navigation signals from global navigation satellites 1202 and for deriving a position of cellular device 1200 based thereon. According to one embodiment, the GNSS chipset 1107 is configured to receive signals from GPS satellites, GLONASS satellites, Galileo satellites, or from a combination of satellites from different constellations. The GNSS chipset 1107 can perform GPS measurements to derive raw measurement data for a position of the cellular device 1200. The raw measurement data can provide an instant location (e.g., position fix 1384 of FIG. 13) of the cellular device 1200 which is output from GNSS chipset 1107.

Other components of cellular device 1200 comprise a processor 1109 coupled with bus 1218 for processing information and instructions, a memory 210 coupled with bus 1218 for storing information and instructions for processor 1109. It is noted that memory 1110 can comprise volatile memory and/or a non-transitory computer readable medium, as well as removable data storage media in accordance with various embodiments. Examples of an accelerometer 1115 are an ADXL330/335 chipset accelerometer made by Analog Devices Inc. and a LIS3LV02DQ made by STMicroelectronics. Examples of cellular networks used by cellular transceiver 1111 include, but are not limited to GSM cellular networks, GPRS cellular networks, GDMA cellular networks, and EDGE cellular networks. In accordance with at least one embodiment, cellular transceiver 1111 is configured to operate on a satellite-based cellular network such as the Inmarsat or Iridium communication networks. In at least one embodiment, device 1100 is configured to receive GNSS corrections via a cellular network which are received by cellular transceiver 1111. Similarly, using cellular transceiver 1111, cellular device 1200 can send position data including position fixes to other devices either located proximate to cellular device 1200 or at a distant location.

Examples of image capture device 1116 are a camera, a video camera, a digital camera, a digital video camera, a digital camcorder, a stereo digital camera, a stereo video camera, a motion picture camera, and a television camera. The image capture device 1116 may use a lens or be a pinhole type device. It is noted that image capture device 1116 is analogous to image-capturing device 14 of FIG. 1.

The blocks that represent features in FIG. 12A can be arranged differently than as illustrated, and can implement additional or fewer features than what are described herein. For example, in accordance with various embodiments, cellular device 1200 may comprise at least one accelerometer 1115, an image capture device 1116, or both. Further, the features represented by the blocks in FIG. 12A can be combined in various ways. A cellular device 1200 can be implemented using software, hardware, hardware and software, hardware and firmware, or a combination thereof. Further, unless specified otherwise, various embodiments that are described as being a part of the cellular device 1200, whether depicted as a part of the cellular device 1200 or not, can be implemented using software, hardware, hardware and software, hardware and firmware, software and firmware, or a combination thereof. Various blocks in FIG. 12A refer to features that are logic components, such as but not limited to locally measured movement smoothing logic 1130, which can be implemented using software, hardware, hardware and software, hardware and firmware, software and firmware, or a combination thereof.

The cellular device 1200, according to one embodiment, includes hardware, such as the processor 1109, memory 1110, and the GNSS chipset 1107. An example of hardware memory 1110 is a physically tangible non-transitory computer readable storage medium, such as, but not limited to a disk, a compact disk (CD), a digital versatile device (DVD), random access memory (RAM) or read only memory (ROM) for storing instructions. An example of a hardware processor 1109 for executing instructions is a central processing unit. Examples of instructions which are computer readable instructions for implementing various embodiments include LMM smoothing logic 1130 which can be stored on a hardware memory 1110 and that can be executed, for example, by the hardware processor 1109, and algorithm 21 described above for implementing rolling sequential bundle adjustments. According to at least one embodiment, the LMM smoothing logic 1130 and algorithm 21 are located in a portion of the cellular device 1200 that is outside of the GNSS chipset 1107.

In accordance with one embodiment, GNSS chipset 1107 comprises a low-cost used by cellular device 1200 which simply outputs a position fix of cellular device 1200 based upon unsmoothed pseudoranges. In other words, in the interest of reducing costs, various features for improving the position fix are typically not built into a low-cost GNSS chipset such as 1107 including, but not limited to, pseudorange smoothing, carrier phase smoothing (e.g., based upon real carrier phase information, reconstructed carrier phase information). As will be discussed in greater detail below, at least one implementation of LMM smoothing logic 1130 can be used to perform smoothing of position fixes output by GNSS chipset 1107 to improve the performance of determining the position of cellular device 1200. Alternatively, GNSS chipset 1107 may incorporate features which facilitate determining a position fix of cellular device 1200 with greater precision. For example, GNSS chipset 1107 can comprise a Wide Area Augmentation System (WAAS) enabled receiver configured to receive broadcast WAAS corrections which can be used to improve the precision in determining the position of cellular device 1200.

Figure 12B:
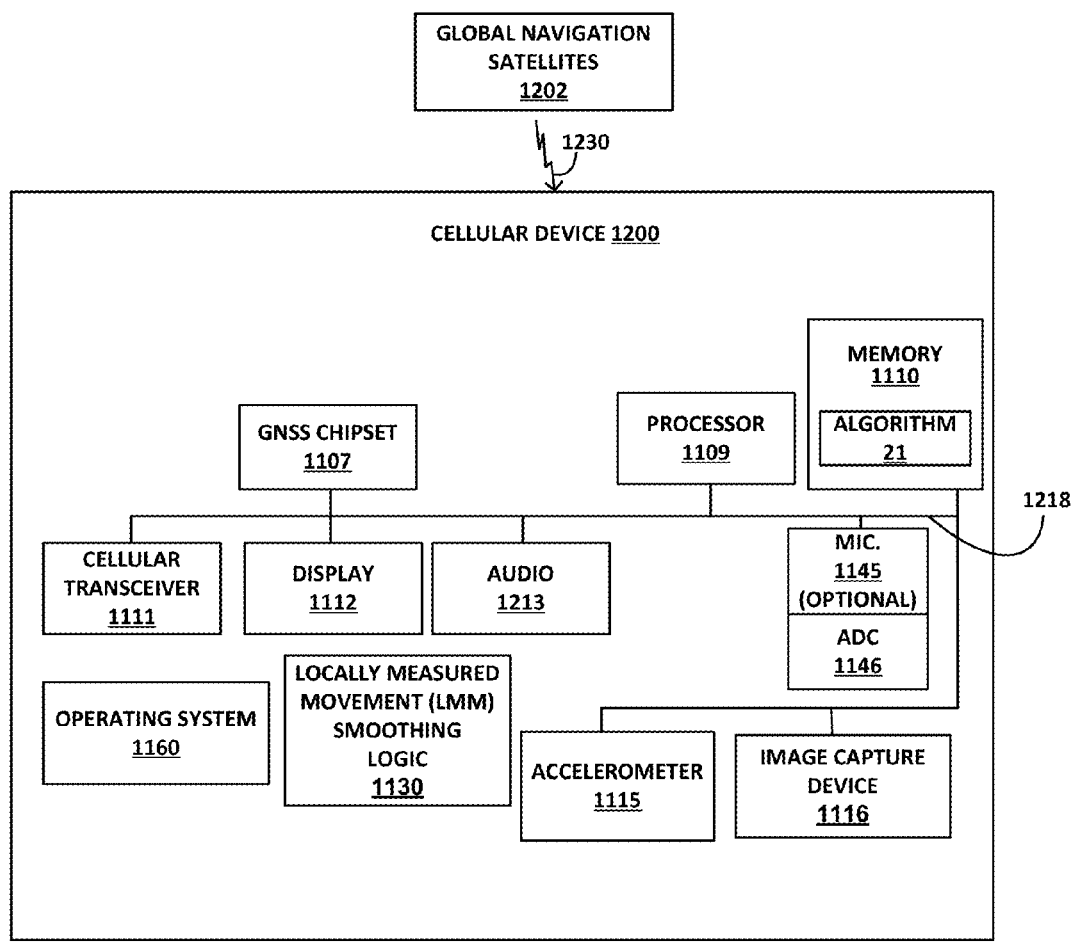
FIG. 12B depicts a block diagram of a cellular device for implementing locally measured movement (LMM) pseudorange smoothing, according to one embodiment.

FIG. 12B depicts a block diagram of another example cellular device 1200 in accordance with at least one embodiment. Examples of a cellular device 1200 include a position recording/reporting device, a theft prevention device, or other type of security device, and a handheld navigation device. The cellular device 1200 shown in FIG. 12B may be mobile or stationary.

The cellular device 1200 includes a bus 1218, a GNSS chipset 1107, a processor 1109, memory 1110, a display 1112, audio 1213, at least one accelerometer 1115, an image capture device 1116, locally measured movement smoothing logic 1130 (e.g., LMM smoothing logic 1130), an optional microphone 1145, ADC 1146, and operating system 1160. Components 1107, 1109, 1110, 1112, 1213, 1115, 1116, and 1146 are all connected with the bus 1218. For the purpose of brevity, the components listed above which have been described previously will not again be described in the discussion of FIG. 12B.

In the embodiment of FIG. 12B, cellular device 1200 further comprises a display 1112 and an audio component 1213. Audio component 1213 is for generating audio signals such as tones, sounds, and/vocal commands and alerts.

The blocks that represent features in FIG. 12B can be arranged differently than as illustrated, and can implement additional or fewer features than what are described herein. For example, in accordance with various embodiments, cellular device 1200 may comprise at least one accelerometer 1115, an image capture device 1116, or both. Further, the features represented by the blocks in FIG. 12B can be combined in various ways. A cellular device 1200 can be implemented using software, hardware, hardware and software, hardware and firmware, or a combination thereof. Further, unless specified otherwise, various embodiments that are described as being a part of the cellular device 1200, whether depicted as a part of the cellular device 1200 or not, can be implemented using software, hardware, hardware and software, hardware and firmware, software and firmware, or a combination thereof. Various blocks in FIG. 12B refer to features that are logic components, such as but not limited to locally measured movement smoothing logic 1130 can be implemented using software, hardware, hardware and software, hardware and firmware, software and firmware, or a combination thereof.

In accordance with one embodiment, GNSS chipset 1107 comprises a low-cost GNSS chipset used by cellular device 1200 which simply outputs a position fix of cellular device 1200 based upon unsmoothed pseudoranges. In other words, in the interest of reducing costs, various features for improving the position fix are typically not built into a low-cost GNSS chipset such as 1107 including, but not limited to, pseudorange smoothing, carrier phase smoothing (e.g., based upon real carrier phase information, reconstructed carrier phase information). As will be discussed in greater detail below, at least one implementation of LMM smoothing logic 1130 can be used to perform smoothing of position fixes output by GNSS chipset 1107 to improve the performance of determining the position of cellular device 1200. Alternatively, GNSS chipset 1107 may incorporate features which facilitate determining a position fix of device 1200 with greater precision. For example, GNSS chipset 1107 can comprise a Wide Area Augmentation System (WAAS) enabled receiver configured to receive broadcast WAAS corrections which can be used to improve the precision in determining the position of device 1200.

Figure 12C:
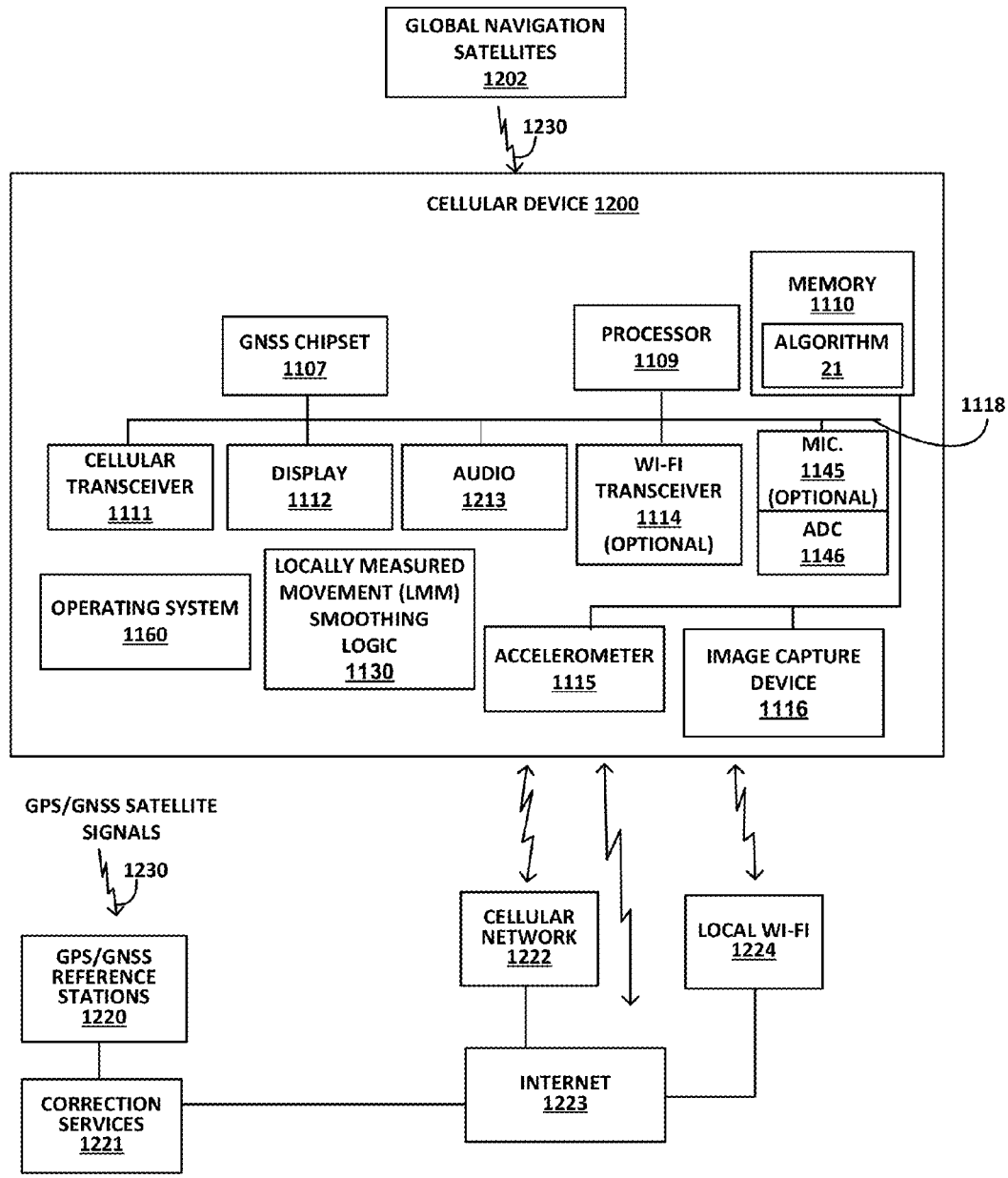
FIG. 12C depicts a block diagram of a cellular device for implementing locally measured movement (LMM) pseudorange smoothing, according to one embodiment.

FIG. 12C depicts a block diagram of a set of correction delivery options for providing positioning information to a cellular device 1200 for extracting pseudorange information, according to one embodiment. The cellular device 1200 shown in FIG. 12C may be mobile or stationary. Examples of a cellular device 1200 include a cell phone and a mobile hand-held GNSS receiver.

The cellular device 1200 includes a bus 1218, a GNSS chipset 1107, a processor 1109, memory 1110, a cellular transceiver 1111, a display 1112, audio 1213, an optional Wi-Fi transceiver 1114, at least one accelerometer 1115, an image capture device 1116, locally measured movement smoothing logic 1130 (e.g., LMM smoothing logic 1130), an optional microphone 1145, ADC 1146, and operating system 1160. Components 1107, 1109, 1110, 1111, 1112, 1213, 1114, 1115, 1116, and 1146 are all connected with the bus 1218.

Wi-Fi transceiver 1114 may be configured to operate on/in compliance with any suitable wireless communication protocol including, but not limited to: Wi-Fi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

Improvements in GNSS/GPS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the Reference Station GNSS/GPS receivers can determine more precisely what the true pseudoranges should be to each satellite in view, based on geometrical considerations. Knowing the orbital positions via the GPS almanac as a function of time enables this process, first proposed in 1983, and widely adopted ever since. The difference between the observed pseudorange and the calculated pseudorange for a given Reference station is called the pseudorange correction. A set of corrections for all the global navigation satellites 1202 in view is created second by second, and stored, and made available as a service, utilizing GPS/GNSS reference stations 1220 and correction services 1221. The pseudoranges at both the cellular device 1200, GNSS chipset 1107, and those at the reference stations 1220 are time-tagged, so the corrections for each and every pseudorange measurement can be matched to the local cell phone pseudoranges. The overall service is often referred to as Differential GPS, or DGPS. Without any corrections, GNSS/GPS receivers produce position fixes with absolute errors in position on the order of 4.5 to 5.5 m per the GPS SPS Performance Standard, 4$^{th}$ Ed. 2008. In FIG. 12C, one or more correction services 1221 convey these corrections via a cellular network 1222, or the Internet 1223. Internet 1223 is in turn coupled with a local Wi-Fi network 1224 which can convey the corrections to cellular device 1200 via Wi-Fi transceiver 1114. Alternatively, cellular network 1222 can convey the corrections to cellular device 1200 via cellular transceiver 1111.

Examples of a correction source that provides pseudorange corrections are at least correction service 1221. According to one embodiment, a correction source is located outside of the cellular device 1200.

The blocks that represent features in FIG. 12C can be arranged differently than as illustrated, and can implement additional or fewer features than what are described herein. For example, in accordance with various embodiments, cellular device 1200 may comprise at least one accelerometer 1115, an image capture device 1116, or both. Further, the features represented by the blocks in FIG. 12C can be combined in various ways. A cellular device 1200 can be implemented using software, hardware, hardware and software, hardware and firmware, or a combination thereof. Further, unless specified otherwise, various embodiments that are described as being a part of the cellular device 1200, whether depicted as a part of the cellular device 1200 or not, can be implemented using software, hardware, hardware and software, hardware and firmware, software and firmware, or a combination thereof. Various blocks in FIG. 12C refer to features that are logic components, such as but not limited to locally measured movement smoothing logic 1130 can be implemented using software, hardware, hardware and software, hardware and firmware, software and firmware, or a combination thereof.

The cellular device 1200, according to one embodiment, includes hardware, such as the processor 1109, memory 1110, and the GNSS chipset 1107. An example of hardware memory 1110 is a physically tangible computer readable storage medium, such as, but not limited to a disk, a compact disk (CD), a digital versatile device (DVD), random access memory (RAM) or read only memory (ROM) for storing instructions. An example of a hardware processor 1109 for executing instructions is a central processing unit. Examples of instructions which are computer readable instructions for implementing various embodiments include LMM smoothing logic 1130 that can be stored on a hardware memory 1110 and that can be executed, for example, by the hardware processor 1109, and algorithm 21 described above for implementing rolling sequential bundle adjustments. According to at least one embodiment, the LMM smoothing logic 1130 and algorithm 21 are located in a portion of the cellular device 1200 that is outside of the GNSS chipset 1107.

In accordance with one embodiment, GNSS chipset 1107 comprises a low-cost GNSS chipset used by device 1200 which simply outputs a position fix of cellular device 1200 based upon unsmoothed pseudoranges. In other words, in the interest of reducing costs, various features for improving the position fix are typically not necessarily built into GNSS chipset 1107 including, but not limited to, pseudorange smoothing, carrier phase smoothing (e.g., based upon real carrier phase information, reconstructed carrier phase information). Furthermore, in some implementations, various corrections sources, or the capability to receive them, are not used by a cellular device 1200. As will be discussed in greater detail below, at least one implementation of LMM smoothing logic 1130 can be used to perform smoothing of position fixes output by GNSS chipset 1107 to improve the performance of determining the position of cellular device 1200. Alternatively, GNSS chipset 1107 may incorporate features which facilitate determining a position fix of device 1200 with greater precision. For example, GNSS chipset 1107 can comprise a Wide Area Augmentation System (WAAS) enabled receiver configured to receive broadcast WAAS corrections which can be used to improve the precision in determining the position of device 1200.

Figure 12D:
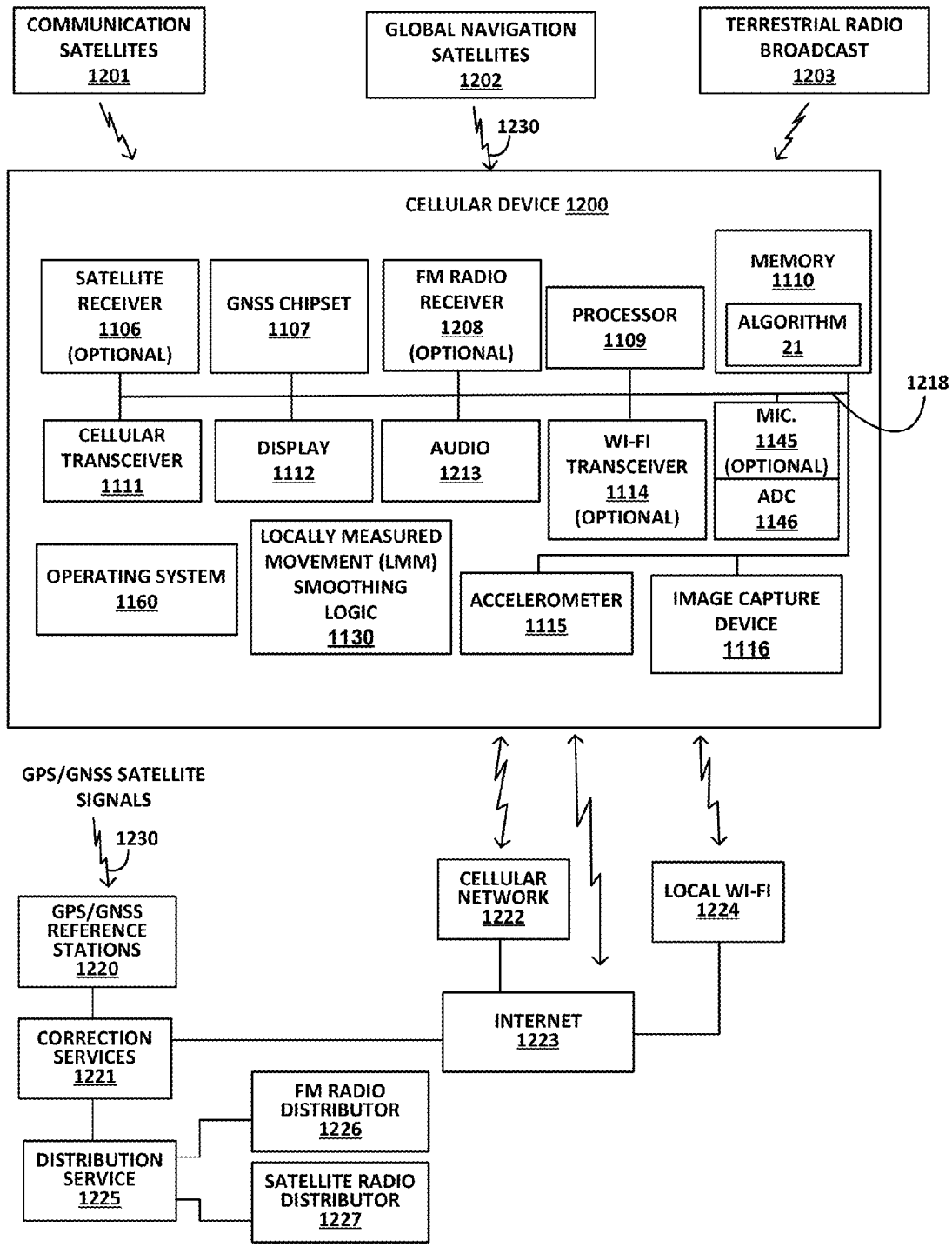
FIG. 12D depicts a block diagram of a cellular device for implementing locally measured movement (LMM) pseudorange smoothing, according to one embodiment.

FIG. 12D depicts a block diagram of a set of correction delivery options for providing positioning information to a cellular device for extracting pseudorange information, according to one embodiment. Examples of a cellular device 1200 include a cell phone, a non-voice enabled cellular device, and a mobile hand-held GNSS receiver. The cellular device may be mobile or stationary.

The cellular device 1200 includes a bus 1218, an optional satellite receiver 1106, a GNSS chipset 1107, an optional FM radio receiver 1108, a processor 1109, memory 1110, a cellular transceiver 1111, a display 1112, audio 1213, an optional Wi-Fi transceiver 1114, at least one accelerometer 1115, an image capture device 1116, locally measured movement smoothing logic 1130 (e.g., LMM smoothing logic 1130), microphone 1145, ADC 1146, and operating system 1160. Components 1106, 1107, 1108, 1109, 1110, 1111, 1112, 1213, 1114, 1115, 1116, and 1146 are all connected with the bus 1218. For the purpose of brevity, the components shown in FIG. 12D which have previously been discussed will not again be described in detail with reference to FIG. 12D.

In FIG. 12D, a plurality of broadcast sources is used to convey data and media to a cellular device 1200. As an example, cellular device 1200 can receive broadcast signals from communication satellites 1201 (e.g., two-way radio, satellite-based cellular such as the Inmarsat or Iridium communication networks, etc.), global navigation satellites 1202 which provide radio navigation signals (e.g., the GPS, GNSS, GLONASS, GALILEO, BeiDou, Compass, etc.), and terrestrial radio broadcast 1203 (e.g., FM radio, AM radio, shortwave radio, etc.)

A cellular device 1200 can be configured with an optional satellite radio receiver 1106 coupled with a communication bus 1218 for receiving signals from communication satellites 1201, a GNSS chipset 1107 coupled with bus 1218 for receiving radio navigation signals from global navigation satellites 1202 and for deriving a position of cellular device 1200 based thereon. According to one embodiment, the GNSS chipset 1107 is configured to receive signals from GPS satellites, GLONASS satellites, or from a combination of satellites from different constellations. The GNSS chipset 1107 can perform GPS measurements to derive raw measurement data for a position of the cellular device 1200. The raw measurement data can provide an instant location of the cellular device 1200.

Cellular device 1200 further comprises an optional FM radio receiver 1108 coupled with bus 1218 for receiving broadcast signals from terrestrial radio broadcast 1203. Other components of cellular device 1200 comprise a processor 1109 coupled with bus 1218 for processing information and instructions, a memory 1110 coupled with bus 1218 for storing information and instructions for processor 1109. Cellular device 1200 further comprises a cellular transceiver 1111 coupled with bus 1218 for communicating via cellular network 1222. Cellular device 1200 further comprises a display 1112 coupled with bus 1218. Cellular device 1200 further comprises an audio output 1213 coupled with bus 1218 for conveying audio information to a user, or for receiving voice commands or messages from a user. Cellular device 1200 further comprises a Wi-Fi transceiver 1114 and at least one accelerometer 1115 coupled with bus 1218.

As discussed above, improvements in GNSS/GPS positioning may be obtained by using reference stations with a fixed receiver system to calculate corrections to the measured pseudoranges in a given geographical region. In addition to use of conveying GNSS corrections data via cellular network 1222, or via the Internet 1223, in various embodiments correction services 1221 are also coupled with a distribution service 1225 which conveys the corrections to an FM radio distributor 1226. FM radio distributor 1226 can broadcast corrections as a terrestrial radio broadcast 103. It should be appreciated that an FM signal is being described as a subset of possible terrestrial radio broadcasts which may be in a variety of bands and modulated in a variety of manners. In some embodiments, cellular device 1200 includes one or more integral terrestrial radio antennas associated with integrated terrestrial receivers; FM radio receiver 1108 is one example of such a terrestrial receiver which would employ an integrated antenna designed to operate in the correct frequency band for receiving a terrestrial radio broadcast 103. In this manner, in some embodiments, cellular device 1200 can receive the corrections via FM radio receiver 1108 (or other applicable type of integrated terrestrial radio receiver). In some embodiments, correction services 1221 are also coupled with a distribution service 1225 which conveys the corrections to a satellite radio distributor 1227. Satellite radio distributor 1227 can broadcast corrections as a broadcast from one or more communications satellites 1201. In some embodiments, cellular device 1200 includes one or more integral satellite radio antennas associated with integrated satellite radio receivers 1106. Satellite radio receiver 1106 is one example of such a satellite receiver which would employ an integrated antenna designed to operate in the correct frequency band for receiving a corrections or other information broadcast from communication satellites 1201. In this manner, in some embodiments, cellular device 1200 can receive the corrections via satellite radio receiver 1106.

Examples of a correction source that provides pseudorange corrections are at least correction service 1221, FM radio distribution 1226, or satellite radio distributor 1227, or a combination thereof. According to one embodiment, a correction source is located outside of the cellular device 1200.

The blocks that represent features in FIG. 12D can be arranged differently than as illustrated, and can implement additional or fewer features than what are described herein. For example, in accordance with various embodiments, cellular device 1200 may comprise at least one accelerometer 1115, an image capture device 1116, or both. Further, the features represented by the blocks in FIG. 12D can be combined in various ways. A cellular device 1200 can be implemented using software, hardware, hardware and software, hardware and firmware, or a combination thereof. Further, unless specified otherwise, various embodiments that are described as being a part of the cellular device 1200, whether depicted as a part of the cellular device 1200 or not, can be implemented using software, hardware, hardware and software, hardware and firmware, software and firmware, or a combination thereof. Various blocks in FIG. 12D refer to features that are logic components, such as but not limited to locally measured movement smoothing logic 1130 can be implemented using software, hardware, hardware and software, hardware and firmware, software and firmware, or a combination thereof.

The cellular device 1200, according to one embodiment, includes hardware, such as the processor 1109, memory 1110, and the GNSS chipset 1170. An example of hardware memory 1110 is a physically tangible computer readable storage medium, such as, but not limited to a disk, a compact disk (CD), a digital versatile device (DVD), random access memory (RAM) or read only memory (ROM) for storing instructions. An example of a hardware processor 1109 for executing instructions is a central processing unit. Examples of instructions are computer readable instructions for implementing various embodiments include LMM smoothing logic 1130 that can be stored on a hardware memory 1110 and that can be executed, for example, by the hardware processor 1109, and algorithm 21 described above for implementing rolling sequential bundle adjustments. According to at least one embodiment, the LMM smoothing logic 1130 and algorithm 21 are located in a portion of the cellular device 1200 that is outside of the GNSS chipset 1107.

In accordance with one embodiment, GNSS chipset 1107 comprises a low-cost GNSS chipset used by device 1200 which simply outputs a position fix of device 1200 based upon unsmoothed pseudoranges. In other words, in the interest of reducing costs, various features for improving the position fix are not necessarily built into GNSS chipset 1107 including, but not limited to, pseudorange smoothing, carrier phase smoothing (e.g., based upon real carrier phase information, reconstructed carrier phase information). Furthermore, in some implementations, various corrections sources, or the capability to receive them, are not used by a cellular device 1200. As will be discussed in greater detail below, at least one implementation of LMM smoothing logic 1130 can be used to perform smoothing of position fixes output by GNSS chipset 1107 to improve the performance of determining the position of cellular device 1200. Alternatively, GNSS chipset 1107 may incorporate features which facilitate determining a position fix of device 1200 with greater precision. For example, GNSS chipset 1107 can comprise a Wide Area Augmentation System (WAAS) enabled receiver configured to receive broadcast WAAS corrections which can be used to improve the precision in determining the position of device 1200. It is noted that the embodiments discussed in FIGS. 11A-E and 12A-D are not intended to be exhaustive listings of components in accordance with various embodiments. Thus, various embodiments can utilize other positioning and/or communication technologies including, but not limited to Radio-frequency Identification transponders or tags for identifying and/or tracking device 1100 and cellular device 1200.

Example GNSS Receiver

Figure 13:
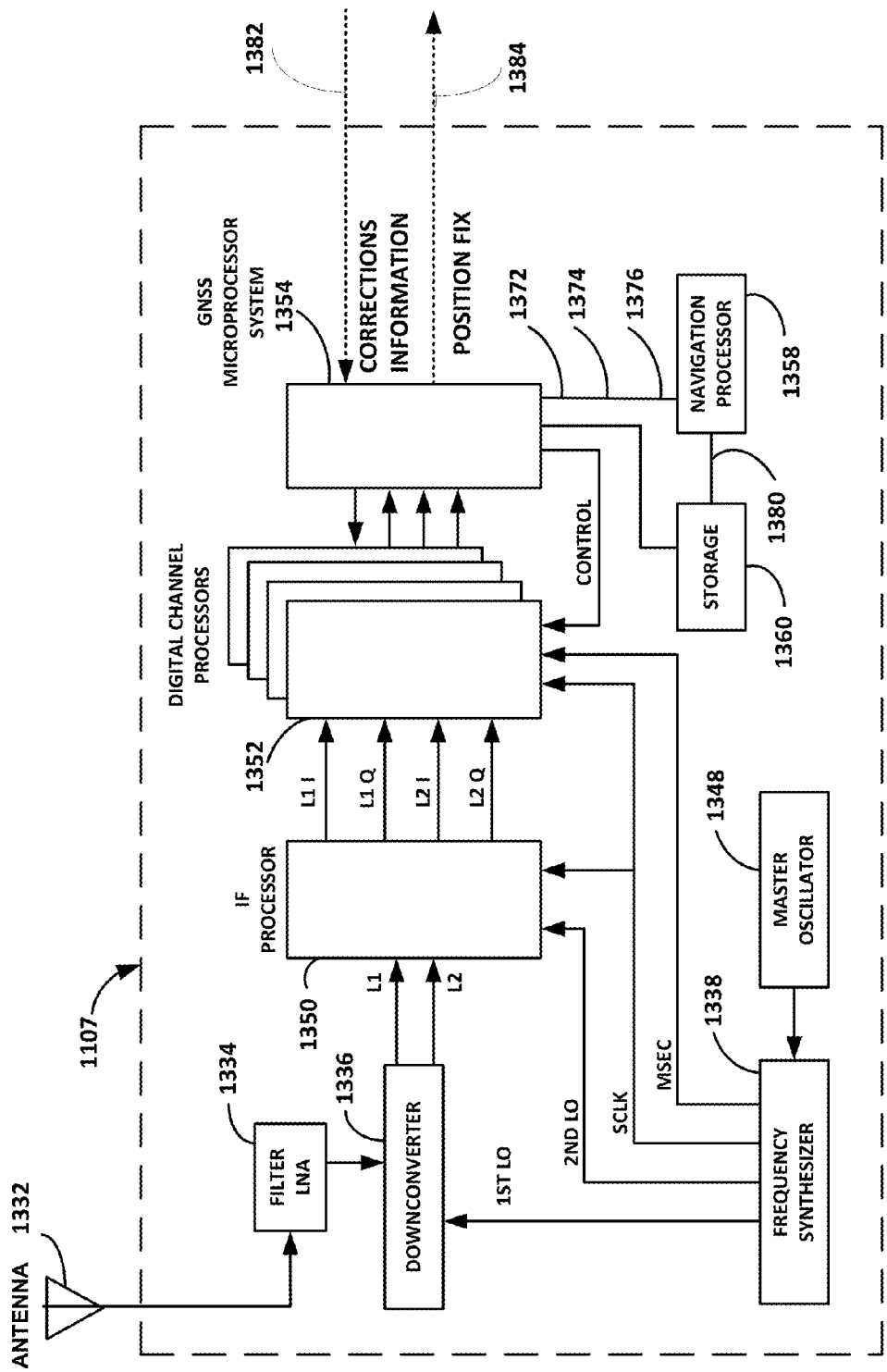
FIG. 13 depicts a block diagram of a GNSS receiver, according to one embodiment.

With reference now to FIG. 13, a block diagram is shown of an embodiment of an example GNSS chipset 1107 which may be used in accordance with various embodiments described herein. In particular, FIG. 13 illustrates a block diagram of a GNSS receiver in the form of a general purpose GPS capable of demodulation of the L1 and/or L2 signal(s) received from one or more GPS satellites. A more detailed discussion of the function of a receiver such as GPS receiver 1107 can be found in U.S. Pat. No. 5,621,416, by Gary R. Lennen, is titled "Optimized processing of signals for enhanced cross-correlation in a satellite positioning system receiver," and includes a GPS receiver very similar to GNSS chipset 1107 of FIG. 13.

In FIG. 13, received L1 and L2 signals are generated by at least one GPS satellite. Each GPS satellite generates different signal L1 and L2 signals and they are processed by different digital channel processors 1352 which operate in the same way as one another. FIG. 13 shows GPS signals (L1=1575.42 MHz, L2=1227.60 MHz) entering GPS chipset 1107 through a dual frequency antenna 1332. Antenna 1332 may be a magnetically mountable model commercially available from Trimble Navigation of Sunnyvale, Calif. Master oscillator 1348 provides the reference oscillator which drives all other clocks in the system. Frequency synthesizer 1338 takes the output of master oscillator 1348 and generates important clock and local oscillator frequencies used throughout the system. For example, in one embodiment frequency synthesizer 1338 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1334 performs filtering and low noise amplification of both L1 and L2 signals. The noise figure of GPS chipset 1107 is dictated by the performance of the filter/LNA combination. The downconvertor 1336 mixes both L1 and L2 signals in frequency down to approximately 175 MHz and outputs the analog L1 and L2 signals into an IF (intermediate frequency) processor 1350. IF processor 1350 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1352 inputs the digitally sampled L1 and L2 inphase and quadrature signals. All digital channel processors 1352 are typically are identical by design and typically operate on identical input samples. Each digital channel processor 1352 is designed to digitally track the L1 and L2 signals produced by one satellite by tracking code and carrier signals and to from code and carrier phase measurements in conjunction with the GNSS microprocessor system 1354. One digital channel processor 1352 is capable of tracking one satellite in both L1 and L2 channels. Microprocessor system 1354 is a general purpose computing device which facilitates tracking and measurements processes, providing pseudorange and carrier phase measurements for a determining position fix logic 1358. In one embodiment, microprocessor system 1354 provides signals to control the operation of one or more digital channel processors 1352. According to one embodiment, the GNSS microprocessor system 1354 provides one or more of pseudorange information 1372, Doppler Shift information 1374, and real Carrier Phase Information 1376 to the determining position fix logic 1358. One or more of pseudorange information 1372, Doppler Shift information 1374, and real Carrier Phase Information 1376 can also be obtained from storage 1360. One or more of the signals 1372, 1374, and 1376 can be conveyed to an external device's processor, such as processor 1109 that is external to the GNSS chipset 1107 (FIG. 11D). In accordance with various embodiments, processor 1354 is configured to output a position fix 1384 to a device outside of GNSS chipset 1107 such as to processor 1109. Additionally, processor 1354 can output a position, velocity, time (PVT) solution to a device outside of GNSS chipset 1107 such as to processor 1109. Determining position fix logic 1358 performs the higher level function of combining measurements in such a way as to produce position, velocity and time information for the differential and surveying functions, for example, in the form of a position fix 1380. Storage 1360 is coupled with determining position fix logic 1358 and microprocessor system 1354. It is appreciated that storage 1360 may comprise a volatile or non-volatile storage such as a RAM or ROM, or some other computer readable memory device or media. In some embodiments, determining position fix logic 1358 performs one or more of the methods of position correction described herein.

In some embodiments, microprocessor 1354 and/or determining position fix logic 1358 receive additional inputs for use in receiving corrections information (e.g., 1382). According to one embodiment, an example of the corrections information is WAAS corrections. According to one embodiment, examples of corrections information are differential GPS corrections, RTK corrections, signals used by the Enge-Talbot method, and wide area augmentation system (WAAS) corrections among others.

Although FIG. 13 depicts a GNSS chipset 1107 with navigation signals L1I, L1Q, L2I, L2Q, various embodiments are well suited different combinations of navigational signals. For example, according to one embodiment, the GNSS chipset 1107 may only have an L1I navigational signal. According to one embodiment, the GNSS chipset 1107 may only have L1I, L1Q and L2I. In other embodiments, GNSS chipset 1107 may use other combinations of navigation signals such as, but not limited to: and L1 signal, and L1 and L2C signal, and an L1I and L1Q signal.

Various embodiments are also well suited for future navigational signals. For example, various embodiments are well suited for the navigational signal L2C that is not currently generally available. However, there are plans to make it available for non-military receivers.

According to at least one embodiment, LMM smoothing logic 1130 resides at either or both of the storage 1360 and GNSS microprocessor system 1354. In at least one embodiment, GNSS processing is accomplished using software components implemented by a processor in combination with hardware components. For example, in one embodiment, GNSS chipset 1107 comprises dual frequency antenna 1332, filter/LNA (Low Noise Amplifier) 1334, and downconverter 1336 as described above. Downconverter 1336 outputs the 175 MHz intermediate frequency L1 and L2 signals and further processing of the IF L1 and L2 signals is performed by a processor which subsequently performs the processing steps described above. This includes, but is not limited to, further mixing of the L1 and L2 signals, digital sampling of inphase and quadrature signals at respective carrier frequencies, correlation, tracking loops, measurement processing, navigation processing, corrections processing, etc. In accordance with various embodiments, this processing is performed by a processor of GNSS chipset such as GNSS microprocessor system 1354. In one or more embodiments, this can be performed by an external processor such as processor 1109 which is separate from GNSS chipset 1107.

A filter/LNA (Low Noise Amplifier) 1334 performs filtering and low noise amplification of both L1 and L2 signals. The noise figure of GPS chipset 1107 is dictated by the performance of the filter/LNA combination. The downconvertor 1336 mixes both L1 and L2 signals in frequency down to approximately 175 MHz and outputs the analog L1 and L2 signals into an IF (intermediate frequency) processor 1350.

Figure 14:
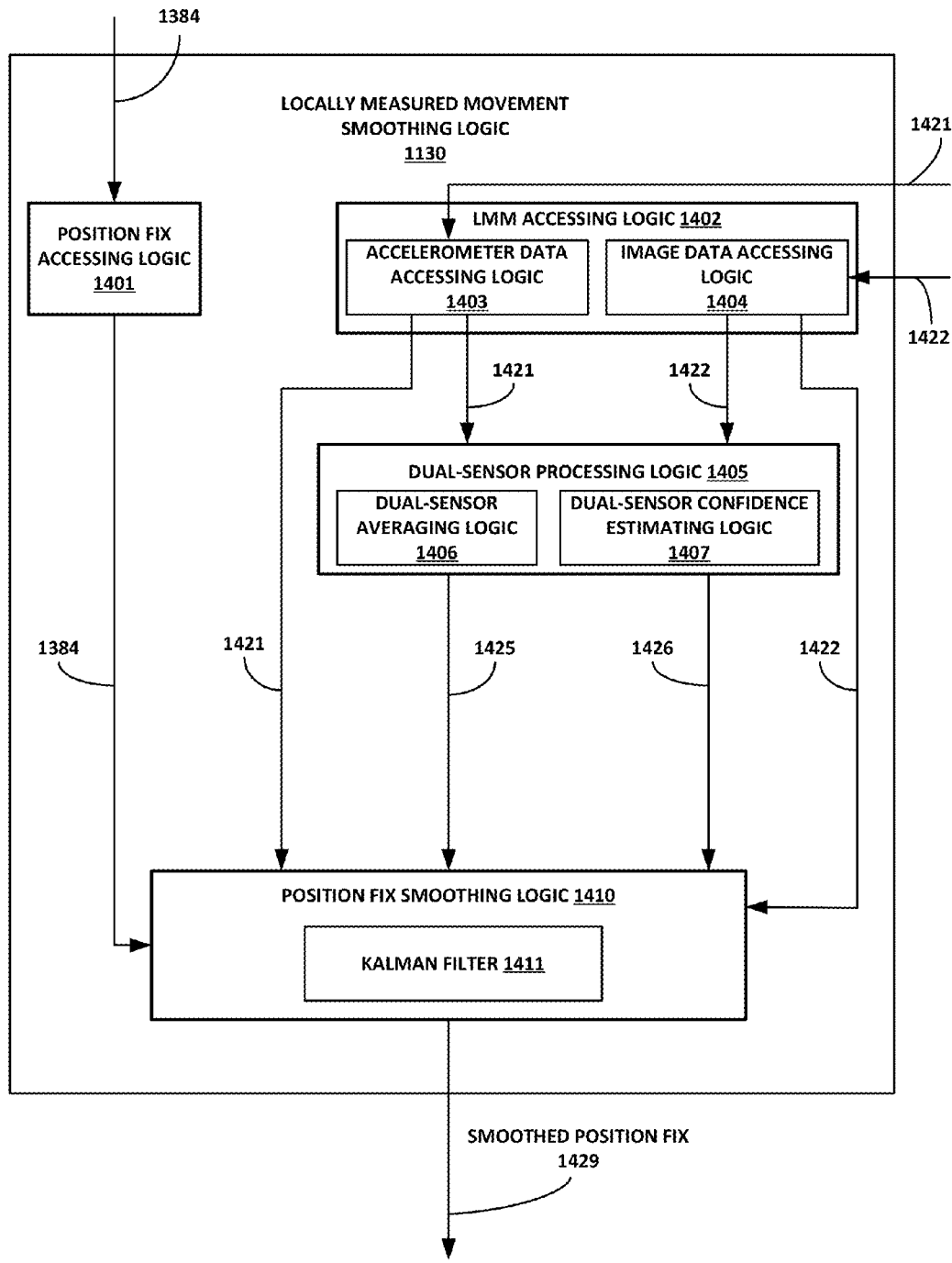
FIG. 14 is a block diagram of locally measured movement smoothing logic in accordance with at least one embodiment.

FIG. 14 is a block diagram of a locally measured movement (LMM) smoothing logic component (e.g.,) 1130 in accordance with at least one embodiment. In accordance with various embodiments, LMM smoothing logic 1130 can be resident within and executed by GNSS chipset 1107, or external to GNSS chipset 1107 such as in memory 1110 and executed by processor 1109. In the embodiment of FIG. 14, LMM smoothing logic 1130 comprises position fix accessing logic 1401, LMM accessing logic 1402 comprising accelerometer accessing logic 1403 and image capture device accessing logic 1404. LMM smoothing logic 1130 further comprises dual-sensor processing logic 1405 comprising dual-sensor averaging logic 1406 and dual-sensor confidence estimating logic 1406. Finally, LMM smoothing logic 1130 comprises position fix smoothing logic 1410 comprising a Kalman filter 1411. In accordance with various embodiments, LMM smoothing logic 1130 can be implemented using software, hardware, hardware and software, hardware and firmware, or a combination thereof. Furthermore, it is noted that in accordance with various embodiments, some of the components shown in FIG. 14 may not be used in implementations of LMM smoothing logic 1130.

In accordance with various embodiments, position fix accessing logic 1401 is configured to retrieve GNSS position fixes 1384 generated by a GNSS receiver system such as GNSS chipset 1107 of FIGS. 11A-E and 12A-D, or GNSS receiver 1107 shown in FIG. 13. In FIG. 14, position fix accessing logic 1401 outputs position fixes 1384 as an input to position fix smoothing logic 1410. In accordance with various embodiments, position fix accessing logic 1401 can output a position, velocity, time (PVT) solution as discussed above. In accordance with various embodiments, position fix(es) 1384 can be retrieved from a memory such as 1110 of FIGS. 11A-E and 12A-D, or storage 1360 of FIG. 13. In accordance with various embodiments, GNSS position fixes 1384 can be generated based upon uncorrected pseudorange information, smoothed pseudoranges, and corrected pseudoranges. In accordance with various embodiments, smoothed pseudoranges can be generated based upon carrier phase information, or based upon reconstructed carrier phase information derived from Doppler shift data. One example of creating smoothed pseudoranges in accordance with various embodiments is described in U.S. patent application Ser. No. 14/035,884, filed on Sep. 24, 2013, now U.S. Pat. No. 9,369,843, entitled, "EXTRACTING PSEUDORANGE INFORMATION USING A CELLULAR DEVICE" by Rudow et al., the contents of which are incorporated herein by reference.

In accordance with at least one embodiment, accelerometer data accessing logic 1403 of LMM accessing logic 1402 receives accelerometer data 1421 from accelerometer 1115, or memory 1110 of FIGS. 11A-E and 12A-D, which indicates position shifts of a device (e.g., device 1100 or cellular device 1200). In accordance with at least one embodiment, accelerometer data 1421 comprises a '6'-vector including the position coordinates (x, y, z) as well as the orientation angles θ, ϕ, and ψ of device 1100 or cellular device 1200. In another embodiment accelerometer data 1421 comprises the position coordinates (x, y, z) of device 1100 or cellular device 1200. Image data accessing logic 1404 of LMM accessing logic 1402 receives image data 1422 which is output from algorithm 21 of FIG. 1 which also indicates position shifts of a device (e.g., device 1100 or cellular device 1200) based upon image data. In accordance with various embodiments, image data 1422 is updated as algorithm 21 performs rolling sequential bundle adjustments to image data as described above and can either be sent directly to image data accessing logic 1422, or to storage such as memory 1110 of device 1100 or cellular device 1200. In other words, image data 1422 comprises '6'-vector 40 including the position coordinates (x, y, z) as well as the orientation angles θ, ϕ, and ψ of image capture device 1116 and is updated as new rolling sequential bundle adjustments are performed by algorithm 21.

In accordance with one embodiment, accelerometer data accessing logic 1402 outputs accelerometer data 1421 as an input to position fix smoothing logic 1410 and image data accessing logic 1404 outputs image data 1422 as another input to position fix smoothing logic 1410. As shown in FIG. 14, in one embodiment position fix smoothing logic 1410 comprises a Kalman filter 1411 which uses as inputs, position fix(es) 1384 and locally measured movement data such as accelerometer data 1421 and/or image data 1422. In one or more embodiments, position fix smoothing logic 1410 can use another filtering logic such as Robust Estimation, Least Square fitting methods, particle filtering, Hough transform, Random Sample Consensus (RANSAC), non-linear variants, such as sigma-editing, both a priori and a posteriori, and non-optimal (in a Gaussian sense) linear variants, instead of, or in addition to, the use of Kalman filter 1411. In one embodiment, Least Square fitting methods include using sequential least squares processing which is similar to Kalman filtering with the last N position and orientation states in the filter. In accordance with various embodiments, the output of Kalman filter 1411 is smoothed position fixes 1429. The smoothed position fixes 1429 are position fixes with improved quality of measurement for determining with greater precision, the position of device 1100 and/or cellular device 1200. More specifically, Kalman filter 1411 can identify outlier data points of position fix(es) 1384 which may be caused by erroneous pseudorange determination based upon, for example, multipath signal propagation which is exhibited when a GNSS receiver (e.g., GNSS chipset 1107) is located beneath foliage, or in built-up areas which tend to reflect GNSS signals from various locations to the antenna 1332 of the GNSS receiver. These outlier data points can be compared with accelerometer data 1421 and/or image data 1422 by Kalman filter 1411 and discarded for use in determining the position of, for example, device 1100 or cellular device 1200. In accordance with at least one embodiment, Kalman filter 1411 replaces the discarded position fix 1384 with a position fix derived at least in part using position data (e.g., accelerometer data 1421 and/or image data 1422) from accelerometer 1115 and/or image capture device 1116. For example, at a time t0, device 1100 or cellular device 1200 can generate a position fix 1384 using, for example, GNSS chipset 1107. Subsequent to time t0, as device 1100 or cellular device 1200 is moved it will continuously generate new position fixes 1384 using GNSS chipset 1107 as well as locally measured movement data (e.g., using accelerometer 1115 and/or image capture device 1116) which also can be used to determine a position fix for device 1100 or cellular device 1200. If it is determined that there is an outlier position fix 1384 which was generated by GNSS chipset 1107, Kalman filter 1411 can discard the erroneous position fix 1384 generated by GNSS chipset 1107 and replace it with a position fix generated using data received from accelerometer 1115 and/or image capture device 1116. In accordance with at least one embodiment, this can comprise adding a movement vector derived from data (e.g., 1421 and/or 1422) received from accelerometer 1115 and/or image capture device 1116 to a previous "correct" position fix generated by GNSS chipset 1107.

In another embodiment shown in FIG. 14, accelerometer data accessing logic 1403 and image data accessing logic 1404 can output accelerometer data 1421 and image data 1422 respectively as inputs to dual-sensor processing logic 1405. In the embodiment of FIG. 14, dual-sensor processing logic 1405 comprises dual-sensor averaging logic 1406 and/or dual-sensor confidence estimating logic 1407. In accordance with various embodiments, dual-sensor averaging logic 1406 is configured to determine an average value of the indicated movement of a device comprising LMM smoothing logic 1130. For example, if accelerometer data 1421 indicates that device 1100 or cellular device 1200 has moved 2 meters in a given time interval, and image data 1422 indicates that device 1100 or cellular device 1200 has moved 2.2 meters in the same time interval, dual-sensor averaging logic 1406 may average these two values and determine that device 1100 or cellular device 1200 has moved 2.1 meters in that time interval. This is output as movement data 1425 which is input to position fix smoothing logic 1410 instead of accelerometer data 1421 and image data 1422. It is well known in the art that, over time, the quality of the estimate of motion detected (e.g., accelerometer data 1421) by an accelerometer (e.g., 1115) degrades at a much higher rate that the estimate of motion detected by an image capture device (e.g., 1116), or more specifically image data 1422. In accordance with at least one embodiment, the discarded position fix is replaced with and averaged position fix based at least in part on data from dual-sensor averaging logic 1406.

Figure 15:
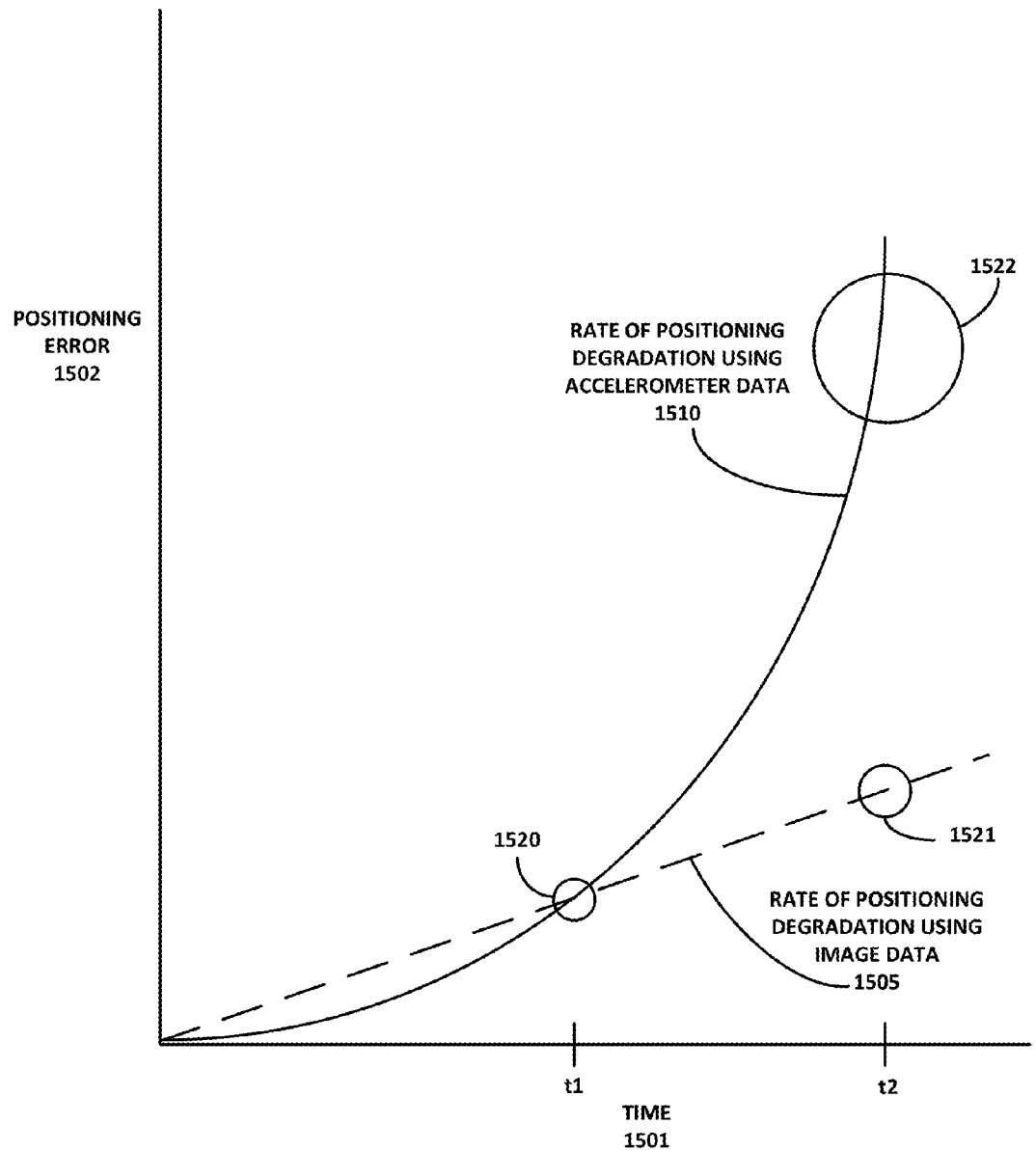
FIG. 15 is a graph showing the respective rates of positioning degradation using image data and accelerometer data.

This is shown in greater detail in FIG. 15 which plots positioning error 1502 as a y-axis over x-axis time 1501. Also shown in FIG. 15 is the rate of positioning degradation (over time) using image data (e.g., data plot 1505) and data plot 1510 which shows the rate of positioning degradation (over time) using accelerometer data. Typically, plot 1505 of the rate of positioning degradation (over time) using image data is a linear function while plot 1510 of the rate of positioning degradation (over time) using accelerometer data is a quadratic function meaning that the rate of positioning degradation over time is much greater when using accelerometer data. Additionally, the position error from image capture devices degrades more due to motion rather than time. Thus, the slope of data plot 1505 will increase as the velocity of the image capture device 1116 increases. However, at the velocities encountered by a typical user of a cellular telephone 1200, or device 1100, the rate of positioning degradation encountered using image data is still lower than the rate of positioning degradation encountered using an accelerometer. Also shown in FIG. 15 is the circular error probability of determining a position fix at a given time. As shown in FIG. 15, at time t1, the circular error probability (CEP) 1520 using either image data or accelerometer data is roughly the same. Thus, the size of CEP 1520 indicates that an output position fix using either accelerometer data or image data will fall somewhere within the circle of CEP 1520. As an example, if the size of CEP 1520 is a 20 cm. radius, it means that the determined movement, and in turn the position fix, of device 1100 or cellular device 1200 when relying upon either image data or accelerometer data is accurate within a 20 cm. radius of the actual position of device 1100 or cellular device 1200 at that time. CEP 1521 shows the circular error probability in determining the position fix using image data at a time t2. Due to the linear function of plot 1505, the size of CEP 1521 grows at a much slower rate that the size of CEP 1522 which shows the circular error probability in determining the position fix using accelerometer data at t2. Thus, at time t2, if the size of CEP 1521 now represents a 30 cm. radius, it means that the determined movement, and in turn the position fix, of device 1100 or cellular device 1200 when relying upon image data is accurate within a 30 cm. radius of the actual position of device 1100 or cellular device 1200 at that time. However, due to the quadratic function used to show the rate of positioning degradation (over time) using accelerometer data, the size of CEP 1522 now represents a 100 cm. radius. Thus, at time t2, the determined movement, and in turn the position fix, of device 1100 or cellular device 1200 when relying upon accelerometer data is now accurate within a 100 cm. radius of the actual position of device 1100 or cellular device 1200 at that time. Thus, over time it becomes less desirable to rely upon accelerometer data alone in determining how far device 1100 or cellular device 1200 has moved.

Returning to FIG. 14, in accordance with various embodiments, weighting of data may be implemented by dual-sensor averaging logic 1406 based upon how old either of accelerometer data 1421 and/or image data 1422 is. As an example, over time image data 1422 can be weighted with a higher value as a metric of determining locally measured movement than accelerometer data 1421. Thus, referring again to FIG. 15, at time t1, accelerometer data 1421 and image data 1422 can be equally weighted (e.g., 0.5 for both accelerometer data 1421 and image data 1422) as they both result in similar CEPs. However, at time t2, due to the much larger CEP incurred using accelerometer data 1421, image data 1422 can be given a higher weighted value while accelerometer data 1421 can be give a lower weighted value (e.g., 0.7 for image data 1422 and 0.3 for accelerometer data 1421). Thus, in various embodiments, movement data 1425 can represent an average value of locally measured movement of device 1100 or cellular device 1200 based upon acceleration data 1421 and image data 1422, or can be a weighted average of locally measured device movement information based upon acceleration data 1421 and image data 1422.

In another embodiment, dual-sensor confidence estimating logic 1407 receives accelerometer data 1421 and image data 1422 and generates movement data 1426 as an input to position fix smoothing logic 1410. In accordance with various embodiments, dual-sensor confidence estimating logic 1407 is used to determine if either of accelerometer data 1421 or image data 1422 has become an unreliable metric for determining the movement of device 1100 or cellular device 1200. For example, a respective confidence metric can be generated by dual-sensor confidence estimating logic 1407 for each of accelerometer data 1421 and image data 1422. For example in one embodiment, dual-sensor confidence estimating logic 1407 can use respective Kalman filters to identify outlier data points from accelerometer data 1421 and image data 1422. Again, according to various embodiments, dual-sensor confidence estimating logic 1407 can use another filtering logic such as Robust Estimation, Least Square fitting methods, particle filtering, Hough transform, Random Sample Consensus (RANSAC), non-linear variants, such as sigma-editing, both a priori and a posteriori, and non-optimal (in a Gaussian sense) linear variants, instead of, or in addition to, the use of Kalman filter 1411. In one embodiment, Least Square fitting methods include using sequential least squares processing which is similar to Kalman filtering with the last N position and orientation states in the filter. These outlier data points would then be discarded by dual-sensor confidence estimating logic 1407 and not used for position fix smoothing. In another embodiment, the values of accelerometer data 1421 and image data 1422 can be compared to determine whether one or the other should be discarded. For example, if accelerometer data 1421 indicates that device 1100 or cellular device 1200 has moved 2 meters, image data 1422 indicates that device 1100 or cellular device 1200 has moved 0.5 meters, the disparity between these sets of data may indicate that one should not be used as an input to position fix smoothing logic 1410. For example, greater weight may be given to image data 1422 due to the lower rate of positioning degradation over time when using image data. Thus, if there is a disparity between accelerometer data 1421 and image data 1422 which exceeds a pre-determined parameter, dual-sensor confidence estimating logic 1407 will discard accelerometer data 1421 and send image data 1422 alone to position fix smoothing logic 1410. In accordance with at least one embodiment, when neither accelerometer data 1421 nor image data 1422 is available for position fix smoothing a default condition in which the position fix 1384 is output from position fix smoothing logic 1410. Additionally, in accordance with one embodiment, if accelerometer data 1421 is deemed as having expired, it will not be used by LMM smoothing logic 1130. For example, accelerometer data 1421 is combined with a determined GNSS position fix 1384, which defines an initializing time for the accelerometer 1115, to derive a subsequent position fix. However, if the "age" of the GNSS position fix 1384 exceeds a pre-defined parameter (e.g., greater than 10 seconds), the circular error probability of a position fix using accelerometer data 1421 may be determined to be too great in accurately determining a position fix. In such a case, the accelerometer data 1421 may be discarded or disregarded by LMM smoothing logic 1130 in determining or disciplining a position fix.

Figure 16A:
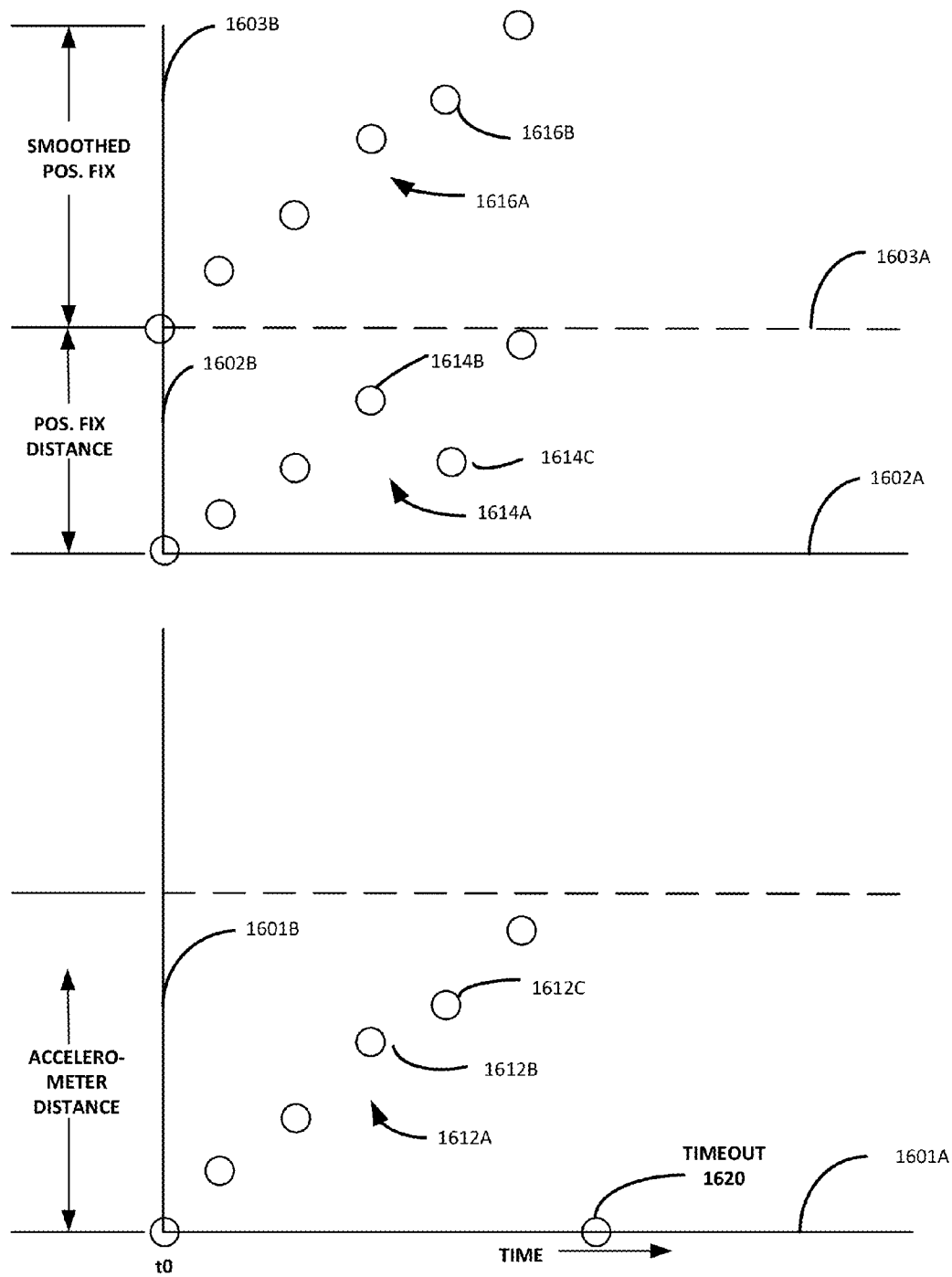
FIGS. 16A-16D are graphs of data plots showing the replacement of outlier position fix data points in accordance with various embodiments.

FIG. 16A depicts a diagram of a pattern where locally measured movement information (e.g., 1421 of FIG. 14) from an accelerometer (e.g., 1115 of FIG. 11D) to improve position determination, according to one embodiment. Axis 1601A, 1602A, 1603A are for time for an accelerometer measurement of movement, a position fix, and a smoothed position fix respectively. Axis 1601B is for distance measured by the accelerometer 1115, axis 1602B is for position fix distance (e.g., 1384 of FIG. 13) output by GNSS chipset 1107, axis 1603B is for a smoothed position fix (e.g., 1429 of FIG. 14) output by LMM smoothing logic 1130. Plot 1612A represents locally determined measurements of the movement of device 1100 or cellular device 1200 using accelerometer 1115. As shown in FIG. 16A, the distance traveled by device 1100 or cellular device 1200 during a given epoch is represented by the vertical distance between two data points (e.g., 1612B and 1612C, or 1614B and 1614C). At time t0, the position of device 1100 or cellular device 1200 is known using, for example, a position fix 1384 generated by GNSS chipset 1107. Time t0 is also used as the initializing time for accelerometer 1115. Subsequent position fixes 1384 generated by GNSS chipset 1107 are represented by plot 1614A. In accordance with various embodiments, the known position of device 1100 or cellular device 1200, as shown as a data point at t0, as well as the locally measured movement information represented by plot 1612A provide position fixes for determining the location at which device 1100 or cellular device 1200 is located based upon locally measured accelerometer distance 1421. Plot 1616A represents discreet smoothed position fixes output by LMM smoothing logic 1130 based upon detecting outlier data points in plot 1614A (e.g., 1614C of FIG. 16A) which may result from various factors which affect the precision with which a GNSS receiver can determine its position. Distance measured by the accelerometer 1115 is an example of locally measured movement information. The locally measured accelerometer distance 1421 is locally measured movement of the real distance of a device 1100 or cellular device 1200 as it is moving. The locally measured accelerometer distance 1421 is used to correct the position fix distances 1614C which indicates that device 1100 or cellular device 1200 moved backwards at data point 1614C. In contrast, data from accelerometer 1115, as shown in plot 1612A, indicate that device 1100 or cellular device 1200 continued moving at a constant rate. As discussed above, the distance traveled as determined by GNSS chipset 1107 can be determined as $P_1-P_2$ (e.g., data point 1614B-data point 1614C). In accordance with at least one embodiment, when the distance traveled (e,g., $P_1-P_2$) exceeds a locally measured movement (LMM) position shift distance for the same epoch (e.g., 1612B-1612C) by a selected threshold value (e.g., 1.5 times the LMM position shift distance or greater), the GNSS position fix at $P_2$ (e.g., 1614C) is identified as an outlier data point and is discarded and the LMM position shift distance (e.g., 1612B-1612C) is added to the previous GNSS position fix (e.g. $P_1$ (data point 1614B)) to determine the position of a device. As a result, data point 1616B of smoothed position fix plot 1616A approximates the accelerometer distance data point 1612C rather than position fix distance data point 1614C. It is noted that the selected threshold value used to identify an outlier data point can be larger or smaller than that discussed above. In accordance with various embodiments, upon detecting outlier data such as data point 1614C, LMM smoothing logic 1130 discards that outlier position fix 1384, and replaces it with a new smoothed position fix 1429 of FIG. 14 (e.g., data point 1616B of FIG. 16A) based at least in part on the data from accelerometer 1115. In accordance with various embodiments the accelerometer data 1421 from accelerometer 1115 (e.g., 1612C of FIG. 16A) can be used as a replacement to an outlier position fix data point (e.g., 1614C) to derive a smoothed position fix data point (e.g., 1616B). As depicted, at point 1620, the accelerometer reaches a limiting factor at which time data from accelerometer 1115 may be considered unreliable as discussed above at which point accelerometer 1115 can be set to zero.

Figure 16B:
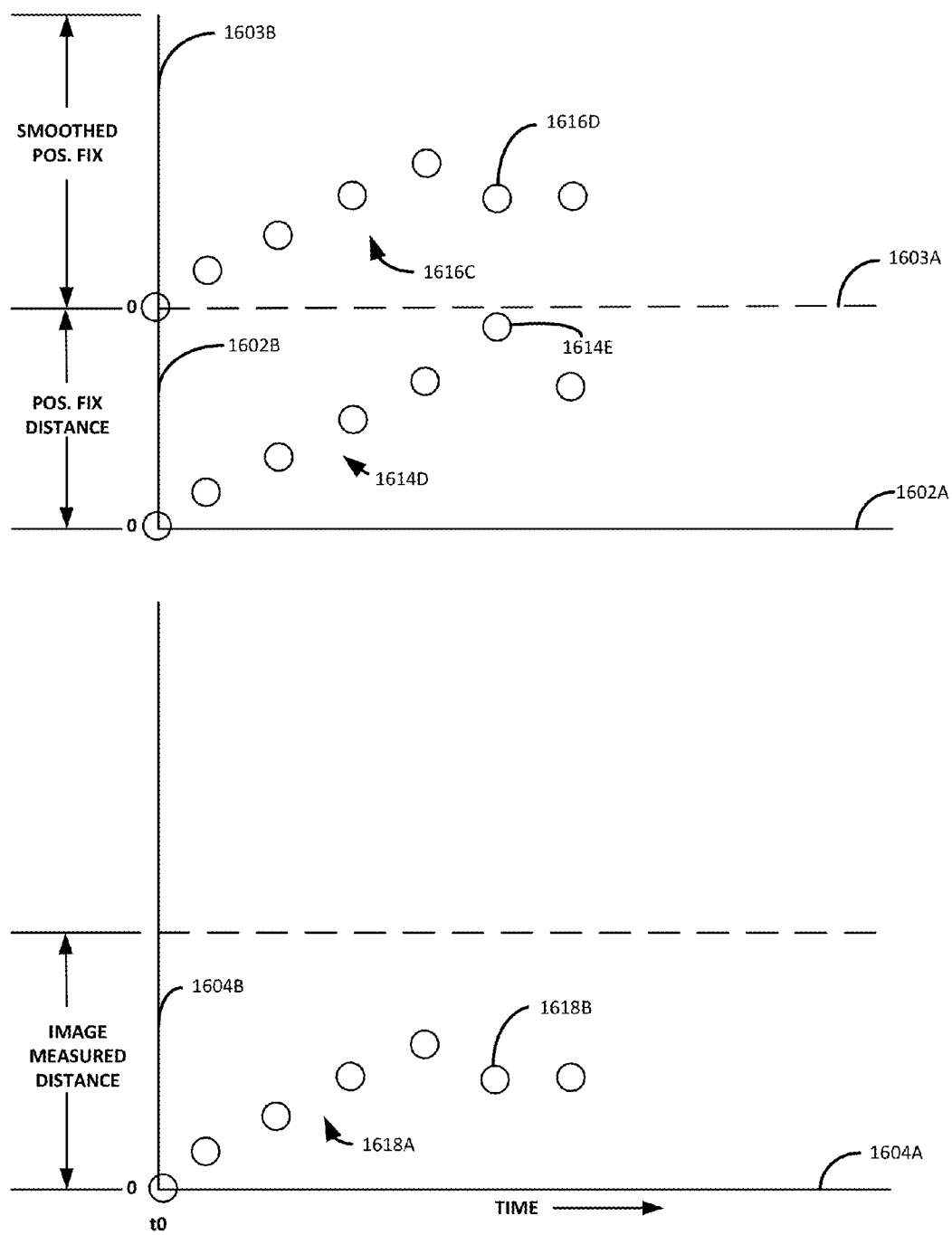

FIG. 16B depicts a diagram of a pattern where locally measured movement information (e.g., plot 1618A of FIG. 16B) from an image capture device (e.g., 1116 of FIG. 11D) to improve position determination, according to one embodiment. Axis 1602A, 1603A, 1604A are for time, axis 1604B is for distance measured by the image capture device 1116, axis 1602B is for position fix distance (e.g., data plot 1614D), axis 1603B is for smoothed position fixes (e.g., data plot 1616C). Distance measured by the image capture device 1116 is another example of locally measured movement information. The locally measured image capture device distances shown in plot 1618A represent locally measured movements of the real distance device 1100 or cellular device 1200 has moved since time t0. The locally measured image capture device distance 1618B is used to correct the position fix distance 1614E which has been identified as an outlier by LMM smoothing logic 1130. In other words, the distance traveled by device 1100 and/or cellular device 1200 (e.g., position fix 1384 as shown at data point 1614E of FIG. 16B) exceeds the locally measured movement (LMM) position shift distance for the same epoch by a selected threshold value. As a result, data point 1616D of smoothed position fix plot 1616C approximates the image measured distance data point 1618B rather than position fix distance data point 1614D. Therefore, the plot of the smoothed position fix distances 1616C approximates the data shown in plot 1618A.

Figure 16C:
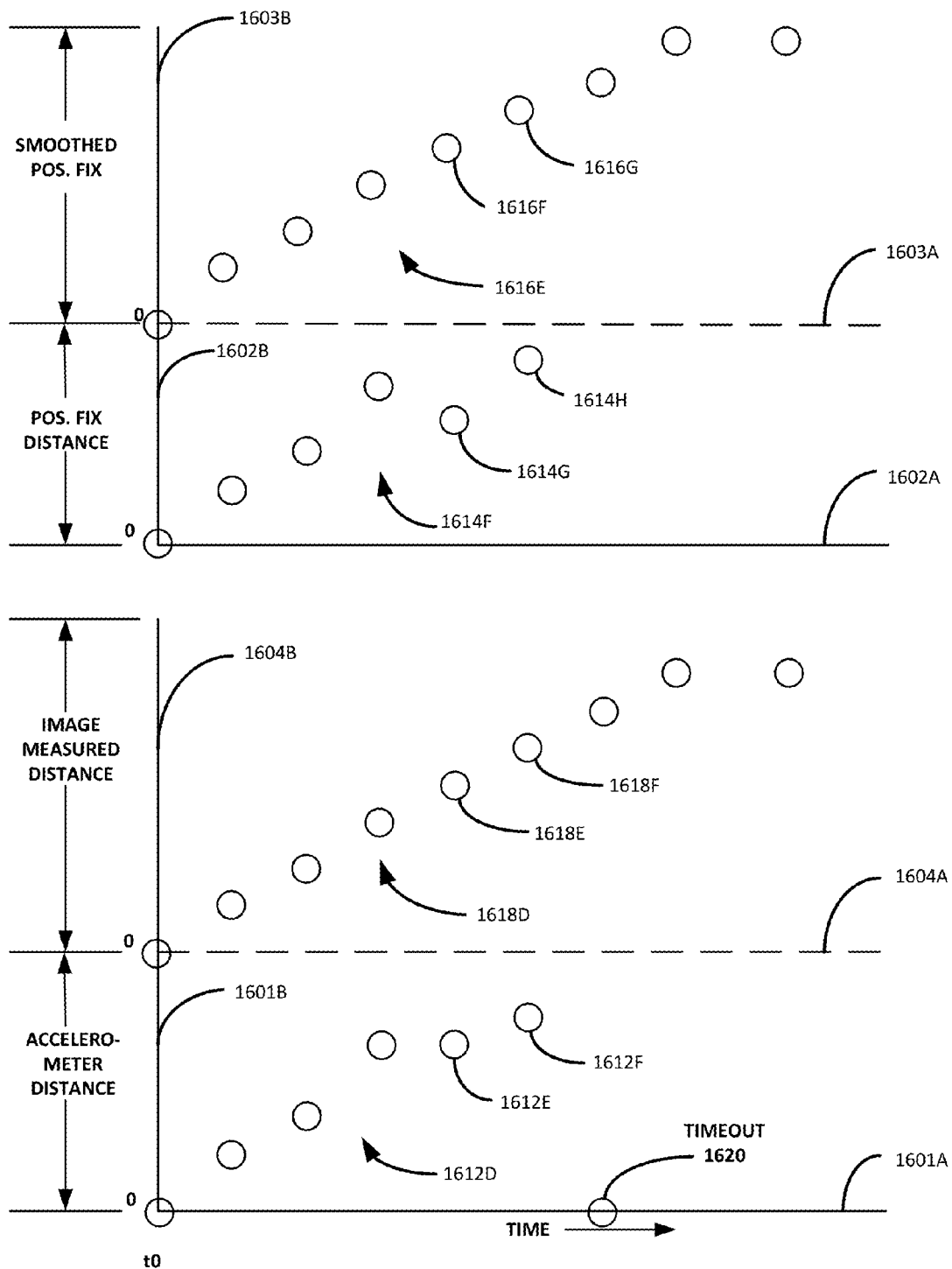

FIG. 16C depicts a diagram of a pattern where locally measured movement information data plots 1612D and 1618D respectively from accelerometer 1115 and image capture device 1116 are continuously integrated together to improve position determination during a period of time. Again, the data points comprising data plots 1612D and 1618D are based upon accelerometer data 1421 and image data 1422 respectively. Axis 1601A, 1602A, 1603A and 1604A are for time, axis 1601B represents distances measured by the accelerometer 1115 as shown by plot 1612D, axis 1602B represents position fix distances as shown by plot 1614G, axis 1603B represents smoothed position fixes as shown by plot 1616E, and axis 1604B is for distances measured by image capture device 1116 as shown by plot 1618D. Distances represented in plots 1612C and 1618D are based upon data from accelerometer 1115 and image capture device 1116 and are examples of locally measured movement information. In the example of FIG. 16C, distances from plots 1612C and 1618D are used to correct an outlier position fix 1614G. In FIG. 16C, the data from accelerometer 1115 is differing somewhat from that received from image capture device 1116, possibly due to the greater increase in positioning error over time exhibited by accelerometers. Therefore, the curve of the smoothed position fix as shown by plot 1616E approximates the curve of plot 1618D rather than plot 1612D as the data from image capture device 1116 is used as the basis for correcting the outlier position fix 1614I. In other words, the distance traveled by device 1100 and/or cellular device 1200 (e.g., position fix 1384 as shown at data point 1614G of FIG. 16C) exceeds the locally measured movement (LMM) position shift distance for the same epoch by a selected threshold value. As a result, data point 1616F of smoothed position fix plot 1616E approximates the image measured distance data point 1618B rather than position fix distance data point 1614G.

Figure 16D:
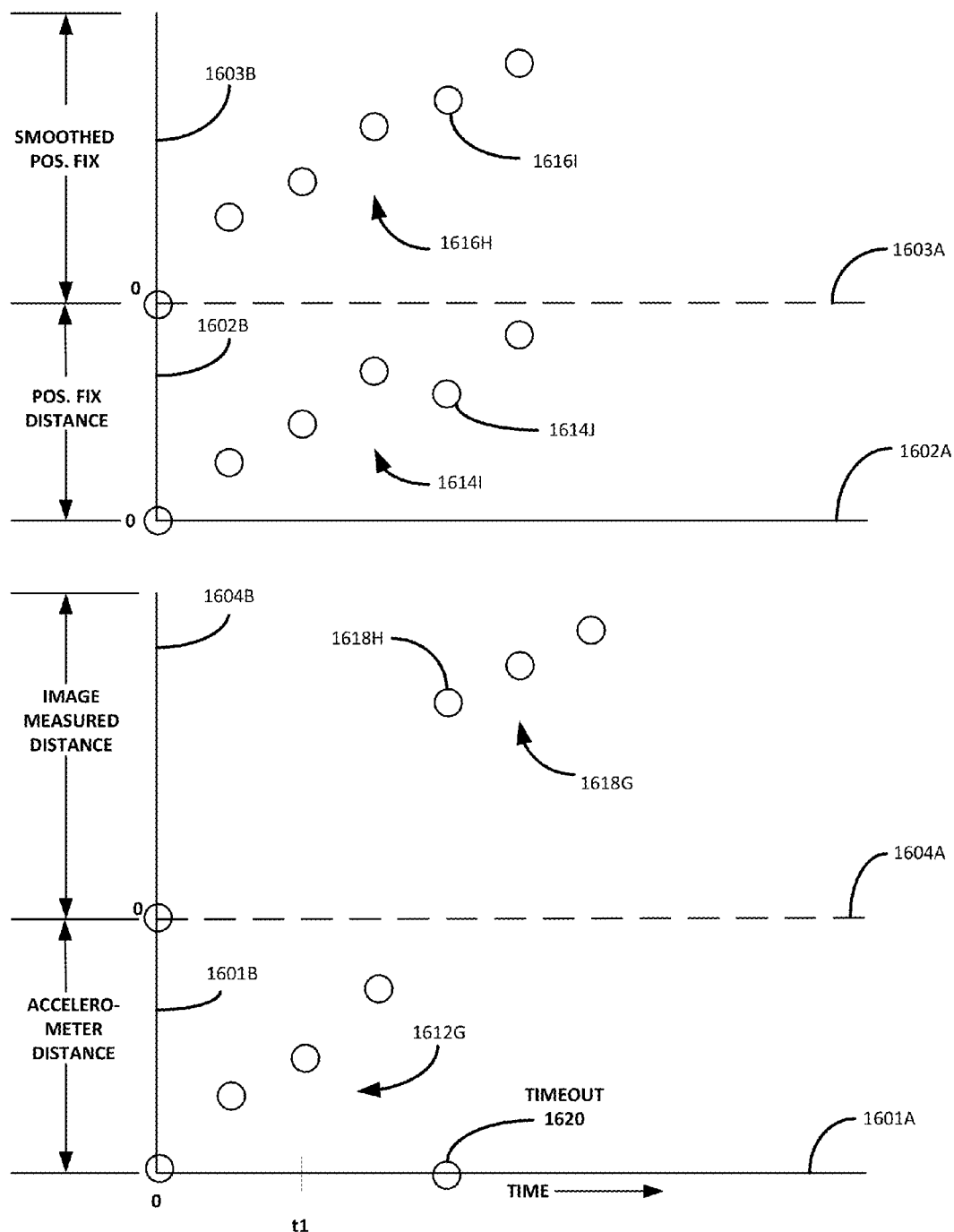

FIG. 16D depicts a diagram of a pattern where the position determination is improved by alternating the use of non-overlapping locally measured movement information 1612G and 1618G from accelerometer 1115 and image capture device 1116 respectively, according to one embodiment. For example, up to time t1, only the locally measured movement information from accelerometer 1115 (e.g., accelerometer data 1421) is used as represented by plot 1612G. Subsequent to that only the locally measured movement information from image capture device 1116 (e.g., image data 1422) is used as represented by plot 1618G. The locally measured accelerometer data 1612G and the image capture device's data 1618G are used to correct the position fix distances as represented by plot 1614J as needed. More specifically, the position fix represented by data point 1614J is identified as an outlier data point and is replaced based upon image data 1422 due to the timeout limit 1620 having been reached for data from accelerometer 1115. Therefore, the curve of the smoothed position fixes as shown by plot 1616H utilizes image data 1422 to derive a position fix using data point 1618H to replace data point 1614J.

For the sake of simplicity, FIGS. 16A-16D were depicted with movement information from one sensor or two sensors. Also, the features dual-sensor averaging logic 1406 and dual-sensor confidence estimating logic 1407 have not been represented in FIGS. 16A-16D. Additionally, various embodiments are well suited to a different number of sensors as well.

In the above description of various embodiments, device 1100 or cellular device 1200 was used as example devices. In current practice, most cellular telephones currently are configured with image capture devices, GPS/GNSS chipsets, and accelerometers which can be in accordance with various embodiments. It is noted that various embodiments are not limited to cellular devices alone and can be implemented on a wide variety of devices (e.g., 1100 of FIGS. 11A-E) including, but not limited to, laptop computers, tablet computers (e.g., Microsoft Surface, Apple iPads and iPad mini families; and Samsung Galaxy Tab families), personal digital assistants (PDAs), surveying devices such as surveying rover units, a surveying data collector, a vehicular system, or the like.

Figure 17A:
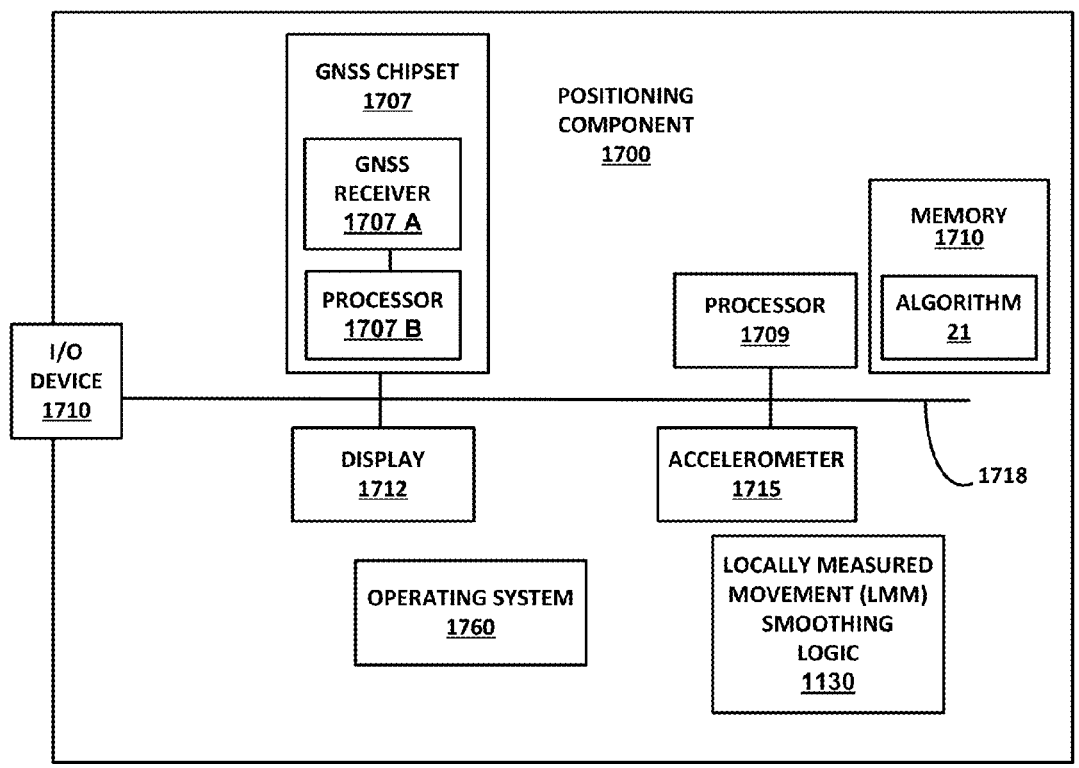
FIG. 17A is a block diagram of a positioning component which provides locally measured movement smoothing of position fixes for an image capture device in accordance with at least one embodiment.

FIG. 17A is a block diagram of a positioning component 1700 which provides locally measured movement smoothing of position fixes for an image capture capable device in accordance with at least one embodiment. It is noted that the image capture capable device with which positioning component 1700 is coupled may comprise a camera, a video camera, a digital camera, a digital video camera, a digital camcorder, a stereo digital camera, a stereo video camera, a motion picture camera, and a television camera. For the purpose of the present discussion, positioning component 1700 will be described as being coupled with a "camera".

The positioning component 1700 includes a bus 1718, a GNSS chipset 1707, a processor 1709, memory 1710, a display 1712, at least one accelerometer 1715, locally measured movement smoothing logic 1130 (e.g., LMM smoothing logic 1130), and operating system 1160. Components 1707, 1709, 1710, 1712, and 1715, are all connected with the bus 1718. For the purpose of brevity, the function of the components listed above will not be repeated as they have been described in detail with reference to FIGS. 11A-E and 12A-D. In FIG. 17A, positioning component 1700 further comprises an input/output (I/O) connection 1710. I/O connection 1710 is used to facilitate the exchange of data between positioning component 1700 and a camera with which it is coupled. Examples of I/O connection 1710 in accordance with various embodiments include, but are not limited to, implementations of the IEEE 1394 serial bus interface standards more commonly known as "Firewire" and a Universal Serial Bus (USB) connection, or both. Firewire and USB are widely used in the consumer market and in at least embodiment, both connections are provided by I/O connection 1710. It is noted that I/O connection 1710 is not limited to these implementations alone and that other industry standard, or proprietary, connectors and communication protocols may be implemented as I/O connection 1710. Increasingly, the market is overwhelmingly dominated by digital cameras which may, or may not have integrated position fix generating capabilities. In accordance with various embodiments, positioning component 1700 can be coupled with a camera to provide positioning information based upon position fixes generated by GNSS chipset 1707, or by a GNSS chipset internal to the camera to which it is coupled. In so doing, positioning component 1700 facilitates using locally measured movement smoothing of position fixes generated by the camera itself, accelerometer 1715, or by GNSS chipset 1707. It is noted that in at least one embodiment, GNSS chipset 1707 can be a high precision GNSS receiver such as 1107 of FIG. 13. Furthermore, while not shown in FIG. 17A, other components described above with reference to FIGS. 11A-E and 12A-D can be implemented by positioning component 1700. Examples include, but are not limited to, satellite receiver 1106, FM radio receiver 1108, cellular transceiver 1111, and Wi-Fi transceiver 1114 which can be used to receive GNSS corrections data from sources outside of positioning component 1700. Display 1712 can be used to display for users a visual representation, using a map display, of the location at which they are located as determined by LMM smoothing logic 1130.

Figure 17B:
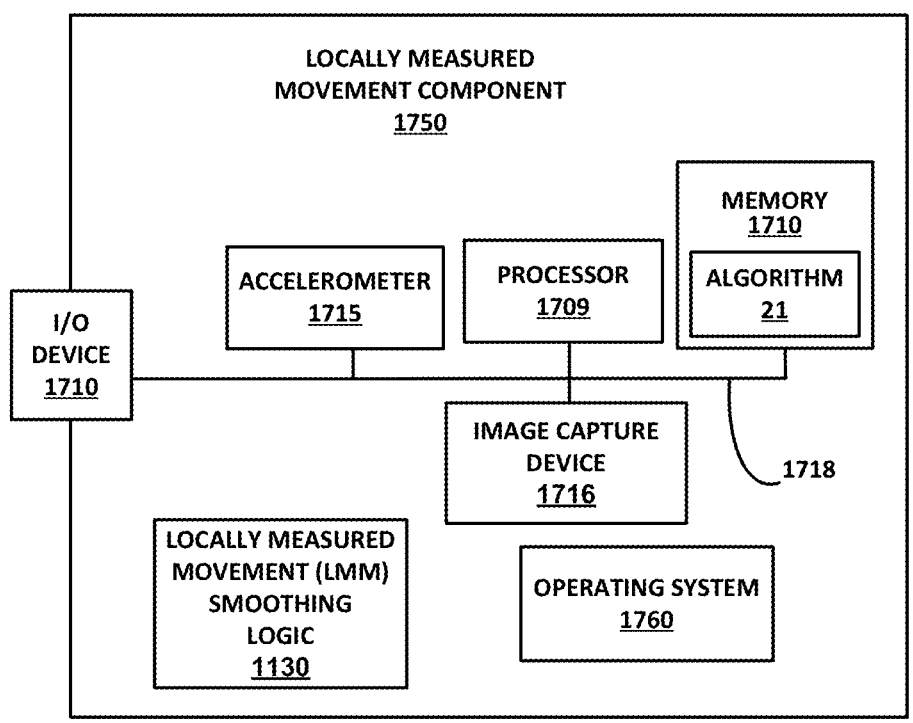
FIG. 17B is a block diagram of a locally measured movement component which provides locally measured movement smoothing of position fixes for GNSS receivers in accordance with at least one embodiment.

FIG. 17B is a block diagram of a locally measured movement component 1750 which provides locally measured movement smoothing of position fixes for GNSS receivers in accordance with at least one embodiment. The locally measured movement component 1750 includes a bus 1718, a processor 1709, memory 1710, a display 1712, at least one accelerometer 1715, an image capture device 1716, locally measured movement smoothing logic 1130 (e.g., LMM smoothing logic 1130), and operating system 1160. Components 1709, 1710, 1712, 1715, and 1716 are all connected with the bus 1718. For the purpose of brevity, the function of the components listed above will not be repeated as they have been described in detail with reference to FIGS. 11 and 17A. Many people own personal GPS/GNSS receivers which they can use for navigation, either on foot, by bicycle, or in a vehicle. In accordance with various embodiments, locally measured movement component 1750 can be coupled with a GPS/GNSS receiver to provide positioning information including position fix smoothing based upon position fixes generated by a GNSS chipset internal to the GPS/GNSS receiver to which it is coupled. In so doing, locally measured movement component 1750 facilitates using locally measured movement smoothing of position fixes generated by the GPS/GNSS receiver itself, accelerometer 1715, or by GNSS chipset 1707. While not shown in FIG. 17B, other components described above with reference to FIG. 11D can be implemented by locally measured movement component 1750. Examples include, but are not limited to, satellite receiver 1106, FM radio receiver 1108, cellular transceiver 1111, and Wi-Fi transceiver 1114.

Figure 18:
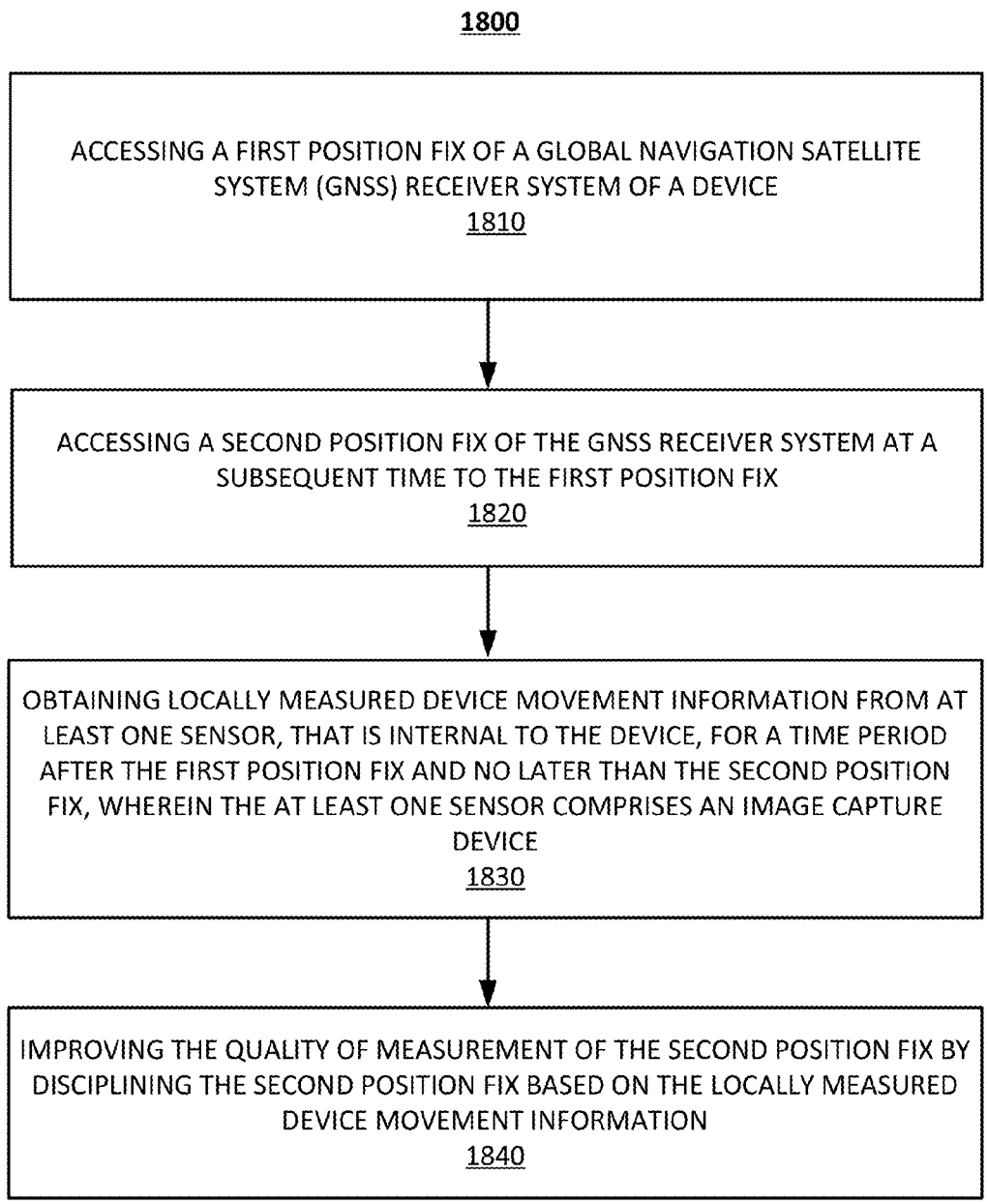
FIG. 18 is a flowchart of a method of improving position determination of a device using locally measured movement in accordance with at least one embodiment.

FIG. 18 is a flowchart of a method 1800 of improving position determination of a device using locally measured movement in accordance with at least one embodiment.

In operation 1810 of FIG. 18, a first position fix of a Global Navigation Satellite System (GNSS) receiver system (e.g., GNSS chipset of FIGS. 11A-E and 12A-D) of a device is accessed. As discussed above, in accordance with various embodiments, LMM smoothing logic 1130 obtains position fixes (e.g., 1384 of FIG. 13) either directly from a GNSS receiver system, or from a memory to which those position fixes are stored. In accordance with various embodiments, the GNSS receiver system comprises a plurality of subsystems and wherein at least one of said plurality of subsystems is accessible by a processor, or the GNSS receiver system comprises a GNSS chipset. In various embodiments the device of which the GNSS receiver is a portion is a mobile device that may easily be moved from a first position to a second position that is different from the first position. Some examples of devices that are easily moved are those that are hand-holdable such as cellular telephones and tablet computers or wearable devices such as watches, rings, bracelets, and the like. In some embodiments, the device itself may be coupled with or a portion of a mobile entity such as a vehicle. For example, the device may be a portion of an unmanned aerial vehicle (also known as a remotely piloted vehicle or a drone).

In operation 1820 of FIG. 18, a second position fix of said GNSS receiver system is accessed at a subsequent time to said first position fix. As shown in FIGS. 16A-16D, plots 1614A, 1614D, 1614G, and 1614I show plots of data points representing a plurality of position fixes from a GNSS receiver or GNSS chipset 1107.

In operation 1830 of FIG. 18, locally measured device movement information is obtained from at least one sensor that is in a known physical relationship to the device for a time period after the first position fix and no later than the second position fix. The known physical relationship may be at a known location that is either internal or external to the device. For example, with respect to an externally located sensor, the location and orientation of the sensor is known with respect to the device and other components of the device. For example, with respect to an externally located sensor, the sensor may be physically separate from the device at a fixed distance and relationship with respect to the device and components of the device (e.g., in one embodiment both the device and the sensor may be coupled to one another in a fixed relationship with hook and loop fasteners, adhesive, or other fasteners; in another embodiment both the device and the sensor may commonly coupled separately, but in a fixed relationship with one another, to a shared intermediate item such as, but not limited to, a pole or a portion of an unmanned aerial vehicle). The sensor is selected from at least one of an image capture device (e.g., 1116 of FIG. 11D) and at least one accelerometer (e.g., 1115 of FIG. 11D). Referring again to FIG. 14, accelerometer data 1421 and image data 1422 are received by LMM accessing logic 1402. In at least one embodiment, the accelerometer data 1421 and/or image data 1422 is retrieved from a memory. In accordance with various embodiments, the accelerometer data 1421 and the image data 1422 can be sent directly to position fix smoothing logic 1410. Alternatively, accelerometer data 1421 and image data 1422 can be sent to dual-sensor processing logic 1405. In one embodiment, dual-sensor averaging logic 1406 of dual-sensor processing logic 1405 creates an average value of locally measured device movement information received from accelerometer 1115 and image capture device 1116 to indicate the movement of the device. In one embodiment, the average value of locally measured device movement information comprises a weighted average. In another embodiment, dual-sensor confidence estimating logic 1407 of dual-sensor processing logic 1405 is configured to determine if the locally measured device movement information (e.g., accelerometer data 1421) received from accelerometer 1115 has become an unreliable metric for determining the movement of a device. In response to determining that the locally measured device movement information received from accelerometer 1115 has become an unreliable metric for determining the movement of a device, dual-sensor processing logic 1405 is configured to use the locally measured device movement information (e.g., image data 1422) received from image capture device 1116 for disciplining the second position fix.

In operation 1840 of FIG. 18, the quality of measurement of the second position fix is improved by disciplining the second position fix based on the locally measured device movement information. In accordance with various embodiments, position fix smoothing logic 1410 is configured to adjust erroneous position fixes which may be generated by the GNSS receiver system due to, for example, multipath signal error which can cause erroneous calculation of a position fix. In one embodiment, position fix smoothing logic 1410 comprises a Kalman filter 1411 which is configured to determine that the second position fix comprises an outlier value. In one or more embodiments, position fix smoothing logic 1410 can use another filtering logic such as Robust Estimation, Least Square fitting methods, particle filtering, Hough transform, Random Sample Consensus (RANSAC), non-linear variants, such as sigma-editing, both a priori and a posteriori, and non-optimal (in a Gaussian sense) linear variants, instead of, or in addition to, the use of Kalman filter 1411. In one embodiment, Least Square fitting methods include using sequential least squares processing which is similar to Kalman filtering with the last N position and orientation states retained in the filter. Referring again to FIGS. 16A-16D, in accordance with various embodiments, Kalman filter 1411 is configured to detect when outlier values of position fixes 1384 (e.g., 1614C, 1614E, 1614I, and 1614K respectively) occur. In accordance with at least one embodiment, Kalman filter 1411 is configured to discard a position fix which is identified as an outlier value. In at least one embodiment, Kalman filter 1411 is configured to use locally measured device movement information originating from accelerometer 1115 and/or image capture device 1116 and received either from LMM accessing logic 1402 or dual-sensor processing logic 1405.

In accordance with various embodiments, the GNSS receiver system comprises a plurality of sub-systems of which at least one of the sub-systems is accessible by a processor and the accessing of position fixes, obtaining locally measured device movement information, and improving the quality of measurement of the second position fix are performed by one or more hardware processors located in the GNSS receiver system. In another embodiment, the GNSS receiver system comprises a GNSS chipset 1107 and the accessing of position fixes, obtaining locally measured device movement information, and improving the quality of measurement of the second position fix are performed by one or more hardware processors located in the device and outside of the GNSS chipset (e.g., 1109 of FIGS. 11A-E and/or 12A-D). In at least one embodiment, the GNSS receiver system comprises a GNSS chipset 1107 and the accessing of position fixes, obtaining locally measured device movement information, and improving the quality of measurement of the second position fix are performed by one or more hardware processors (e.g., 1354 of FIG. 13) located in GNSS chipset.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of improving position determination of a device using locally measured movement, said method comprising:
   accessing a first position fix of a Global Navigation Satellite System (GNSS) receiver system of a device;
   accessing a second position fix of said GNSS receiver system at a subsequent time to said first position fix;
   obtaining locally measured device movement information, from at least one sensor that is in a known physical relationship to said device, for a time period after said first position fix and no later than said second position fix, wherein said at least one sensor comprises an image capture device; and
   improving a quality of measurement of said second position fix by disciplining said second position fix based on said locally measured device movement information.

2. The method of claim 1 wherein said at least one sensor further comprises at least one accelerometer which is not a component of an inertial measurement unit (IMU).

3. The method of claim 2 further comprising:
   determining if the locally measured device movement information received from said accelerometer has become an unreliable metric for determining the movement of said device; and
   responsive to said locally measured device movement information received from said accelerometer being determined to be unreliable for determining the movement of said device, using the locally measured device movement information received from said image capture device for disciplining said second position fix.

4. The method of claim 1 wherein said GNSS receiver system comprises a plurality of sub-systems and wherein at least one of said plurality of sub-systems is accessible by a processor.

5. The method of claim 4 wherein said accessing, said obtaining, and said improving are performed by one or more hardware processors located in said GNSS receiver system.

6. The method of claim 1 wherein said GNSS receiver system comprises a GNSS chipset.

7. The method of claim 6 wherein said accessing, said obtaining, and said improving are performed by one or more hardware processors located in said device and outside of said GNSS chipset.

8. The method of claim 6 wherein said accessing, said obtaining, and said improving are performed by one or more hardware processors located in said GNSS chipset.

9. The method of claim 1 further comprising:
   determining that said second position fix comprises an erroneous position fix.

10. The method of claim 9 wherein said improving said quality of measurement of said second position fix further comprises:
    using a Kalman filter to determine that said second position fix comprises an outlier value.

11. The method of claim 10 further comprising:
discarding said second position fix based on said locally measured device movement information.

12. The method of claim 10 further comprising:
using locally measured device movement information received from at least said image capture device to derive a third position fix.

13. The method of claim 1 further comprising:
determining an average value of locally measured device movement information received from said image capture device to indicate the movement of said device.

14. The method of claim 13 wherein said average value comprises a weighted average of locally measured device movement information received from said image capture device.

15. The method of claim 1 further comprising:
capturing audio information using a microphone coupled with said device; and
converting said audio information using an analog-to-digital converter (ADC).

16. The method of claim 1, wherein said accessing a first position fix of a Global Navigation Satellite System (GNSS) receiver system of a device, wherein said device is a mobile device:
accessing said first position fix of said GNSS receiver system of said device, wherein said device is a mobile device.

17. The method of claim 1, wherein said accessing a first position fix of a Global Navigation Satellite System (GNSS) receiver system of a device, wherein said device is a mobile device:
accessing said first position fix of said GNSS receiver system of said device, wherein said device is disposed as a portion of an unmanned aerial vehicle.

18. A non-transitory computer readable storage medium having computer readable instructions stored thereon for causing a computer system to perform a method of improving position determination of a device using locally measured movement, said method comprising:
accessing a first position fix of a Global Navigation Satellite System (GNSS) receiver system of a device;
accessing a second position fix of said GNSS receiver system at a subsequent time to said first position fix;
obtaining locally measured device movement information, from at least one sensor that is in a known physical relationship to said device, for a time period after said first position fix and no later than said second position fix, wherein said at least one sensor comprises an image capture device; and
improving a quality of measurement of said second position fix by disciplining said second position fix based on said locally measured device movement information.

19. The non-transitory computer readable storage medium of claim 18 wherein said at least one sensor further comprises at least one accelerometer which is not a component of an inertial measurement unit (IMU).

20. The non-transitory computer readable storage medium of claim 19, wherein said method further comprises:
determining if the locally measured device movement information received from said accelerometer has become an unreliable metric for determining the movement of said device; and
responsive to said locally measured device movement information received from said accelerometer being determined to be unreliable for determining the movement of said device, using the locally measured device movement information received from said image capture device for disciplining said second position fix.

21. The non-transitory computer readable storage medium of claim 18 wherein said GNSS receiver system comprises a plurality of sub-systems and wherein at least one of said plurality of sub-systems is accessible by a processor.

22. The non-transitory computer readable storage medium of claim 21 wherein said accessing, said obtaining, and said improving are performed by one or more hardware processors located in said GNSS receiver system.

23. The non-transitory computer readable storage medium of claim 18 wherein said GNSS receiver system comprises a GNSS chipset.

24. The non-transitory computer readable storage medium of claim 23 wherein said accessing, said obtaining, and said improving are performed by one or more hardware processors located in said device and outside of said GNSS chipset.

25. The non-transitory computer readable storage medium of claim 23 wherein said accessing, said obtaining, and said improving are performed by one or more hardware processors located in said GNSS chipset.

26. The non-transitory computer readable storage medium of claim 18 wherein said improving said quality of measurement of said second position fix further comprises:
determining that said second position fix comprises an erroneous position fix.

27. The non-transitory computer readable storage medium of claim 26 wherein said improving said quality of measurement of said second position fix further comprises:
using a Kalman filter to determine that said second position fix comprises an outlier value.

28. The non-transitory computer readable storage medium of claim 27 further comprising:
discarding said second position fix based on said locally measured device movement information.

29. The non-transitory computer readable storage medium of claim 27 further comprising:
using locally measured device movement information received from at least said image capture device to derive a third position fix.

30. The non-transitory computer readable storage medium of claim 18 further comprising:
determining an average value of locally measured device movement information received from said image capture device to indicate the movement of said device.

31. The non-transitory computer readable storage medium of claim 30 wherein said average value comprises a weighted average of locally measured device movement information received from said image capture device.

32. The non-transitory computer readable storage medium of claim 18 wherein said method further comprises:
capturing audio information using a microphone coupled with said device; and
converting said audio information using an analog-to-digital converter (ADC).

33. A system for improving position determination of a device using locally measured movement, said system comprising:
a locally measured movement (LMM) smoothing logic component implemented by a processor for accessing a first position fix of a Global Navigation Satellite System (GNSS) receiver system of a device and for accessing a second position fix of said GNSS receiver system at a subsequent time to said first position fix;
an image capture device for obtaining locally measured device movement information from at least one sensor, that is in a known physical relationship to said device, for a time period after said first position fix and no later than said second position fix; and wherein said LMM smoothing logic is further configured for improving a quality of measurement of said second position fix by disciplining said second position fix based on said locally measured device movement information.

34. The system of claim 33 further comprising:
at least one accelerometer, which is not a component of an inertial measurement unit (IMU), that is in a known physical relationship to said device, for obtaining locally measured device movement information for a time period after said first position fix and no later than said second position fix.

35. The system of claim 34 further comprising:
a dual-sensor averaging logic implemented by said processor for determining an average value of locally measured device movement information received from said accelerometer and said image capture device to indicate the movement of said device.

36. The system of claim 35 wherein said average value comprises a weighted average of locally measured device movement information received from said accelerometer and said image capture device.

37. The system of claim 34 further comprising:
a dual-sensor averaging logic implemented by said processor for determining if the locally measured device movement information received from said accelerometer has become an unreliable metric for determining the movement of said device and for using the locally measured device movement information received from said image capture device for disciplining said second position fix in response to determining information received from said accelerometer is unreliable for determining the movement of said device.

38. The system of claim 33 further comprising:
a microphone configured for capturing audio information; and
an analog-to-digital converter (ADC) coupled with microphone and configured to convert the audio information to a digital format.

39. The system of claim 33 wherein said GNSS receiver system comprises a GNSS chipset.

40. The system of claim 33 wherein said GNSS receiver system comprises a plurality of sub-systems and wherein at least one of said plurality of sub-systems is accessible by a processor.

41. The system of claim 40 wherein said accessing, said obtaining, and said improving are performed by one or more hardware processors located in said GNSS receiver system.

42. The system of claim 33 wherein said LMM smoothing logic is configured to determine that said second position fix comprises an erroneous position fix.

43. The system of claim 42 wherein said accessing, said obtaining, and said improving are performed by one or more hardware processors located in said device and outside of said GNSS chipset.

44. The system of claim 42 wherein said accessing, said obtaining, and said improving are performed by one or more hardware processors located in said GNSS chipset.

45. The system of claim 42 wherein said LMM smoothing logic comprises a Kalman filter configured to determine that said second position fix comprises an outlier value.

46. The system of claim 45 wherein said LMM smoothing logic is further configured to discard said second position fix based on said locally measured device movement information.

47. The system of claim 45 wherein said LMM smoothing logic is further configured to use locally measured device movement information received from at least said image capture device.

48. The system of claim 33, wherein said device comprises a mobile device.

49. The system of claim 33 wherein said device is a portion of an unmanned aerial vehicle.

\* \* \* \* \*